US012284018B2

(12) United States Patent
Jin et al.

(10) Patent No.: US 12,284,018 B2
(45) Date of Patent: Apr. 22, 2025

(54) PRECODING VECTOR INDICATION METHOD, PRECODING VECTOR DETERMINING METHOD, AND COMMUNICATIONS APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 555 days.

(21) Appl. No.: 17/241,165

(22) Filed: Apr. 27, 2021

(65) Prior Publication Data

US 2021/0250076 A1 Aug. 12, 2021

Related U.S. Application Data

(63) Continuation of application No. PCT/CN2019/110939, filed on Oct. 14, 2019.

(30) Foreign Application Priority Data

Oct. 27, 2018 (CN) .................. 2018112631101.1

(51) Int. Cl.
*H04B 7/06* (2006.01)
*H04L 1/1607* (2023.01)

(52) U.S. Cl.
CPC ......... *H04B 7/0663* (2013.01); *H04B 7/0626* (2013.01); *H04B 7/0634* (2013.01); *H04L 1/1614* (2013.01)

(58) Field of Classification Search
CPC .. H04B 7/0663; H04B 7/0626; H04B 7/0634; H04L 1/1614
See application file for complete search history.

(56) References Cited

U.S. PATENT DOCUMENTS

2015/0282181 A1 10/2015 Hassan et al.
2017/0264414 A1 9/2017 Olsson et al.
(Continued)

FOREIGN PATENT DOCUMENTS

CN 103840907 A 6/2014
CN 104639218 A 5/2015
(Continued)

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.
(Continued)

*Primary Examiner* — Jackie Zuniga Abad
(74) *Attorney, Agent, or Firm* — Fish & Richardson P.C.

(57) ABSTRACT

Example precoding vector indication methods, precoding vector determining methods, and communications apparatus to reduce feedback overheads are described. One example method includes generating and sending a channel state information (CSI) report by a terminal device. A network device determines a precoding vector of one or more frequency domain units based on the CSI report. The CSI report is used to indicate M space-frequency units and a weighting coefficient of a part or all of the M space-frequency units, each of the M space-frequency units corresponds to one beam vector and one frequency domain vector, and a weighted sum of the part or all of the M space-frequency units is used to determine the precoding vector of the one or more frequency domain units.

20 Claims, 12 Drawing Sheets

(56) References Cited

U.S. PATENT DOCUMENTS

| | | | |
|---|---|---|---|
| 2018/0176809 A1* | 6/2018 | Gao | H04L 5/0057 |
| 2018/0212661 A1 | 7/2018 | Liu et al. | |
| 2018/0278315 A1* | 9/2018 | Wu | H04B 7/0632 |
| 2019/0349045 A1* | 11/2019 | Varatharaajan | H04B 7/0469 |
| 2020/0220603 A1* | 7/2020 | Hao | H04B 7/0617 |
| 2020/0367083 A1* | 11/2020 | Hao | H04W 24/10 |

FOREIGN PATENT DOCUMENTS

| | | |
|---|---|---|
| CN | 105322994 A | 2/2016 |
| CN | 105612707 A | 5/2016 |
| CN | 107872253 A | 4/2018 |
| CN | 108024375 A | 5/2018 |
| CN | 108418612 A | 8/2018 |
| JP | 2017017735 A | 1/2017 |
| JP | 2017528960 A | 9/2017 |
| WO | 2017166281 A1 | 10/2017 |

OTHER PUBLICATIONS

3GPP TS 38.212 V15.3.0 (Sep. 2018), "3rd Generation Partnership Project; Technical Specification Group Radio Access Network; NR; Multiplexing and channel coding (Release 15)," Sep. 2018, 99 pages.

Office Action in Chinese Application No. 201811263110.1, dated Mar. 2, 2021, 13 pages.

PCT International Search Report and Written Opinion in International Application No. PCT/CN2019/110939, dated Jan. 16, 2020, 13 pages.

Office Action issued in Japanese Application No. 2021-523305 on Jun. 6, 2022, 7 pages (with English translation).

Extended European Search Report issued in European Application No. 19876470.6 on Oct. 28, 2021, 10 pages.

Huawei, HiSilicon, "Enhancements on CSI reporting and codebook design," 3GPP TSG RAN WG1 Meeting #94, R1-1808949, Gothenburg, Sweden, Aug. 20-24, 2018, 8 pages.

* cited by examiner

| Second part of a CSI report | Inter-transport-layer common information | Specific component information of a transport layer 0 | Coefficient information of the transport layer 0 | ... | Specific component information of a transport layer R−1 | Coefficient information of the transport layer R−1 |

FIG. 4

| Second part of a CSI report | Inter-transport-layer common information | Specific component information of a transport layer 0 | ... | Specific component information of a transport layer R−1 | Coefficient information of the transport layer 0 | ... | Coefficient information of the transport layer R−1 |

FIG. 5

| Second part of a CSI report | Inter-transport-layer common information | Specific component information of a transport layer 0 | Coefficient information of a first level of the transport layer 0 | Coefficient information of a second level of the transport layer 0 | Coefficient information of a third level of the transport layer 0 | Specific component information of a transport layer 1 | ... |

FIG. 6

| Second part of a CSI report | Inter-transport-layer common information | Specific component information of a transport layer 0 | ... | Specific component information of a transport layer R−1 | Coefficient information of a first level of the transport layer 0 | ... | Coefficient information of the first level of the transport layer R−1 | Coefficient information of a second level of the transport layer 0 | ... |

FIG. 7

| | | | Specific information of a transport layer 0 | Specific information of a transport layer 1 | ... | Specific information of a transport layer $R_0-1$ |
|---|---|---|---|---|---|---|
| First part of a CSI report #0 | RI | CQI | L1 | Specific information of a transport layer 0 | Specific information of a transport layer 1 | ... | Specific information of a transport layer $R_0-1$ |
| First part of a CSI report #1 | RI | CQI | L1 | Specific information of a transport layer 0 | Specific information of a transport layer 1 | ... | Specific information of a transport layer $R_1-1$ |
| ... | | | | | ... | |
| First part of a CSI report #J−1 | RI | CQI | L1 | Specific information of a transport layer 0 | Specific information of a transport layer 1 | ... | Specific information of a transport layer $R_{J-1}-1$ |

FIG. 8

| | Inter-transport-layer common information | Specific component information of a transport layer 0 | Coefficient information of the transport layer 0 | ... | Specific component information of a transport layer $R_0-1$ | Coefficient information of the transport layer $R_0-1$ |
|---|---|---|---|---|---|---|
| Second part of a CSI report #0 | | | | | | |
| Second part of a CSI report #1 | Inter-transport-layer common information | Specific component information of a transport layer 0 | Coefficient information of the transport layer 0 | ... | Specific component information of a transport layer $R_1-1$ | Coefficient information of the transport layer $R_1-1$ |
| ⋮ | | | | ⋮ | | |
| Second part of a CSI report #J−1 | Inter-transport-layer common information | Specific component information of a transport layer 0 | Coefficient information of the transport layer 0 | ... | Specific component information of a transport layer $R_{J-1}-1$ | Coefficient information of the transport layer $R_{J-1}-1$ |

FIG. 9

| | | | | |
|---|---|---|---|---|
| Second part of a CSI report #0 | Inter-transport-layer common information | Specific component information of a transport layer 0 | ... | Specific component information of a transport layer $R_0-1$ | Coefficient information of the transport layer 0 | ... | Coefficient information of the transport layer $R_0-1$ |
| Second part of a CSI report #1 | Inter-transport-layer common information | Specific component information of a transport layer 0 | ... | Specific component information of a transport layer $R_1-1$ | Coefficient information of the transport layer 0 | ... | Coefficient information of the transport layer $R_1-1$ |
| ⋮ | | | | ⋮ |
| Second part of a CSI report #J−1 | Inter-transport-layer common information | Specific component information of a transport layer 0 | ... | Specific component information of a transport layer $R_{J-1}-1$ | Coefficient information of the transport layer 0 | ... | Coefficient information of the transport layer $R_{J-1}-1$ |

FIG. 10

| | | | | | |
|---|---|---|---|---|---|
| Second part of a CSI report #0 | Inter-transport-layer common information | Specific component information of a transport layer 0 | Coefficient information of a first level of the transport layer 0 | Coefficient information of a second level of the transport layer 0 | Coefficient information of a third level of the transport layer 0 | Specific component information of a transport layer 1 | ... |
| Second part of a CSI report #1 | Inter-transport-layer common information | Specific component information of a transport layer 0 | Coefficient information of a first level of the transport layer 0 | Coefficient information of a second level of the transport layer 0 | Coefficient information of a third level of the transport layer 0 | Specific component information of a transport layer 1 | ... |
| ... | | | | ... | | |
| Second part of a CSI report #J−1 | Inter-transport-layer common information | Specific component information of a transport layer 0 | Coefficient information of a first level of the transport layer 0 | Coefficient information of a second level of the transport layer 0 | Coefficient information of a third level of the transport layer 0 | Specific component information of a transport layer 1 | ... |

FIG. 11

| | | | | | |
|---|---|---|---|---|---|
| Second part of a CSI report #0 | Inter-transport-layer common information | Specific component information of a transport layer 0 | ... | Specific component information of a transport layer R−1 | Coefficient information of a first level of the transport layer 0 | ... | Coefficient information of the first level of the transport layer R−1 | Coefficient information of a second level of the transport layer 0 | ... |
| Second part of a CSI report #1 | Inter-transport-layer common information | Specific component information of a transport layer 0 | ... | Specific component information of a transport layer R−1 | Coefficient information of a first level of the transport layer 0 | ... | Coefficient information of the first level of the transport layer R−1 | Coefficient information of a second level of the transport layer 0 | ... |
| ... | | | | | ... | | | | |
| Second part of a CSI report #J−1 | Inter-transport-layer common information | Specific component information of a transport layer 0 | ... | Specific component information of a transport layer R−1 | Coefficient information of a first level of the transport layer 0 | ... | Coefficient information of the first level of the transport layer R−1 | Coefficient information of a second level of the transport layer 0 | ... |

FIG. 12

PRECODING VECTOR INDICATION METHOD, PRECODING VECTOR DETERMINING METHOD, AND COMMUNICATIONS APPARATUS

CROSS-REFERENCE TO RELATED APPLICATIONS

This application is a continuation of International Application No. PCT/CN2019/110939, filed on Oct. 14, 2019, which claims priority to Chinese Patent Application No. 20181-12631101, filed on Oct. 27, 2018. The disclosures of the aforementioned applications are hereby incorporated by reference in their entireties.

TECHNICAL FIELD

This application relates to the wireless communications field, and more specifically, to a precoding vector indication method, a precoding vector determining method, and a communications apparatus.

BACKGROUND

In a massive multiple-input multiple-output (Massive MIMO) technology, a network device may reduce, through precoding, interference between a plurality of users and interference between a plurality of signal streams of a same user. This helps improve signal quality, implement spatial multiplexing, and improve spectrum utilization.

For example, a terminal device may determine a precoding vector through channel measurement or in another manner, and intends to enable, through a feedback, the network device to obtain a precoding vector that is the same as or similar to the precoding vector determined by the terminal device. In an implementation, the terminal device may indicate the precoding vector to the network device in a two-level feedback manner including a wideband feedback and a sub-band feedback. Specifically, for each transport layer, the terminal device may indicate, through the wideband feedback, one or more selected beam vectors and a quantization value of a wideband amplitude coefficient of each beam vector, and may indicate, through the sub-band feedback, a quantization value of a combination coefficient that can be used for each sub-band, where the combination coefficient may include, for example, a sub-band amplitude coefficient and a sub-band phase coefficient. The network device may combine information about the wideband feedback and information about the sub-band feedback, to restore a precoding vector corresponding to each sub-band. For a specific method for indicating, by the terminal device, the precoding vector to the network device in the two-level feedback manner including the wideband feedback and the sub-band feedback, refer to a type II codebook feedback manner defined in the new, radio (NR) protocol TS 38.214.

However, as a quantity of transport layers increases, feedback overheads caused by the foregoing feedback manner multiply. In addition, a larger quantity of sub-bands also causes a greater increase in the feedback overheads.

SUMMARY

This application provides a precoding vector indication method, a precoding vector determining method, and a communications apparatus, to reduce feedback overheads.

According to a first aspect, a precoding vector indication method is provided. The method may be performed by a terminal device, or may be performed by a chip disposed in a terminal device.

Specifically, the method includes: generating a channel state information CSI report, where the CSI report is used to indicate M space-frequency units and a weighting coefficient of a part or all of the M space-frequency units, each of the M space-frequency units corresponds to one beam vector and one frequency domain vector, and a weighted sum of the part or all of the M space-frequency units is used to determine a precoding vector of one or more frequency domain units; and sending the CSI report.

According to a second aspect, a precoding vector determining method is provided. The method may be performed by a network device, or may be performed by a chip disposed in a network device.

Specifically, the method includes: receiving a channel state information CSI report, where the CSI report is used to indicate M space-frequency units and a weighting coefficient of a part or all of the M space-frequency units, each of the M space-frequency units corresponds to one beam vector and one frequency domain vector, and a weighted sum of the part or all of the M space-frequency units is used to determine a precoding vector of one or more frequency domain units; and determining the precoding vector of the one or more frequency domain units based on the CSI report.

Therefore, in embodiments of this application, a change rule of a channel in frequency domain is described by using a frequency domain vector, and a change of the channel in frequency domain is simulated through linear superposition of one or more frequency domain vectors. This fully explores a relationship between frequency domain units. A change rule of a plurality of frequency domain units is described based on frequency domain continuity by using a relatively small quantity of frequency domain vectors. The terminal device indicates, to the network device, one or more beam vectors, one or more frequency domain vectors, and one or more corresponding weighting coefficients, or indicates, to the network device, one or more space-frequency units and one or more corresponding weighting coefficients, so that the network device restores a precoding vector with a relatively high approximation. Different from the current technology, a weighting coefficient does not need to be independently reported based on each frequency domain unit. When a quantity of frequency domain units increases, feedback overheads do not multiply. Therefore, the feedback overheads can be greatly reduced while a high approximation is ensured.

With reference to the first aspect or the second aspect, in some possible implementations, the CSI report includes a first part and a second part, where the second part includes an indication of a normalized space-frequency unit, and quantization information of each weighting coefficient that is in M weighting coefficients corresponding to the M space-frequency units and that is different from a normalized coefficient, and the normalized space-frequency unit corresponds to the normalized coefficient.

The first part of the CSI report may not include any PMI-related information. Because the normalized space-frequency unit corresponds to the normalized coefficient, the normalized coefficient may be indicated by indicating the normalized space-frequency unit.

With reference to the first aspect or the second aspect, in some possible implementations, the CSI report includes a first part and a second part, where the second part includes quantization information of each of M weighting coefficients corresponding to the M space-frequency units.

The first part of the CSI report may not include any PMI-related information.

With reference to the first aspect or the second aspect, in some possible implementations, the CSI report includes a first part and a second part, where the first part includes an indication of a quantity of non-zero-amplitude weighting coefficients that are in M weighting coefficients corresponding to the M space-frequency units and that are different from a normalized coefficient, or an indication of a quantity of zero-amplitude weighting coefficients that are in the M weighting coefficients and that are different from the normalized coefficient; and the second part includes an indication of a normalized space-frequency unit, quantization information of an amplitude of each weighting coefficient that is in the M weighting coefficients and that is different from the normalized coefficient, and quantization information of a phase of each non-zero-amplitude weighting coefficient that is in the M weighting coefficients and that is different from the normalized coefficient, and the normalized space-frequency unit corresponds to the normalized coefficient.

It is unnecessary to indicate a phase of the zero-amplitude weighting coefficient. The quantity of non-zero-amplitude weighting coefficients different from the normalized coefficient is indicated in the first part, and the amplitude of each weighting coefficient different from the normalized coefficient is indicated in the second part to implicitly indicate locations of the non-zero-amplitude weighting coefficients. Therefore, only the phase of the non-zero-amplitude weighting coefficient different from the normalized coefficient may be indicated in the second part, to reduce the feedback overheads.

With reference to the first aspect or the second aspect, in some possible implementations, the CST report includes a first part and a second part, where the first part includes an indication of a quantity of non-zero-amplitude weighting coefficients in M weighting coefficients corresponding to the M space-frequency units, or an indication of a quantity of zero-amplitude weighting coefficients in the M weighting coefficients; and the second part includes quantization information of an amplitude of each of the M weighting coefficients, and quantization information of a phase of each non-zero-amplitude weighting coefficient in the M weighting coefficients.

It is unnecessary to indicate a phase of the zero-amplitude weighting coefficient. The quantity of non-zero-amplitude weighting coefficients is indicated in the first part, and the amplitude of each weighting coefficient is indicated in the second part to implicitly indicate locations of the non-zero-amplitude weighting coefficients. Therefore, only the phase of the non-zero-amplitude weighting coefficient may be indicated in the second part, to reduce the feedback overheads.

With reference to the first aspect or the second aspect, in some possible implementations, the CSI report includes a first part and a second part, where the first part includes quantization information of an amplitude of each weighting coefficient that is in M weighting coefficients corresponding to the M space-frequency units and that is different from a normalized coefficient; and the second part includes an indication of a normalized space-frequency unit, and quantization information of a phase of each non-zero-amplitude weighting coefficient that is in the M weighting coefficients and that is different from the normalized coefficient, and the normalized space-frequency unit corresponds to the normalized coefficient.

It is unnecessary to indicate a phase of a zero-amplitude weighting coefficient. The amplitude of each weighting coefficient different from the normalized coefficient is indicated in the first part, so that a quantity and locations of non-zero-amplitude weighting coefficients different from the normalized coefficient may be implicitly indicated. Therefore, only the phase of the non-zero-amplitude weighting coefficient may be indicated in the second part, to reduce the feedback overheads.

With reference to the first aspect or the second aspect, in some possible implementations, the CSI report includes a first part and a second part, where the first part includes quantization information of an amplitude of each of M weighting coefficients corresponding to the M space-frequency units; and the second part includes quantization information of a phase of each non-zero-amplitude weighting coefficient in the M weighting coefficients.

It is unnecessary to indicate a phase of a zero-amplitude weighting coefficient. The amplitude of each weighting coefficient is indicated in the first part, so that a quantity and locations of non-zero-amplitude weighting coefficients may be implicitly indicated. Therefore, only the phase of the non-zero-amplitude weighting coefficient may be indicated in the second part, to reduce the feedback overheads.

With reference to the first aspect or the second aspect, in some possible implementations, the CSI report includes a first pail and a second part, where the first part includes a bitmap, and the bitmap is used to indicate a quantity and locations of non-zero-amplitude weighting coefficients that are in M weighting coefficients corresponding to the M space-frequency units and that are different from a normalized coefficient; and the second part includes an indication of a normalized space-frequency unit, and quantization information of each non-zero-amplitude weighting coefficient that is in the M weighting coefficients and that is different from the normalized coefficient, and the normalized space-frequency unit corresponds to the normalized coefficient.

It is unnecessary to indicate a phase of a zero-amplitude weighting coefficient. Whether an amplitude of each weighting coefficient different from the normalized coefficient is zero is indicated in the first part through the bitmap, so that the quantity and the locations of non-zero-amplitude weighting coefficients different from the normalized coefficient may be implicitly indicated. Therefore, only an amplitude and a phase of the non-zero-amplitude weighting coefficient different from the normalized coefficient may be indicated in the second part, to reduce the feedback overheads.

With reference to the first aspect or the second aspect, in some possible implementations, the CSI report includes a first pail and a second part, where the first part includes a bitmap, and the bitmap is used to indicate a quantity and locations of non-zero-amplitude weighting coefficients in M weighting coefficients corresponding to the M space-frequency units; and the second part includes quantization information of each non-zero-amplitude weighting coefficient in the M weighting coefficients.

It is unnecessary to indicate a phase of a zero-amplitude weighting coefficient. Whether an amplitude of each weighting coefficient is zero is indicated in the first part through the bitmap, so that the quantity and the locations of non-zero-amplitude weighting coefficients may be implicitly indicated. Therefore, only an amplitude and a phase of the non-zero-amplitude weighting coefficient may be indicated in the second part, to reduce the feedback overheads.

With reference to the first aspect or the second aspect, in some possible implementations, the CSI report includes a first part and a second part, where the first part includes a bitmap, and the bitmap is used to indicate a quantity and locations of non-zero-amplitude weighting coefficients that are in M weighting coefficients corresponding to the M space-frequency units and that are different from a normalized coefficient, and a quantity of quantization bits of each weighting coefficient different from the normalized coefficient; and the second part includes an indication of a normalized space-frequency unit, and quantization information of each non-zero-amplitude weighting coefficient that is in the M weighting coefficients and that is different from the normalized coefficient, and the normalized space-frequency unit corresponds to the normalized coefficient.

It is unnecessary to indicate a phase of a zero-amplitude weighting coefficient. Whether an amplitude of each weighting coefficient different from the normalized coefficient is zero is indicated in the first part through the bitmap, so that the quantity and the locations of non-zero-amplitude weighting coefficients different from the normalized coefficient may be implicitly indicated. Therefore, only an amplitude and a phase of the non-zero-amplitude weighting coefficient different from the normalized coefficient may be indicated in the second part, to reduce the feedback overheads.

In addition, a plurality of bits are used to indicate quantities of quantization bits of different weighting coefficients, so that more quantization bits may be allocated to a weighting coefficient of a stronger space-frequency component, and fewer quantization bits may be allocated to a weighting coefficient of a weaker space-frequency component. In this way, more overheads can be used for the stronger space-frequency component, and this helps improve the approximation precision.

With reference to the first aspect or the second aspect, in some possible implementations, the CSI report includes a first part and a second part, where the first part includes a bitmap, and the bitmap is used to indicate a quantity and locations of non-zero-amplitude weighting coefficients in M weighting coefficients corresponding to the M space-frequency units, and a quantity of quantization bits of each weighting coefficient; and the second part includes quantization information of each non-zero-amplitude weighting coefficient in the M weighting coefficients.

It is unnecessary to indicate a phase of a zero-amplitude weighting coefficient. Whether an amplitude of each weighting coefficient is zero is indicated in the first part through the bitmap, so that the quantity and the locations of non-zero-amplitude weighting coefficients may be implicitly indicated. Therefore, only an amplitude and a phase of the non-zero-amplitude weighting coefficient may be indicated in the second part, to reduce the feedback overheads.

In addition, a plurality of bits are used to indicate quantities of quantization bits of different weighting coefficients, so that more quantization bits may be allocated to a weighting coefficient of a stronger space-frequency component, and fewer quantization bits may be allocated to a weighting coefficient of a weaker space-frequency component. In this way, more overheads can be used for the stronger space-frequency component, and this helps improve the approximation precision.

With reference to the first aspect or the second aspect, in some possible implementations, the second part further includes an indication of the M space-frequency units.

In the foregoing several listed possible designs of the CSI report, the second part may further include the indication of the M space-frequency units. The indication of the M space-frequency units may be, for example, an indication of several (for example, L) beam vectors and several (for example, K) frequency domain vectors, may be an indication of M space-frequency component matrices, may be an indication of M space-frequency component vectors, or may be an indication of L beam vectors, K frequency domain vectors, and M of L×K space-frequency units.

With reference to the first aspect or the second aspect, in some possible implementations, the CSI report includes a first part and a second part, where the first part includes a bitmap, and the bitmap is used to indicate a quantity and locations of non-zero-amplitude weighting coefficients that are in L×K weighting coefficients and that are different from a normalized coefficient; and the second part includes an indication of a normalized space-frequency unit, and quantization information of each non-zero-amplitude weighting coefficient different from the normalized coefficient, and the normalized space-frequency unit corresponds to the normalized coefficient, where the L×K weighting coefficients correspond to L×K space-frequency units, a weighted sum of a part of the L×K space-frequency units is used to determine the precoding vector of the one or more frequency domain units, and L×K≥M.

An amplitude of a weighting coefficient that is in the L×K weighting coefficients and that corresponds to a space-frequency unit different from the M space-frequency units is zero, and whether an amplitude of each weighting coefficient that is in the L×K weighting coefficients and that is different from the normalized coefficient is zero is indicated in the first part through the bitmap, so that the quantity and the locations of non-zero-amplitude weighting coefficients different from the normalized coefficient may be implicitly indicated. Therefore, the quantity and the locations of non-zero-amplitude weighting coefficients different from the normalized coefficient may be determined, only an amplitude and a phase of the non-zero-amplitude weighting coefficient different from the normalized coefficient may be indicated in the second part, and additional overheads are not needed to indicate several space-frequency units selected from the L×K space-frequency units. In this way, the feedback overheads can be further reduced.

It should be noted that a quantity of the space-frequency units selected from the L×K space-frequency units may be M, or may be less than M. This is not limited in this application. To be specific, a quantity of zero-amplitude weighting coefficients in the L×K weighting coefficients may be L×K−M, or may be greater than L×K−M. When the quantity of zero-amplitude weighting coefficients is greater than L×K−M, the quantity of the selected space-frequency units may be less than M. In this case, a zero-amplitude space-frequency unit in the M space-frequency units indicated by the terminal device may not be needed, that is, a weighting coefficient of the zero-amplitude space-frequency unit is zero. Therefore, the terminal device may indicate, through the bitmap in the first part, the several space-frequency units used for weighted summation to determine the precoding vector. For brevity, descriptions of a same or similar case are omitted below.

With reference to the first aspect or the second aspect, in some possible implementations, the CSI report includes a first pail and a second part, where the first part includes a bitmap, and the bitmap is used to indicate a quantity and locations of non-zero-amplitude weighting coefficients in L×K weighting coefficients; and the second part includes quantization information of each non-zero-amplitude weighting coefficient, where the L×K weighting coefficients correspond to L×K space-frequency units, a weighted sum of a part of the L×K space-frequency units is used to determine the precoding vector of the one or more frequency domain units, and L×K≥M.

An amplitude of a weighting coefficient that is in the L×K weighting coefficients and that corresponds to a space-frequency unit different from the M space-frequency units is zero, and whether an amplitude of each of the L×K weighting coefficients is zero is indicated in the first part through the bitmap, so that the quantity and the locations of non-zero-amplitude weighting coefficients may be implicitly indicated. Therefore, the quantity and the locations of non-zero-amplitude weighting coefficients may be determined, only an amplitude and a phase of the non-zero-amplitude weighting coefficient may be indicated in the second part, and additional overheads are not needed to indicate several space-frequency units selected from the L×K space-frequency units. In this way, the feedback overheads can be further reduced.

With reference to the first aspect or the second aspect, in some possible implementations, the CSI report includes a first pail and a second part, where the first part includes a bitmap, and the bitmap is used to indicate a quantity and locations of non-zero-amplitude weighting coefficients that are in L×K weighting coefficients and that are different from a normalized coefficient, and a quantity of quantization bits of each weighting coefficient different from the normalized coefficient; and the second part includes an indication of a normalized space-frequency unit, and quantization information of each non-zero-amplitude weighting coefficient different from the normalized coefficient, and the normalized space-frequency unit corresponds to the normalized coefficient, where the L×K weighting coefficients correspond to L×K space-frequency units, a weighted sum of a part of the L×K space-frequency units is used to determine the precoding vector of the one or more frequency domain units, and L×K≥M.

An amplitude of a weighting coefficient that is in the L×K weighting coefficients and that corresponds to a space-frequency unit different from the M space-frequency units is zero, and whether an amplitude of each weighting coefficient that is in the L×K weighting coefficients and that is different from the normalized coefficient is zero is indicated in the first part through the bitmap, so that the quantity and the locations of non-zero-amplitude weighting coefficients different from the normalized coefficient may be implicitly indicated. Therefore, the quantity and the locations of non-zero-amplitude weighting coefficients different from the normalized coefficient may be determined, only an amplitude and a phase of the non-zero-amplitude weighting coefficient different from the normalized coefficient may be indicated in the second part, and additional overheads are not needed to indicate several space-frequency units selected from the L×K space-frequency units. In this way, the feedback overheads can be further reduced.

In addition, a plurality of bits are used to indicate quantities of quantization bits of different weighting coefficients, so that more quantization bits may be allocated to a weighting coefficient of a stronger space-frequency component, and fewer quantization bits may be allocated to a weighting coefficient of a weaker space-frequency component. In this way, more overheads can be used for the stronger space-frequency component, and this helps improve the approximation precision.

With reference to the first aspect or the second aspect, in some possible implementations, the CSI report includes a first part and a second part, where the first part includes a bitmap, and the bitmap is used to indicate a quantity and locations of non-zero-amplitude weighting coefficients in L×K weighting coefficients, and a quantization level to which each weighting coefficient belongs; and the second part includes quantization information of each non-zero-amplitude weighting coefficient, where the L×K weighting coefficients correspond to L×K space-frequency units, a weighted sum of a part of the L×K space-frequency units is used to determine the precoding vector of the one or more frequency domain units, and L×K≥M.

An amplitude of a weighting coefficient that is in the L×K weighting coefficients and that corresponds to a space-frequency unit different from the M space-frequency units is zero, and whether an amplitude of each of the L×K weighting coefficients is zero is indicated in the first part through the bitmap, so that the quantity and the locations of non-zero-amplitude weighting coefficients may be implicitly indicated. Therefore, the quantity and the locations of non-zero-amplitude weighting coefficients may be determined, only an amplitude and a phase of the non-zero-amplitude weighting coefficient may be indicated in the second part, and additional overheads are not needed to indicate several space-frequency units selected from the L×K space-frequency units. In this way, the feedback overheads can be further reduced.

In addition, a plurality of bits are used to indicate quantities of quantization bits of different weighting coefficients, so that more quantization bits may be allocated to a weighting coefficient of a stronger space-frequency component, and fewer quantization bits may be allocated to a weighting coefficient of a weaker space-frequency component. In this way, more overheads can be used for the stronger space-frequency component, and this helps improve the approximation precision.

With reference to the first aspect or the second aspect, in some possible implementations, the second part further includes an indication of the L×K space-frequency units.

In the foregoing several listed possible designs of the CSI report, the second part may further include the indication of the L×K space-frequency units. For example, the indication of the L×K space-frequency units may be an indication of L beam vectors and K frequency domain vectors, may be an indication of L×K space-frequency component matrices, or may be an indication of L×K space-frequency component vectors. This is not limited in this application.

According to a third aspect, a communications apparatus is provided. The communications apparatus includes modules or units configured to perform the method according to any one of the possible implementations of the first aspect.

According to a fourth aspect, a communications apparatus is provided. The communications apparatus includes a processor. The processor is coupled to a memory, and may be configured to execute an instruction in the memory, to implement the method according to any one of the possible implementations of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chit) disposed in the terminal device, the communications interface may be an input/output interface.

Optionally, the transceiver may be a transceiver circuit. Optionally, the input/output interface may be an input/output circuit.

According to a fifth aspect, a communications apparatus is provided. The communications apparatus includes modules or units configured to perform the method according to any one of the possible implementations of the second aspect.

According to a sixth aspect, a communications apparatus is provided. The communications apparatus includes a processor. The processor is coupled to a memory, and may be configured to execute an instruction in the memory, to implement the method according to any one of the possible implementations of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive an input signal via the input circuit, and output a signal via the output circuit, to enable the processor to perform the method according to any one of the first aspect, the possible implementations of the first aspect, the second aspect, or the possible implementations of the second aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to and transmitted by, for example, but not limited to, a transmitter, and the input circuit and the output circuit may be a same circuit, where the circuit is used as an input circuit and an output circuit at different moments. Specific implementations of the processor and the various circuits are not limited in the embodiments of this application.

According to an eighth aspect, a processing apparatus is provided. The processing apparatus includes a processor and a memory. The processor is configured to: read an instruction stored in the memory, receive a signal via a receiver, and transmit a signal via a transmitter, to perform the method according to any one of the first aspect, the possible implementations of the first aspect, the second aspect, or the possible implementations of the second aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that a related data exchange process, for example, sending indication information, may be a process of outputting the indication information by the processor, or a related data exchange process, for example, receiving capability information, may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the eighth aspect may be one or more chips. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or an instruction). When the computer program is run, a computer is enabled to perform the method according to any one of the first aspect, the possible implementations of the first aspect, the second aspect, or the possible implementations of the second aspect.

According to a tenth aspect, a computer-readable medium is provided. The computer-readable medium stores a computer program (which may also be referred to as code or an instruction). When the computer program is run on a computer, the computer is enabled to perform the method according to any one of the first aspect, the possible implementations of the first aspect, the second aspect, or the possible implementations of the second aspect.

According to an eleventh aspect, a communications system is provided. The communications system includes the foregoing network device and terminal device.

BRIEF DESCRIPTION OF DRAWINGS

FIG. 4 to FIG. 7 each are a schematic diagram of a second part of a CSI report according to an embodiment of this application;

FIG. 8 to FIG. 12 each are a schematic diagram of a plurality of CSI reports according to an embodiment of this application;

DESCRIPTION OF EMBODIMENTS

The following describes the technical solutions in this application with reference to the accompanying drawings.

The technical solutions in the embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or a future 5th generation (5G) or new radio (NR) system.

Figure 1:
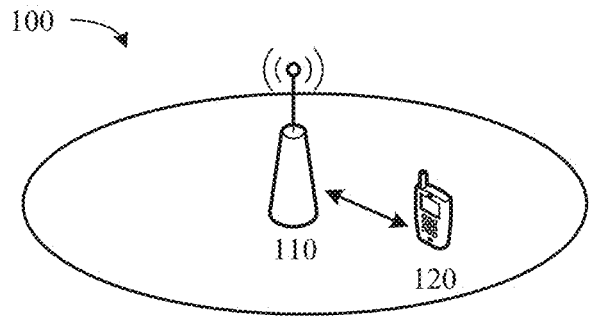
FIG. 1 is a schematic diagram of a communications system to which a precoding vector indication method and a precoding vector determining method are applicable according to an embodiment of this application.

For ease of understanding of the embodiments of this application, a communications system shown in FIG. 1 is first used as an example to describe in detail the communications system to which the embodiments of this application are applicable. FIG. 1 is a schematic diagram of a communications system 100 to which a precoding vector indication method is applicable according to an embodiment of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. Each communications device, such as the network device 110 or the terminal device 120, may be configured with a plurality of antennas. For each communications device in the communications system 100, the plurality of configured antennas may include at least one transmit antenna configured to send a signal and at least one receive antenna configured to receive a signal. Therefore, the communications devices in the communications system 100, for example, the network device 110 and the terminal device 120, may communicate with each other by using a multiple-antenna technology.

It should be understood that the network device in the communications system may be any device that has a wireless transceiver function. The network device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a gNB or a transmission point (TRP or TP) in a 5G system such as an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, the gNB may include a centralized unit (CU) and the DIU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified as a network device in a radio access network (RAN), or may be classified as a network device in a core network (CN). This is not limited in this application.

It should be further understood that the terminal device in the wireless communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

It should be understood that FIG. 1 is merely a simplified schematic diagram used as an example for ease of understanding. The communications system 100 may further include another network device or another terminal device that is not shown in FIG. 1.

For ease of understanding of the embodiments of this application, the following briefly describes a process of processing a downlink signal at a physical layer before the downlink signal is sent. It should be understood that the process of processing the downlink signal described below may be performed by the network device, or may be performed by a chip disposed in the network device. For ease of description, the network device and the chip are collectively referred to as a network device below.

The network device may process a codeword on a physical channel. The codeword may be a coded bit obtained through coding (for example, including channel coding). The codeword is scrambled to generate scrambling bits. Modulation mapping is performed on the scrambling bits, to obtain a modulation symbol. The modulation symbol is mapped to a plurality of layers through layer mapping. The layer is also referred to as a transport layer. A modulation symbol obtained through the layer mapping is precoded, to obtain a precoded signal. The precoded signal is mapped to a plurality of resource elements (RE) through RE mapping. These REs are then transmitted through an antenna port after orthogonal frequency division multiplexing (OFDM) modulation is performed on the REs.

It should be understood that the process of processing the downlink signal described above is merely an example for description, and shall not constitute any limitation on this application. For a specific process of processing the downlink signal, refer to the current technology. For brevity, detailed descriptions of the specific process are omitted herein.

For ease of understanding of the embodiments of this application, the following first briefly describes terms used in the embodiments of this application.

1. Precoding technology: When a channel state is known, a network device may process a to-be-sent signal by using a precoding matrix that matches a channel resource, so that a precoded to-be-sent signal adapts to the channel, to reduce complexity of eliminating inter-channel interference by a receive device. Therefore, after the to-be-sent signal is precoded, received signal quality (for example, a signal to interference plus noise ratio (signal to interference plus noise ratio, SINR)) is improved. Therefore, transmission between a transmit device and a plurality of receive devices can be implemented on a same time-frequency resource by using the precoding technology. That is, multi-user multiple-input multiple-output (MU-MIMO) is implemented. It should be noted that related descriptions of the precoding technology are merely examples for ease of understanding, and are not intended to limit the protection scope of the embodiments of this application. In a specific implementation process, the transmit device may alternatively perform precoding in another manner. For example, when channel information (for example, but not limited to, a channel matrix) cannot be learned of, precoding is performed by using a preset precoding matrix or through weighted processing. For brevity, specific content of the precoding is not described in detail in this specification.

2. Channel state information (CSI) report: The CSI report is information that is used to describe a channel attribute of a communications link and that is reported by a receive end (for example, a terminal device) to a transmit end (for example, a network device) in a wireless communications system. The CSI report may include, for example, but is not limited to, a precoding matrix indicator (PMI), a rank indication (RI), a channel quality indicator (CQI), a channel state information reference signal (CSI-RS) resource indicator (CRI), and a layer indicator (LI). It should be understood that the foregoing listed specific content of the CST report is merely an example for description, and shall not constitute any limitation on this application. The CSI may include one or more of the foregoing listed content, or may include other information that is different from the foregoing listed content and that is used to represent the CSI. This is not limited in this application.

An example in which the terminal device reports the CSI to the network device is used.

The terminal device may report one or more CSI reports in one time unit (for example, a slot), and each CSI report may correspond to one CSI reporting setting condition. For example, the CSI reporting setting condition may be determined based on a CSI reporting setting. The CSI reporting setting may be used to indicate a time domain behavior of CSI reporting, a bandwidth, a format corresponding to a report quantity, and the like. The time domain behavior includes, for example, periodic reporting, semi-persistent reporting, and aperiodic reporting. The terminal device may generate one CSI report based on one CSI reporting setting.

That the terminal device reports one or more CSI reports in one time unit may be referred to as one CSI reporting.

In the embodiments of this application, when generating the CSI report, the terminal device may divide first indication information for indicating a precoding vector into two parts. For example, the CST report may include a first part and a second pail. The first part and the second pail may be independently encoded. A payload size of the first part may be predefined, and a payload size of the second pail may be determined based on information carried in the first part.

The network device may decode the first part based on the predefined payload size of the first part, to obtain the information carried in the first part. The network device may determine the payload size of the second part based on the information obtained from the first part, and then decode the second part to obtain information carried in the second part.

It should be understood that the first part and the second part may be understood as a part 1 and a part 2 of the CSI report that are defined in the NR protocol TS38.214 release 15 (R15).

It should be further understood that, because the embodiments of this application mainly relate to PMI reporting, content in the first part and the second part of the CST report listed in the following embodiments only relates to PMI-related information, and does not relate to other information. However, it should be understood that this shall not constitute any limitation on this application. In addition to information included or indicated in the first part and the second part of the CST report listed in the following embodiments, the first part of the CSI report may further include one or more of the RI, the CQI, and the LI, or may further include other information used to predefine feedback overheads, and the second part of the CSI report may also include other information. This is not limited in this application.

3. Precoding matrix indicator (PMI): The PMI may be used to indicate a precoding matrix. The precoding matrix may be, for example, a precoding matrix determined by the terminal device based on a channel matrix of each frequency domain unit (for example, a sub-band). The channel matrix may be determined by the terminal device through channel estimation or in another manner or based on channel reciprocity. However, it should be understood that a specific method for determining the precoding matrix by the terminal device is not limited to the foregoing description. For a specific implementation, refer to the current technology. For brevity, specific implementations are not listed one by one herein.

For example, the precoding matrix may be obtained by performing singular value decomposition (SVD) on the channel matrix or a covariance matrix of the channel matrix, or may be obtained by performing eigenvalue decomposition (EVD) on a covariance matrix of the channel matrix. This is not limited in this application. It should be understood that the foregoing listed manners of determining the precoding matrix are merely examples, and shall not constitute any limitation on this application. For the manner of determining the precoding matrix, refer to the current technology. For brevity, detailed descriptions of a specific process are omitted herein.

The terminal device may indicate a precoding matrix of each frequency domain unit to the network device through the PMI, so that the network device determines, based on the PMI, a precoding matrix the same as or similar to the precoding matrix determined by the terminal device. For example, the network device may directly determine the precoding matrix of each frequency domain unit based on the PMI, or may determine the precoding matrix of each frequency domain unit based on the PMI and then perform further processing, for example, perform orthogonalization processing on precoding matrices of different users, to determine a finally used precoding matrix. In this way, the network device can determine a precoding matrix that adapts to a channel on each frequency domain unit, to perform precoding processing on a to-be-sent signal. It should be understood that for a specific method for determining, by the network device, the finally used precoding matrix based on the PMI, refer to the current technology. The examples herein are merely used for ease of understanding, and shall not constitute any limitation on this application.

In conclusion, the precoding matrix determined by the terminal device may be understood as a to-be-fed-back precoding matrix. The terminal device may indicate the to-be-fed-back precoding matrix through the PMI, so that the network device restores the precoding matrix based on the PMI. It may be understood that the precoding matrix restored by the network device based on the PMI may be the same as or similar to the to-be-fed-back precoding matrix.

A simple example of a precoding matrix fed back in a two-level feedback manner when a rank is 1 is shown below:

$$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix}$$

$$\begin{bmatrix} c_0 \\ c_1 \\ c_2 \\ c_3 \\ c_4 \\ c_5 \\ c_6 \\ c_7 \end{bmatrix} = \begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}.$$

W represents a to-be-fed-back precoding matrix corresponding to one transport layer, one sub-band (that is, an example of a frequency domain unit), and two polarization directions. $W_1$ may be fed back for each wideband, and $W_2$ may be fed back for each sub-band. $v_0$ to $v_3$ are beam vectors included in $W_1$, and the plurality of beam vectors may be indicated, for example, by using an index of a combination of the plurality of beam vectors. In the precoding matrix shown above, beam vectors in two polarization directions are the same, and the beam vectors $v_0$ to $v_3$ are used in both the two polarization directions. $a_0$ to $a_7$ are wideband amplitude coefficients included in $W_1$, and may be indicated by using quantization values of the wideband amplitude coefficients. $c_0$ to $c_7$ are sub-band coefficients included in $W_2$, and each sub-band coefficient may include a sub-band amplitude coefficient and a sub-band phase coefficient. For example, $c_0$ to $c_7$ may respectively include sub-band amplitude coefficients $p_0$ to $p_7$ and sub-band phase coefficients $\varphi_0$ to $\varphi_7$, and may be respectively indicated by using quantization values of the sub-band amplitude coefficients $p_0$ to $p_7$ and quantization values of the sub-band phase coefficients $\varphi_0$ to $\varphi_7$. It can be learned that the to-be-fed-back precoding matrix may be considered as a weighted sum of a plurality of beam vectors.

It should be understood that the precoding matrix shown above is obtained based on a feedback of one transport layer, and therefore may also be referred to as a precoding vector. When a quantity of transport layers increases, the terminal device may separately feed back a precoding vector based on each transport layer. Precoding vectors fed back based on all the transport layers may be used to construct a precoding matrix of one sub-band. For example, if the quantity of transport layers is 4, the precoding matrix may include four precoding vectors respectively corresponding to the four transport layers.

As the quantity of transport layers increases, feedback overheads of the terminal device also increase. For example, when the quantity of transport layers is 4, feedback overheads of $a_0$ to $a_7$ and $c_0$ to $c_7$ reach a maximum of four times feedback overheads caused when the quantity of transport layers is 1. In other words, if the terminal device performs the foregoing wideband feedback and sub-band feedback based on each transport layer, the feedback overheads multiply as the quantity of transport layers increases. In addition, a larger quantity of sub-bands also causes a greater increase in the feedback overheads. Therefore, it is expected to provide a method to reduce the PMI feedback overheads.

It should be understood that the foregoing listed manner of feeding back the precoding matrix through the PMI is merely an example, and shall not constitute any limitation on this application. For example, the terminal device may alternatively feed back the channel matrix to the network device through the PMI, and the network device may determine the channel matrix based on the PMI, to determine the precoding matrix. This is not limited in this application.

4. Precoding vector: In the embodiments of this application, the precoding vector may be determined by using one vector in the precoding matrix, for example, one column vector. In other words, the precoding matrix may include one or more column vectors, and each column vector may be used to determine one precoding vector. When the precoding matrix includes only one column vector, the precoding matrix may also be referred to as a precoding vector.

The precoding matrix may be determined by using a precoding vector of one or more transport layers, and each vector in the precoding matrix may correspond to one transport layer. Assuming that the precoding vector may be $N_1 \times 1$ dimensional, if a quantity of transport layers is R (where R is a positive integer), the precoding matrix may be $N_1 \times R$ dimensional. The quantity of transport layers may be indicated by a rank indicator (RI), $N_1$ may represent a quantity of antenna ports, and $N_1$ is a positive integer.

When a plurality of polarization directions are configured for a transmit antenna, the precoding vector may alternatively refer to a component, in the precoding matrix, corresponding to one polarization direction and one transport layer. Assuming that a quantity of the polarization directions is P (where P is a positive integer), and a quantity of antenna ports in one polarization direction is $N_2$, a precoding vector corresponding to one transport layer is $(P \times N_2) \times 1$ dimensional, and a precoding vector in one polarization direction may be $N_2 \times 1$ dimensional. $N_2$ is a positive integer.

Therefore, the precoding vector may correspond to one transport layer, may correspond to one polarization direction at one transport layer, or may correspond to another parameter. This is not limited in this application.

5. Antenna port: The antenna port may be referred to as a port for short. The antenna port may be understood as a transmit antenna identified by a receive device, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a reference signal port, for example, a CSI-RS port or a sounding reference signal (SRS) port.

6. Beam and beam vector: The beam may be understood as distribution of signal strength in a direction in space. A technology of beam forming may be a beamforming technology or another technology. The beamforming technology may be specifically a digital beamforming technology, an analog beamforming technology, or a hybrid digital/analog beamforming technology. In the embodiments of this application, the beam may be formed by using the digital beamforming technolog.

The beam vector may correspond to the beam, and may be the precoding vector in the precoding matrix, or may be a beamforming vector. Each element in the beam vector may represent a weight of each antenna port. Weighted signals at different antenna ports are superimposed to form an area with relatively strong signal strength.

In the embodiments of this application, the beam vector may also be referred to as a space domain vector. Optionally, a length (or a dimension) of the beam vector is a quantity of antenna ports in one polarization direction.

It is assumed that the length of the beam vector is $N_s$. The beam vector may be a column vector that is $N_s \times 1$ dimensional, or may be a row vector that is $1 \times N_s$ dimensional. This is not limited in this application.

7. Frequency domain unit: The frequency domain unit is a unit of a frequency domain resource, and may represent different frequency domain resource granularities. For example, the frequency domain unit may include but is not limited to a sub-band, a resource block (RB), a subcarrier, a resource block group (RBG), or a precoding resource block group (PRG).

8. Frequency domain vector: The frequency domain vector is a vector that is proposed in the embodiments of this application and that is used to indicate a change rule of a channel in frequency domain. The frequency domain vector may be specifically used to represent a change rule of a weighting coefficient of each beam vector of frequency domain units. This change rule may be related to a multipath delay. When a signal is transmitted through a radio channel, there may be different transmission delays on different propagation paths. Therefore, different frequency domain vectors may be used to represent rules that the channel changes in frequency domain due to the delays on the different propagation paths.

A dimension of the frequency domain vector may be a quantity of frequency domain units on which CSI measurement needs to be performed. Because quantities of frequency domain units on which CSI measurement needs to be performed may be different at different moments, the dimension of the frequency domain vector may also change. In other words, the dimension of the frequency domain vector is variable.

Optionally, a length (or the dimension) of the frequency domain vector is a quantity of frequency domain units included in a frequency-domain occupied bandwidth of a CSI measurement resource.

The frequency-domain occupied bandwidth of the CSI measurement resource may be a bandwidth used to transmit a reference signal. The reference signal herein may be a reference signal, for example, a CSI-RS, used for channel measurement. The frequency-domain occupied bandwidth of the CSI measurement resource may be, for example, less than or equal to a pilot transmission bandwidth (or referred to as a measurement bandwidth). In NR, for example, a CSI occupied bandwidth range (CSI-Frequency Occupation) may be used to indicate the frequency-domain occupied bandwidth of the CSI measurement resource.

It should be understood that the frequency-domain occupied bandwidth of the CSI measurement resource is named only for ease of description, and shall not constitute any limitation on this application. This application does not exclude a possibility of expressing a same meaning by using another name.

Optionally, the length of the frequency domain vector is a length of signaling used to indicate locations and a quantity of to-be-reported frequency domain units.

In NR, the signaling used to indicate the locations and the quantity of to-be-reported frequency domain units may be a reporting band. For example, the signaling may indicate, through a bitmap, the locations and the quantity of to-be-reported frequency domain units. Therefore, the dimension of the frequency domain vector may be a quantity of bits of the bitmap. It should be understood that the reporting band is merely a possible name of the signaling, and shall not constitute any limitation on this application. This application does not exclude a possibility of naming the signaling by using another name to implement a same or similar function.

Optionally, the length of the frequency domain vector is the quantity of to-be-reported frequency domain units.

For example, the quantity of to-be-reported frequency domain units may be indicated by using the foregoing signaling, namely, the reporting band. The to-be-reported frequency domain units may be all frequency domain units in the frequency-domain occupied bandwidth of the CST measurement resource, or may be some frequency domain units in the frequency-domain occupied bandwidth of the CSI measurement resource. Alternatively, the quantity of to-be-reported frequency domain units may be the same as a signaling length of the reporting band, or may be less than a signaling length of the reporting band. This is not limited in this application.

When a protocol defines one of the foregoing listed signaling as the length of the frequency domain vector, it may be considered that the length of the frequency domain vector is implicitly indicated by the signaling used to indicate the frequency-domain occupied bandwidth of the CSI measurement resource or the signaling used to indicate the locations and the quantity of to-be-reported frequency domain units. For ease of differentiation and description, information used to indicate the length of the frequency domain vector is denoted as fifth indication information. The fifth indication information may be the signaling used to indicate the frequency-domain occupied bandwidth of the CSI measurement resource, may be the signaling used to indicate the locations and the quantity of to-be-reported frequency domain units, or may be signaling newly added in a future protocol. This is not limited in this application.

Assuming that the length of the frequency domain vector is $N_f$, the frequency domain vector may be a column vector that is $N_f \times 1$ dimensional, or may be a row vector that is $1 \times N_f$ dimensional. This is not limited in this application.

9. Space-frequency matrix and space-frequency vector: Precoding vectors of different frequency domain units at a same transport layer may be used to construct a space-frequency matrix or a space-frequency vector corresponding to the transport layer. For ease of description, the space-frequency matrix and the space-frequency vector may be collectively referred to as space-frequency information below.

For ease of understanding and description, the space-frequency information is first described by using an example in which a quantity of polarization directions of a transmit antenna is 1. If the quantity of polarization directions of the transmit antenna is 1, precoding vectors of different frequency domain units at one transport layer may be used to construct space-frequency information corresponding to the polarization direction.

The space-frequency matrix is used as an example. In the embodiments of this application, for example, the terminal device may determine, through channel measurement or in another manner, to-be-fed-back precoding matrices on frequency domain units, and process the to-be-fed-back precoding matrices on the frequency domain units, to obtain a space-frequency matrix corresponding to one transport layer. For example, to-be-fed-back precoding vectors of the frequency domain units at the same transport layer may be combined to obtain the space-frequency matrix. The space-frequency matrix may be referred to as a to-be-fed-back space-frequency matrix.

A manner in which the terminal device determines the space-frequency vector is the same as a manner in which the terminal device determines the space-frequency matrix. A vector obtained by sequentially connecting elements (which correspond to elements in each column vector in the space-frequency matrix) in the precoding vectors of the frequency domain units at the same transport layer is the space-frequency vector. The space-frequency vector may be referred to as a to-be-fed-back space-frequency vector.

Specifically, the space-frequency matrix may be a matrix that is $N_s \times N_f$ dimensional. In other words, the space-frequency matrix may include $N_f$ column vectors that each have a length of $N_s$. The $N_f$ column vectors may correspond to $N_f$ frequency domain units, and each column vector may be used to determine a precoding vector of a corresponding frequency domain unit.

For example, the space-frequency matrix may be denoted as H, where $H=[w_0 \, w_1 \, \ldots \, w_{N_f-1}]$. $W_0$ to $W_{N_f-1}$ are the $N_f$ column vectors corresponding to the $N_f$ frequency domain units, and a length of each column vector may be $N_s$. The $N_f$ column vectors may be respectively used to determine precoding vectors of the $N_f$ frequency domain units.

The space-frequency vector may be a vector that is $(N_s \times N_f) \times 1$ dimensional. In other words, the space-frequency vector may include one column vector or row vector whose length is $N_s \times N_f$. In this case, because a vector may also be considered as a representation form of a matrix, the space-frequency vector may also be referred to as or replaced with the space-frequency matrix. In the embodiments of this application, the space-frequency vector is merely used for ease of differentiation.

The space-frequency vector may be a vector obtained by connecting or organizing elements in the precoding vectors according to a predetermined rule.

In a possible design, the space-frequency vector may be denoted as h, where $h=[w_0^T \, w_1^T \, \ldots \, w_{N_f-1}^T]^T$. Meanings represented by the vectors in the formula have been described in detail above. For brevity, details are not described herein again.

It should be understood that the space-frequency vector in the foregoing example is merely an example. The space-frequency vector is not necessarily limited to connecting the precoding vectors in a head-to-tail way, and the precoding vectors may alternatively be arranged according to a fixed rule. For example, the arrangement rule may be based on elements. For example, the first elements in the vectors constitute a new vector.

It should be further understood that the foregoing merely describes, for ease of understanding, several possible forms of the space-frequency information when the quantity of polarization directions is 1, for example, the space-frequency matrix that is $N_s \times N_f$ dimensional or the space-frequency vector whose length is $N_s \times N_f$. However, this shall not constitute any limitation on this application. When the quantity of polarization directions is greater than 1, the space-frequency information may still be represented by using the foregoing several listed forms. However, the dimension of the space-frequency matrix or the space-frequency vector may vary with the quantity of polarization directions. For example, when the quantity of polarization directions is 2, the space-frequency information may be represented as a space-frequency matrix that is $2N_s \times N_f$ dimensional, or may be represented as a space-frequency vector whose length is $2N_s \times N_f$. 2 represents that there are two polarization directions.

10. Space-frequency unit: One space-frequency basic unit may be uniquely determined by using one beam vector and one frequency domain vector. In the embodiments of this application, the space-frequency basic unit may be referred to as a space-frequency unit. The beam vector may be obtained from a predefined beam vector set, and the frequency domain vector may be obtained from a predefined frequency domain vector set. The space-frequency unit may also be obtained from a predefined space-frequency unit set. Each space-frequency unit in the space-frequency unit set may be uniquely determined by using one beam vector and one frequency domain vector. Therefore, the beam vector set, the frequency domain vector set, and the space-frequency unit set may be mutually converted.

In the embodiments of this application, the space-frequency unit may be, for example, a space-frequency component matrix, a space-frequency component vector, or a space-frequency vector pair.

The space-frequency component matrix may be a matrix that is $N_s \times N_f$ dimensional. For example, when both the beam vector and the frequency domain vector are column vectors, one space-frequency component matrix may be a product of one beam vector and a conjugate transpose of one frequency domain vector. When the beam vector is a column vector and the frequency domain vector is a row, vector, one space-frequency component matrix may alternatively be a product of one beam vector and one frequency domain vector. The space-frequency matrix may be approximately a weighted sum of one or more space-frequency component matrices. The terminal device may indicate the to-be-fed-back space-frequency matrix by using the weighted sum of the one or more space-frequency component matrices.

The space-frequency component vector may be a vector whose length is $N_s \times N_f$. For example, when both the beam vector and the frequency domain vector are column vectors, one space-frequency component vector may be a Kronecker product of one beam vector and one frequency domain vector, or may be a Kronecker product of one frequency domain vector and one beam vector. The space-frequency vector may be approximately a weighted sum of one or more space-frequency component vectors. The terminal device may indicate the to-be-fed-back space-frequency vector by using the weighted sum of the one or more space-frequency component vectors. In addition, because a vector may also be considered as a representation form of a matrix, the space-frequency component vector may also be referred to as or replaced with the space-frequency component matrix. In the embodiments of this application, the space-frequency component vector is merely used for ease of differentiation.

If the space-frequency component vector is determined based on the Kronecker product of the frequency domain vector and the beam vector, the space-frequency vector determined based on the weighted sum of the plurality of space-frequency component vectors may be obtained by sequentially connecting $N_f$ column vectors that each have a length of $N_s$. The $N_f$ column vectors may correspond to $N_f$ frequency domain units, and each column vector may be used to determine a precoding vector of a corresponding frequency domain unit.

If the space-frequency component vector is determined based on the Kronecker product of the beam vector and the frequency domain vector, the space-frequency vector determined based on the weighted sum of the plurality of space-frequency component vectors may be obtained by sequentially connecting $N_s$ column vectors that each have a length of $N_f$. $N_f$ elements in each column vector may correspond to $N_f$ frequency domain units. Elements $n_f$ in the $N_s$ column vectors are sequentially connected to obtain a vector whose length is $N_s$, and the vector may be used to determine a precoding vector of a frequency domain unit $n_f$, $0 \leq n_1 \leq N_f-1$, and $n_f$ is an integer.

The space-frequency component matrix and the space-frequency component vector each may be obtained through an operation of one beam vector and one frequency domain vector. If no operation is performed on the beam vector and the frequency domain vector, the beam vector and the frequency domain vector may be used to determine one space-frequency vector pair. The space-frequency vector pair may include one beam vector and one frequency domain vector. It may be understood that the space-frequency component matrix, the space-frequency component vector, and the space-frequency vector pair may be mutually converted, and may be determined by using the same beam vector and the same frequency domain vector. It may be considered that the three terms are equivalent.

In the embodiments of this application, the space-frequency unit may correspond to one polarization direction. In addition, weighted sums of the basic units may be used to construct space-frequency matrices or space-frequency vectors in a plurality of polarization directions. Therefore, space-frequency information corresponding to each polarization direction may be represented by a weighted sum of a plurality of space-frequency units. In other words, the space-frequency information corresponding to each polarization direction may be approximately represented as the weighted sum of the plurality of space-frequency units. The plurality of space-frequency units used in different polarization directions may be the same; in other words, the plurality of same space-frequency units may be shared in a plurality of polarization directions. In other words, space-frequency matrices or space-frequency vectors in a plurality of polarization directions at a same transport layer may be constructed by using a same group of beam vectors and a same group of frequency domain vectors. However, weighting coefficients of the space-frequency component matrices or space-frequency component vectors in the different polarization directions may be different.

It should be understood that specific forms of the space-frequency matrix and the space-frequency vector are not limited to the foregoing examples. For brevity, examples are not listed one by one herein. In the embodiments shown below, a specific process in which the terminal device indicates the precoding vector and the network device determines the precoding vector is described in detail with reference to two forms in which the space-frequency component matrix is the product of the beam vector and the conjugate transpose of the frequency domain vector and the space-frequency component vector is the Kronecker product of the frequency domain vector and the beam vector However, this shall not constitute any limitation on this application. Based on a same concept, a person skilled in the art may perform equivalent transformation or replacement on the space-frequency component matrix or the space-frequency component vector, and the equivalent transformation and replacement shall fall within the protection scope of this application.

11. Beam vector set, frequency domain vector set, and space-frequency unit set: The beam vector set may include a plurality of beam vectors. A length of each beam vector may be $N_s$, and $N_s$ may represent a quantity of antenna ports in each polarization direction.

In a possible design, the beam vector set may include $N_s$ beam vectors, and the $N_s$ beam vectors may be orthogonal to each other. Each beam vector in the beam vector set may be obtained from a two-dimensional (2D)-DFT matrix. 2D may represent two different directions, for example, a horizontal direction and a vertical direction.

For example, the $N_s$ beam vectors may be denoted as $b_{s,0}$, $b_{s,1}, \ldots$, and $b_{s, N_s-1}$. The $N_s$ beam vectors may be used to construct a matrix $B_s$, where $B_s \triangleq [b_{s,0}\ b_{s,1}\ b_{s,N_s-1}]$.

In another possible design, the beam vector set may be extended to $O_s \times N_s$ beam vectors by using an oversampling factor $O_s$. In this case, the beam vector set may include $O_s$ subsets, and each subset may include $N_s$ beam vectors. The $N_s$ beam vectors in each subset may be orthogonal to each other. Each beam vector in the beam vector set may be obtained from an oversampled 2D-DFT matrix. The oversampling factor $O_s$ is a positive integer. Specifically, $O_s = O_1 \times O_2$, $O_1$ may be an oversampling factor in the horizontal direction, and $O_2$ may be an oversampling factor in the vertical direction. $O_1 \geq 1$, $O_2 \geq 1$, $O_1$ and $O_2$ cannot be 1 at the same time, and $O_1$ and $O_2$ are both integers.

For example, $N_s$ beam vectors in a subset $o_s$ (where $0 \leq o_s$ $O_s-1$, and $o_s$ is an integer) in the beam vector set may respectively denoted as $b_{s,0}^{o_s}, b_{s,1}^{o_s}, \ldots$, and $b_{s,N_s-1}^{o_s}$. In this case, a matrix $B_s^{o_s}$ may be constructed based on the $N_s$ beam vectors in the subset $o_s$, where $B_s^{o_s} \triangleq [b_{s,0}^{o_s}\ b_{s,1}^{o_s}\ \ldots\ b_{s,N_s-1}^{o_s}]$.

The frequency domain vector set may include a plurality of frequency domain vectors. A length of each frequency domain vector may be denoted as $N_f$. A meaning of $N_f$ has been described in detail above. For brevity, details are not described herein again.

In a possible design, the frequency domain vector set may include $N_f$ frequency domain vectors. The $N_f$ frequency domain vectors may be orthogonal to each other. Each frequency domain vector in the frequency domain vector set may be obtained from a DFT matrix.

For example, the $N_f$ frequency domain vectors may be denoted as $b_{f,0}, b_{f,1}, \ldots$, and $b_{f, N_f-1}$. The $N_f$ frequency domain vectors may be used to construct a matrix $B_f$, where $B_f \triangleq [b_{f,0}\ b_{f,1}\ \ldots\ b_{f,N_f-1}]$.

In another possible design, the frequency domain vector set may be extended to $O_f \times N_f$ frequency domain vectors by using an oversampling factor $O_f$. In this case, the frequency domain vector set may include $O_f$ subsets, and each subset may include $N_f$ frequency domain vectors. The $N_f$ frequency domain vectors in each subset may be orthogonal to each other. Each frequency domain vector in the frequency domain vector set may be obtained from an oversampled DFT matrix. The oversampling factor $O_f$ is a positive integer.

For example, $N_f$ frequency domain vectors in a subset $o_f$ (where $0 \leq o_f \leq O_f-1$, and $o_f$ is an integer) in the frequency domain vector set may be respectively denoted as $b_{f,0}^{o_f}$, $b_{f,1}^{o_f}, \ldots$, and $b_{f,N_f-1}^{o_f}$. In this case, a matrix $B_f^{o_f}$ may be constructed based on $N_s$ beam vectors in the subset $o_f$, where $B_f^{o_f} \triangleq [b_{f,0}^{o_f}\ b_{f,1}^{o_f} \ldots b_{f,N_f-1}^{o_f}]$.

The space-frequency unit set may include, for example, a space-frequency component matrix set or a space-frequency component vector set.

The space-frequency component matrix set may include a plurality of space-frequency component matrices. Each space-frequency component matrix may be a matrix that is $N_s \times N_f$ dimensional.

In a possible design, the space-frequency component matrix set may include $N_s \times N_f$ space-frequency component matrices. Each space-frequency component matrix in the space-frequency component matrix set may be uniquely determined by using one beam vector in the beam vector set and one frequency domain vector in the frequency domain vector set. Therefore, the beam vector set, the frequency domain vector set, and the space-frequency component matrix set may be mutually converted.

Specifically, it is assumed that $N_s$ beam vectors in the beam vector set are respectively denoted as $b_{s,0}, b_{s,1}, \ldots,$ and $b_{s,N_s-1}$. $N_f$ frequency domain vectors in the frequency domain vector set are respectively denoted as $b_{f,0}, b_{f,1}, \ldots,$ and $b_{f,N_f-1}$. In this case, the beam vector set and the frequency domain vector set may be used to construct the space-frequency component matrix set, and the space-frequency component matrix set may include $N_s \times N_f$ space-frequency component matrices.

An arrangement sequence of the $N_s \times N_f$ space-frequency component matrices may be predefined.

For example, the frequency domain vectors 0 to $N_f-1$ may be first traversed, and then the beam vectors 0 to $N_s-1$ are traversed, to obtain the $N_s \times N_f$ space-frequency component matrices.

If each space-frequency component matrix is a product of one beam vector and a conjugate transpose of one frequency domain vector, the arrangement sequence of the space-frequency component matrices in the space-frequency component matrix set may be represented as $b_{s,0}(b_{f,0})^*, b_{s,0}(b_{f,1})^*, \ldots, b_{s,0}(b_{f,N_f-1})^*, b_{s,1}(b_{f,0})^*, b_{s,1}(b_{f,1})^*, \ldots, b_{s,1}(b_{f,N_f-1})^*, \ldots, b_{s,N_s-1}(b_{f,0})^*, b_{s,N_s-1}(b_{f,1})^*, \ldots,$ and $b_{s,N_s-1}(b_{f,N_f-1})^*$.

If each space-frequency component matrix is a Kronecker product of one frequency domain vector and one beam vector, the arrangement sequence of the space-frequency component matrices in the space-frequency component matrix set may be represented as $b_{f,0} \otimes b_{s,0}, b_{f,1} \otimes b_{s,0}, \ldots, b_{f,N_f-1} \otimes b_{s,0}, b_{f,0} \otimes b_{s,1}, b_{f,1} \otimes b_{s,1}, \ldots, b_{f,N_f-1} \otimes b_{s,1}, \ldots, b_{f,0} \otimes b_{s,N_s-1}, b_{f,1} \otimes b_{s,N_s-1}, \ldots,$ and $b_{f,N_f-1} \otimes b_{s,N_s-1}$.

The beam vectors 0 to $N_s-1$ may be first traversed, and then the frequency domain vectors 0 to $N_f-1$ are traversed, to obtain the $N_s \times N_f$ space-frequency component matrices.

If each space-frequency component matrix is a product of one beam vector and a conjugate transpose of one frequency domain vector, the arrangement sequence of the space-frequency component matrices in the space-frequency component matrix set may be represented $b_{s,0}(b_{f,N_f-1})^*, b_{s,1}(b_{f,N_f-1})^*, \ldots,$ and $b_{s,N_s-1}(b_{f,N_f-1})^*$.

It can be learned that, when the space-frequency component matrix set and the beam vector set are determined, the frequency domain vector set may also be deduced; or when the space-frequency component matrix set and the frequency domain vector set are determined, the beam vector set may also be deduced.

In another possible design, the space-frequency component matrix set may include $O_c \times N_s \times N_f$ space-frequency component matrices. To be specific, the space-frequency component matrix set may be extended to $O_c$ subsets by using an oversampling factor $O_c$. $O_c$ may be $O_s$, $O_f$, or $O_s \times O_f$. A value of $O_c$ may be related to whether the beam vector set and the frequency domain vector set that are used to construct the space-frequency component matrix are oversampled. For example, if the beam vector set is not oversampled, and the frequency domain vector set is oversampled, the oversampling factor of the space-frequency component matrix set may be $O_f$. If the frequency domain vector set is oversampled, and the beam vector set is not oversampled, the oversampling factor of the space-frequency component matrix set may be $O_s$. If both the beam vector set and the frequency domain vector set are oversampled, the oversampling factor of the space-frequency component matrix set may be $O_s \times O_f$.

Each space-frequency component matrix in the space-frequency component matrix set may be uniquely determined by using one beam vector in the beam vector set and one frequency domain vector in the frequency domain vector set. Therefore, the beam vector set, the frequency domain vector set, and the space-frequency component matrix set may be mutually converted.

With reference to a case in which an oversampling rate is not considered, the foregoing has described in detail a conversion relationship among the beam vector set, the frequency domain vector set, and the space-frequency component matrix set. When the oversampling rate is considered, the conversion relationship between the beam vector set, the frequency domain vector set, and the space-frequency component matrix set is similar to the relationship described above. For brevity, details are not described herein again.

Similar to the space-frequency component matrix set, the space-frequency component vector set may include a plurality of space-frequency component vectors. Each space-frequency component vector may be a vector whose length is $N_s \times N_f$.

In a possible design, the space-frequency component vector set may include $N_s \times N_f$ space-frequency component vectors. In another possible design, the space-frequency component vector set is extended to $O_c \times N_s \times N_f$ space-frequency component vectors by using an oversampling factor $O_c$.

If each space-frequency component vector is a Kronecker product of one frequency domain vector and one beam vector, the arrangement sequence of the space-frequency component vectors in the space-frequency component vector set may be represented as $b_{f,0} \otimes b_{s,0}, b_{f,0} \otimes b_{s,1}, \ldots, b_{f,0} \otimes b_{s,N_s-1}, b_{f,1} \otimes b_{s,0}, b_{f,1} \otimes b_{s,1}, \ldots, b_{f,1} \otimes b_{s,N_s-1}, \ldots, b_{f,N_f-1} \otimes b_{s,0}, b_{f,N_f-1} \otimes b_{s,1}, \ldots,$ and $b_{f,N_f-1} \otimes b_{s,N_s-1}$.

Each space-frequency component vector in the space-frequency component vector set may be uniquely determined by using one beam vector in the beam vector set and one frequency domain vector in the frequency domain vector set. Therefore, the beam vector set, the frequency domain vector set, and the space-frequency component vector set may be mutually converted.

The foregoing has described in detail the relationship among the space-frequency component matrix set, the beam vector set, and the frequency domain vector set. For brevity, detailed descriptions of the space-frequency component vector set are omitted herein.

12. Weighting coefficient, amplitude, and phase: The weighting coefficient is used to represent a weight of each space-frequency unit used for weighted summation. For example, the space-frequency matrix described above may be approximately a weighted sum of a plurality of space-frequency component matrices, and the weighting coefficient may represent a weight of each of the plurality of space-frequency component matrices.

Each weighting coefficient may include an amplitude and a phase. For example, in a weighting coefficient $ae^{j\theta}$, a is an amplitude, and $\theta$ is a phase.

In a plurality of weighting coefficients corresponding to a plurality of space-frequency units, amplitudes (or moduli) of some weighting coefficients may be zero or close to zero. When the amplitudes of the weighting coefficients whose amplitudes are zero or close to zero are quantized, quantization values of the amplitudes may be zero. A weighting coefficient whose amplitude is quantized by using a quantization value being zero may be referred to as a zero-amplitude weighting coefficient. Correspondingly, some weighting coefficients have larger amplitudes. When the amplitudes of these weighting coefficients with larger amplitudes are quantized, quantization values of the amplitudes are not zero. A weighting coefficient whose amplitude is quantized by using a quantization value not being zero may be referred to as a non-zero-amplitude weighting coefficient. In other words, the plurality of weighting coefficients include one or more non-zero-amplitude weighting coefficients and one or more zero-amplitude weighting coefficients.

It should be understood that the weighting coefficient may be indicated by using the quantization value, may be indicated by using an index of the quantization value, or may be indicated by using a non-quantization value. An indication manner of the weighting coefficient is not limited in this application, provided that a peer end can learn of the weighting coefficient. In the following, for ease of description, information used to indicate the weighting coefficient is referred to as quantization information of the weighting coefficient. The quantization information may be, for example, the quantization value, the index, or any other information that can be used to indicate the weighting coefficient.

13. Normalization, normalized coefficient, and normalized space-frequency unit: Before weighting coefficients are quantized, normalization processing may be performed on the weighting coefficients. A weighting coefficient used as a normalization reference may be a weighting coefficient with a largest amplitude (or modulus length) in a plurality of weighting coefficients. The weighting coefficient used as the normalization reference may be referred to as a normalized coefficient.

Before the weighting coefficients are quantized, the normalized coefficient may be normalized to 1. For example, an amplitude of the normalized coefficient may be normalized to 1, a phase of the normalized coefficient may be normalized to 0 or $2\pi$, and another weighting coefficient may be represented as a relative value of the another weighting coefficient compared with the normalized coefficient on which normalization processing has not been performed. Then, other weighting coefficients different from the normalized coefficient may be quantized. In other words, a quantization value of an amplitude of the weighting coefficient may be the same as or close to a relative value of a amplitude of the weighting coefficient compared with the amplitude of the normalized coefficient on which normalization processing has not been performed. A quantization value of a phase of the weighting coefficient may be the same as or close to a relative value of a phase of the weighting coefficient compared with the phase of the normalized coefficient on which normalization processing has not been performed.

A value range of amplitudes of the other weighting coefficients may be 0 to 1; and a value range of phases of the other weighting coefficients may be 0 to $2\pi$, or $-\pi$ to $\pi$. A vector corresponding to the normalized coefficient may be referred to as a normalized vector. In other words, a weighting coefficient of the normalized vector is 1. It may be understood that the value or the value range herein may be a value or a value range in decimal notation.

One normalized coefficient may correspond to one space-frequency unit, and the space-frequency unit corresponding to the normalized coefficient is referred to as a normalized space-frequency unit. The normalized space-frequency unit may be, for example, a normalized space-frequency component matrix, a normalized space-frequency component vector, or a normalized space-frequency vector pair. This is not limited in this application. The normalized coefficient may be a weighting coefficient of the corresponding normalized space-frequency unit.

In the embodiments of this application, there may be a plurality of indication manners of the normalized space-frequency unit. For example, the normalized space-frequency unit may be indicated with reference to a manner that is used to indicate a normalized vector and that is defined in a type II codebook in the NR protocol TS38.214 R15. For brevity, details are not described in this application.

In the embodiments shown below, during normalization, a maximum weighting coefficient may be determined in a unit of one polarization direction, a maximum weighting coefficient may be determined in a unit of one transport layer (for example, one or more polarization directions at one transport layer), or a maximum weighting coefficient may be determined in a unit of all transport layers. Therefore, normalization may be performed in different units such as each polarization direction, each transport layer, or all the transport layers. It should be understood that a normalization unit is not limited to the foregoing listed units. This is not limited in this application.

14. Common information and specific information: In a method 200 shown below, a specific process in which the terminal device generates first indication information is described in detail by using one transport layer in one or more transport layers and one polarization direction in one or more polarization directions as an example. Actually, the terminal device may indicate precoding vectors of frequency domain units based on a plurality of transport layers and a plurality of polarization directions.

In the embodiments of this application, indication information used to indicate precoding vectors of frequency domain units in one polarization direction at one transport layer is referred to as the first indication information. At one transport layer, the terminal device may generate one or more pieces of first indication information based on one or more polarization directions. The plurality of pieces of first indication information may have common information and specific information. The common information of the plurality of pieces of first indication information may be generated and sent only once. For example, the common information may be carried only in one of the plurality of pieces of first indication information. The specific information may be separately carried in the first indication information corresponding to the polarization directions.

One or more pieces of first indication information corresponding to one transport layer may be referred to as indication information corresponding to the transport layer. For example, when corresponding to a first transport layer, the indication information may be referred to as indication information corresponding to the first transport layer; when corresponding to a second transport layer, the indication information may be referred to as indication information corresponding to the second transport layer; and the rest may be deduced by analogy. Examples are not listed one by one herein.

A plurality of pieces of indication information corresponding to a plurality of transport layers may also have common information and specific information. The common information of the plurality of pieces of indication information corresponding to the plurality of transport layers may be generated and sent only once. For example, the common information may be carried only in indication information corresponding to one transport layer. The specific information may be separately carried in the indication information corresponding to the transport layers.

As described above, in downlink channel measurement, a higher approximation between the precoding matrix determined by the network device based on the PMI and the precoding matrix determined by the terminal device indicates that the precoding matrix determined by the network device for data transmission can better adapt to a channel state, and therefore, signal received quality can be improved.

To improve spectrum resource utilization and improve a data transmission capability of a communications system, the network device may transmit data to the terminal device through a plurality of transport layers. However, as a quantity of the transport layers increases, overheads caused by feedback performed by the terminal device based on each transport layer multiply. In addition, a larger quantity of frequency domain units (for example, sub-bands) also causes a greater increase in the feedback overheads. Therefore, it is expected to provide a method to reduce the feedback overheads.

In view of this, this application provides a precoding vector indication method and a precoding vector determining method, to reduce PMI feedback overheads.

For ease of understanding of the embodiments of this application, the following descriptions are provided.

First, for ease of understanding and description, main parameters used in this application are described as follows:

M is a quantity of weighting coefficients, or a quantity of space-frequency component matrices (or space-frequency component vectors) used for weighted summation.

S is a quantity of non-zero-amplitude weighting coefficients, and S is a positive integer.

T is a quantity of normalized coefficients, T is a positive integer, and T<S.

R is a quantity of zero-amplitude weighting coefficients, and M=S+R.

L is a quantity of beam vectors selected from a beam vector set.

K is a quantity of frequency domain vectors selected from a frequency domain vector set.

x is a quantity of quantization bits of an amplitude of a weighting coefficient.

y is a quantity of quantization bits of a phase of a weighting coefficient.

Second, in the embodiments, for ease of description, when numbering is involved, numbers may be consecutive and start from 0. For example, R transport layers may include a transport layer 0 to a transport layer R−1, and L beam vectors may include a beam vector 0 to a beam vector L−1. The rest may be deduced by analogy. Examples are not listed one by one herein. Certainly, specific implementation is not limited thereto. For example, numbers may alternatively be consecutive and start from 1. It should be understood that the foregoing descriptions are all provided for ease of describing the technical solutions provided in the embodiments of this application, but are not intended to limit the scope of this application.

Third, in the embodiments of this application, transformation of a matrix and a vector is involved in many places. For ease of understanding, a unified description is provided herein. A superscript T represents a transpose. For example, $A^T$ represents a transpose of a matrix (or a vector) A. A superscript * represents a conjugate transpose. For example, A* represents a conjugate transpose of the matrix (or the vector) A. For brevity, descriptions of a same or similar case are omitted belo.

Fourth, in the embodiments shown below, an example in which both a beam vector and a frequency domain vector are column vectors is used to describe the embodiments provided in this application. However, this shall not constitute any limitation on this application. Based on a same concept, a person skilled in the art may further figure out more possible representations.

Fifth, a Kronecker product operation of matrices is involved in the embodiments of this application. In the embodiments of this application, the Kronecker product operation may be represented by $\otimes$. For example, a Kronecker product of matrices A and B may be represented as $A \otimes B$.

A Kronecker product is a block matrix obtained by multiplying all elements in a matrix by all elements in another matrix. For example, a Kronecker product of a matrix A that is k×l dimensional and a matrix B that is p×q dimensional is a matrix that is kp×ql dimensional. The matrix is specifically as follows:

$$A \otimes B = \begin{bmatrix} a_{11}B & \cdots & a_{1l}B \\ \vdots & \ddots & \vdots \\ a_{k1}B & \cdots & a_{kl}B \end{bmatrix}, \text{ where } A = \begin{pmatrix} a_{11} & \cdots & a_{1l} \\ \vdots & \ddots & \vdots \\ a_{k1} & \cdots & a_{kl} \end{pmatrix}.$$

For a specific definition of the Kronecker product, refer to the current technology. For brevity, details are not described in this specification.

Sixth, in the embodiments of this application, projection between vectors is involved in many places. For example, projecting a vector a to a vector b may be understood as calculating an inner product of the vector a and the vector b.

Seventh, in the embodiments of this application, "used to indicate" may include "used to directly indicate" and "used to indirectly indicate". For example, when a piece of indication information is used to indicate information I, the indication information may be used to directly or indirectly indicate I, but it does not indicate that the indication information definitely carries I.

The information indicated by the indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may alternatively be indicated by using an arrangement sequence of a plurality of pieces of information that is pre-agreed on (for example, stipulated in a protocol), to reduce indication overheads to some extent. In addition, a common part of a plurality of pieces of information may be further identified and indicated once, to reduce indication overheads caused by separately indicating same information. For example, a person skilled in the art should understand that a precoding matrix includes precoding vectors, and the precoding vectors in the precoding matrix may have a same part in terms of composition or another attribute.

In addition, specific indication manners may alternatively be various existing indication manners, for example, but not limited to, the foregoing indication manners and various combinations thereof. For specific details of various indication manners, refer to the current technology. Details are not described in this specification. It can be learned from the foregoing descriptions that, for example, when a plurality of pieces of information of a same type need to be indicated, indication manners of different information may be different. In a specific implementation process, a required indication manner may be selected based on a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may have another equivalent form. For example, am row vector may be represented as a column vector, a matrix may be represented by using a transposed matrix of the matrix or a matrix may alternatively be represented in a form of a vector or an array, where the vector or the array may be formed by connecting row vectors or column vectors of the matrix, and a Kronecker product of two vectors may alternatively be represented in a form such as a product of a vector and a transposed vector of the other vector. The technical solutions provided in the embodiments of this application should be understood as covering various forms. For example, some or all features in the embodiments of this application should be understood as covering various representation forms of the features.

The to-be-indicated information may be sent as a whole, or may be sent separately after being divided into a plurality of pieces of sub-information. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmit end device by sending configuration information to a receive end device. The configuration information may include, for example, but not limited to, one of or a combination of at least two of radio resource control signaling such as RRC signaling, MAC layer signaling such as MAC-CE signaling, and physical layer signaling such as downlink control information (DCI).

Eighth, in this application, definitions of many features (for example, a Kronecker product, a PMI, a frequency domain unit, a beam, a beam vector, and a weighting coefficient of the beam vector) are merely listed to explain functions of the features by using an example. For detailed content of the features, refer to the current technology.

Ninth, the terms "first", "second", "third", and "fourth", and various numbers in the following embodiments are merely used for differentiation for ease of description, and are not intended to limit the scope of the embodiments of this application. For example, the terms are used to distinguish between different indication information and different transport layers.

Tenth, in the following embodiments, "obtained in advance" may include being indicated by signaling of a network device or being predefined, for example, defined in a protocol. "Predefined" may be implemented by prestoring corresponding code or a corresponding table in a device (for example, including a terminal device and a network device), or in another manner that may be used to indicate related information. A specific implementation is not limited in this application.

Eleventh, "storing" in the embodiments of this application may refer to storing in one or more memories. The one or more memories may be separately disposed, or may be integrated into an encoder or a decoder, a processor, or a communications apparatus. Alternatively, some of the one or more memories may be separately disposed, and the others are integrated into a decoder, a processor, or a communications apparatus. The memory may be a storage medium in any form. This is not limited in this application.

Twelfth, the "protocol" in the embodiments of this application may be a standard protocol in the communications field, for example, may include an LTE protocol, an NR protocol, and a related protocol used for a future communications system. This is not limited in this application.

Thirteenth, "at least one" indicates one or more, and "a plurality of" indicates two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof indicates any combination of the following, including any combination of one or more of the following. For example, at least one of a, b, and c may represent: a, b, c, a and b, a and c, b and c, or a, b, and c, where a, b, and c each may be singular or plural.

The following describes in detail, with reference to the accompanying drawings, a precoding vector indication and determining method provided in the embodiments of this application.

It should be understood that the method provided in the embodiments of this application may be used in a system in which communication is performed by using a multiple-antenna technology, for example, the communications system 100 shown in FIG. 1. The communications system may include at least one network device and at least one terminal device. The network device and the terminal device may communicate with each other by using the multiple-antenna technology.

It should be further understood that, a specific structure of an execution body of the method provided in the embodiments of this application is not specifically limited in the following embodiments provided that a program that records code of the method provided in the embodiments of this application can be run to perform communication according to the method provided in the embodiments of this application. For example, the execution body of the method provided in the embodiments of this application may be a terminal device, a network device, or a function module that can invoke and execute the program and that is in a terminal device or a network device.

Without loss of generality, the precoding vector indication and determining method provided in the embodiments of this application is described in detail below by using an example of interaction between the network device and the terminal device.

Figure 2:
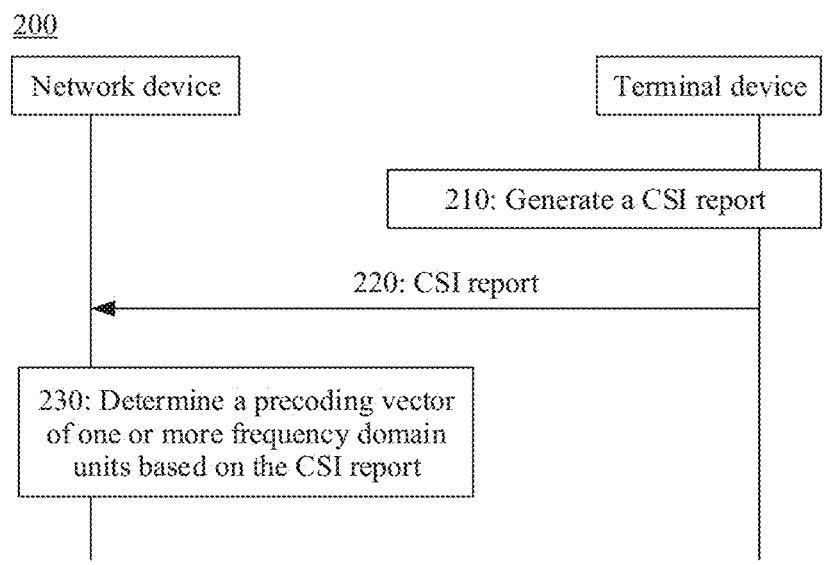
FIG. 2 is a schematic flowchart of a precoding vector indication and determining method according to an embodiment of this application.

FIG. 2 is a schematic flowchart of a precoding vector indication and determining method 200 shown from a perspective of device interaction according to an embodiment of this application. As shown in the figure, the method 200 may include operation 210 to operation 230. The steps in the method 200 are described in detail below.

For ease of understanding, a specific process in which a terminal device indicates a precoding vector based on one transport layer in one or more transport layers and one polarization direction in one or more polarization directions at the transport layer and a network device determines the precoding vector is first described in detail. It should be understood that a quantity of transport layers and a quantity of polarization directions of a transmit antenna are not limited in this application. In the following example, one transport layer may be any one of the one or more transport layers, and one polarization direction may be any one of the one or more polarization directions.

In operation 210, the terminal device generates a CSI report, where the CSI report is used to indicate M space-frequency units and a weighting coefficient of a part or all of the M space-frequency units.

The M space-frequency units and the weighting coefficient of the part or all of the M space-frequency units may be used to determine a precoding vector of each frequency domain unit. It should be understood that the M space-frequency units and the weighting coefficient of the part or all of the M space-frequency units may be used to determine a precoding vector in one polarization direction at one transport layer. For ease of differentiation and description, in this embodiment, information used to indicate the M space-frequency units and the weighting coefficient of the part or all of the M space-frequency units is referred to as first indication information. When there are a plurality of polarization directions, the CSI report may include a plurality of pieces of first indication information corresponding to the plurality of polarization directions. When there are a plurality of transport layers, the CSI report may include indication information corresponding to the plurality of transport layers. Indication information corresponding to each transport layer may include one or more pieces of first indication information corresponding to one or more polarization directions.

It should be understood that the first indication information may be a PMI, or may be some information elements in a PMI. This is not limited in this application. It should be understood that the PMI is merely a name of the information used to indicate a precoding matrix, and shall not constitute any limitation on this application. This application does not exclude a possibility that another name that can be used to implement a same or similar function of the PMI is defined in a future protocol to replace the PMI. For ease of description below, all information that may be used to indicate the precoding vector in this application is collectively referred to as a PMI.

For ease of understanding, a specific process in which the terminal device determines the first indication information is first described in detail.

Specifically, the terminal device may predetermine a precoding matrix of frequency domain units, to further determine a precoding vector of each frequency domain unit at a same transport layer. In this embodiment, the terminal device may determine, based on the predetermined to-be-fed-back precoding vector of each frequency domain unit, a space-frequency unit and a weighting coefficient that can be used to indicate the precoding vector of each frequency domain unit, so as to indicate the space-frequency unit and the weighting coefficient to the network device through the first indication information. For a specific method for determining, by the terminal device, the precoding matrix of the frequency domain units and the precoding vector of each frequency domain unit at the same transport layer, refer to the current technology. In addition, several possible specific methods have been listed above. For brevity, details are not described herein again. In this embodiment, the terminal device may indicate the precoding vector of each frequency domain unit based on a plurality of possible implementations. In different implementations, indication information of the precoding vector may be different. The terminal device may determine the indication information of the precoding vector based on different implementations, and then send the indication information of the precoding vector to the network device through the CSI report.

Specifically, the terminal device may indicate the precoding vector of each frequency domain unit based on any one of the following listed implementations.

Implementation 1: The terminal device indicates L selected beam vectors, K selected frequency domain vectors, and a weighting coefficient of a part or all of L×K space-frequency vector pairs determined by using the L beam vectors and the K frequency domain vectors.

Implementation 2: The terminal device indicates M selected space-frequency component matrices and a weighting coefficient of a part or all of the M space-frequency component matrices, or the terminal device indicates M selected space-frequency component vectors and a weighting coefficient of a part or all of the M space-frequency component vectors.

Implementation 3: The terminal device indicates L selected beam vectors, K selected frequency domain vectors, M space-frequency vector pairs in L×K space-frequency vector pairs determined by using the L beam vectors and the K frequency domain vectors, and a weighting coefficient of a part or all of the M space-frequency vector pairs.

The terminal device may determine, based on the predetermined precoding vector of each frequency domain unit at the transport layer, space-frequency information (for example, a space-frequency matrix or a space-frequency vector) corresponding to the transport layer. The space-frequency information may be considered as to-be-fed-back space-frequency information. The terminal device may determine, from a prestored vector set or matrix set and based on the three implementations listed above, a vector or a matrix to be fed back and a corresponding weighting coefficient.

It should be understood that, merely for ease of understanding, the space-frequency information is introduced herein to describe the specific process in which the terminal device determines the M space-frequency units and the weighting coefficient of the part or all of the space-frequency units. The space-frequency information may be an intermediate quantity in the process in which the terminal device determines the foregoing information. However, this shall not constitute any limitation on this application. In the process of determining the foregoing information, the terminal device may not generate or determine the space-frequency information, but directly determine the M space-frequency units and the weighting coefficient of the part or all of the space-frequency units based on the precoding vector of each frequency domain unit. This is not limited in this application.

The vector set or the matrix set prestored by the terminal device may be, for example, a beam vector set and a frequency domain vector set, a space-frequency component matrix set, a space-frequency component matrix set and a beam vector set, or a space-frequency component matrix set and a frequency domain vector set.

As described above, the beam vector set, the frequency domain vector set, and the space-frequency unit set may be mutually converted. When the space-frequency unit set and the beam vector set are determined, the frequency domain vector set may also be deduced; or when the space-frequency unit set and the frequency domain vector set are determined, the beam vector set may also be deduced. Therefore, a specific form of the set prestored by the terminal device is not limited in this application.

Correspondingly, the network device may also prestore the beam vector set and the frequency domain vector set, the space-frequency unit set, the space-frequency unit set and the beam vector set, the space-frequency unit set and the frequency domain vector set, or the like.

In addition, the network device and the terminal device may prestore the sets in a same form, or may prestore the sets in different forms. This is not limited in this application.

With reference to the foregoing several possible implementations, the following describes in detail the specific process in which the terminal device determines the indication information of the precoding vector.

Implementation 1

The terminal device may determine L stronger beam vectors, K stronger frequency domain vectors, and corresponding weighting coefficients based on the beam vector set, the frequency domain vector set, and a to-be-fed-back space-frequency matrix.

It is assumed that precoding vectors of $N_f$ frequency domain units determined by the terminal device are respectively denoted as $W_0, W_1, \ldots,$ and $W_{N_f-1}$. The precoding vectors of the $N_f$ frequency domain units may be used to construct a space-frequency matrix H, where $H=[w_0\ w_1\ \ldots\ w_{N_f-1}]$. The terminal device may further determine the L beam vectors and the K frequency domain vectors that can be used to construct the space-frequency matrix H.

Values of L and K may be both configured by the network device, may be predefined, or may be determined by the terminal device and then reported to the network device. This is not limited in this application.

If the value of L is configured by the network device, optionally, the method further includes: The terminal device receives second indication information, where the second indication information is used to indicate the value of L. Correspondingly, the network device sends the second indication information.

Optionally, the second indication information may be carried in higher layer signaling, for example, a radio resource control (RRC) message.

If the value of L is determined by the terminal device, optionally, the method further includes: The terminal device sends second indication information, where the second indication information is used to indicate the value of L. Correspondingly, the network device receives the second indication information.

Optionally, the second indication information may be carried in uplink control information (UCI), for example, CSI.

If the value of K is configured by the network device, optionally, the method further includes: The terminal device receives third indication information, where the third indication information is used to indicate the value of K. Correspondingly, the network device sends the third indication information.

Optionally, the third indication information may be carried in higher layer signaling, for example, an RRC message.

If the value of K is determined by the terminal device, optionally, the method further includes: The terminal device sends third indication information, where the third indication information is used to indicate the value of K. Correspondingly, the network device receives the third indication information.

Optionally, the third indication information is carried in UCI, for example, CSI.

It should be understood that the foregoing listed signaling used to carry the second indication information and the third indication information is merely an example, and shall not constitute any limitation on this application. Specific signaling that carries the second indication information and the third indication information is not limited in this application.

It should be further understood that the second indication information and the third indication information may be carried in same signaling, or may be carried in different signaling. This is not limited in this application.

In implementation 1, each of the L beam vectors and each of the K frequency domain vectors are combined in pairs, to obtain L×K space-frequency units. For example, the L beam vectors 0 to L−1 are first traversed, and then the K frequency domain vectors 0 to K−1 are traversed, to obtain the L×K space-frequency units. For another example, the K frequency domain vectors 0 to K−1 are first traversed, and then the L beam vectors 0 to L−1 are then traversed. This is not limited in this application.

The L×K space-frequency units may be L×K space-frequency vector pairs, may be L×K space-frequency component matrices, or may be L×K space-frequency component vectors. That is, in implementation 1, M=L×K.

The following describes in detail the specific process of determining the L beam vectors, the K frequency domain vectors, and the weighting coefficients.

If an oversampling rate is not considered for both the beam vector set and the frequency domain vector set, the beam vector set may include the $N_s$ beam vectors described above, and a constructed matrix is $B_s$; and the frequency domain vector set may include the $N_f$ frequency domain vectors described above, and a constructed matrix is $B_f$. The terminal device may determine a matrix W based on $W=B_s{}^*HB_f$. The matrix W may be $N_s \times N_f$ dimensional, $N_s$ rows in the matrix W may correspond to the $N_s$ beam vectors in the beam vector set (or the matrix $B_s$ constructed based on the beam vector set); and the $N_f$ columns in the matrix W may correspond to the $N_f$ frequency domain vectors in the frequency domain vector set (or the matrix $B_f$ constructed based on the frequency domain vector set). Each element in the matrix W may correspond to one of the $N_s$ beam vectors and one of the $N_f$ frequency domain vectors. In other words, each element in the matrix W may correspond to one space-frequency unit determined by using one of the $N_s$ beam vectors and one of the $N_f$ frequency domain vectors.

The terminal device may perform a modulo operation on each of the $N_s$ rows in the matrix W, and determine L rows with larger moduli based on a modulus length of each row. Row sequence numbers of the L rows in the matrix W may be sequence numbers of L stronger beam vectors in the beam vector set or column sequence numbers of L stronger beam vectors in $B_s$. The terminal device may further perform a modulo operation on each of the $N_f$ columns in the matrix W, and determine K columns with larger moduli based on a modulus length of each column. Column sequence numbers of the K columns in the matrix W may be sequence numbers of K stronger frequency domain vectors in the frequency domain vector set or column sequence numbers of K stronger frequency domain vectors in $B_f$.

In addition, elements in the L rows with larger moduli and elements in the K columns with larger moduli in the matrix W may be used to construct a matrix that is L×K dimensional. The matrix may be referred to as a weighting coefficient matrix $W_c$. For example, the weighting coefficient matrix $W_c$ may be as follows:

$$\begin{bmatrix} c_{0,0} & c_{0,1} & \cdots & c_{0,K-1} \\ c_{1,0} & c_{1,1} & \cdots & c_{1,K-1} \\ \vdots & \vdots & \cdots & \vdots \\ c_{L-1,0} & c_{L-1,1} & \cdots & c_{L-1,K-1} \end{bmatrix}.$$

It can be learned that the weighting coefficient matrix may include L×K elements, and each element may correspond to one of the L beam vectors and one of the K frequency domain vectors. In other swords, each element may correspond to one space-frequency unit determined by using one of the L beam vectors and one of the K frequency domain vectors. Specifically, a weighting coefficient $c_{l,k}$ may correspond to a beam vector l in the L beam vectors and a frequency domain vector k in the K frequency domain vectors. In addition, each weighting coefficient may include an amplitude and a phase. For example, the weighting coefficient $c_{l,k}$ includes an amplitude $a_{l,k}$ and a phase $\varphi_{l,k}$. $0 \leq l \leq L-1$, $0 \leq k \leq K-1$, and both l and k are integers.

It should be noted that the terminal device may first determine L×K weighting coefficients corresponding to the L×K space-frequency units. As described above, some weighting coefficients may have an amplitude of zero after being quantized. In this case, the zero-amplitude weighting coefficient may not be reported, or a phase of the zero-amplitude weighting coefficient may not be reported. Therefore, the terminal device may indicate, in the first indication information, a weighting coefficient of a part or all of the L×K space-frequency units. For brevity, descriptions of a same or similar case are omitted below.

It should be understood that the foregoing method for determining the L beam vectors and the K frequency domain vectors through the matrix operation is merely a possible implementation shown for ease of understanding, and it does not indicate that the terminal device definitely generates the matrix W in the process of determining the L beam vectors and the K frequency domain vectors. For example, the matrix W may alternatively be an ordered array obtained by sequentially connecting elements in the rows (or the columns), or may be an ordered array obtained by arranging elements in the matrix W in a predefined sequence.

It should be further understood that the foregoing specific method for determining, by the terminal device, the L stronger beam vectors in the beam vector set and the K stronger frequency domain vectors in the frequency domain vector set is merely an example for ease of understanding, and shall not constitute any limitation on this application. For example, the terminal device may alternatively determine the L stronger beam vectors by separately projecting the precoding vectors of the frequency domain units to beam vectors in the beam vector set, and may determine the K stronger frequency domain vectors by projecting weighting coefficients of the L beam vectors to frequency domain vectors in the frequency domain vector set. For another example, for the method for determining the L beam vectors by the terminal device, refer to a type II codebook feedback manner defined in the NR protocol TS38.214 R15. The K frequency domain vectors may be determined by comparing at least one composition element of the precoding vector of each frequency domain unit (for example, but not limited to a weighting coefficient of a beam vector constituting the precoding vector) in one polarization direction at a same layer. For the specific method for determining, by the terminal device, the L stronger beam vectors in the beam vector set and determining the K stronger frequency domain vectors in the frequency domain vector set, refer to the current technology. For brevity, details are not described herein.

It should be further understood that the foregoing method for determining the weighting coefficients based on the matrix W obtained through the matrix operation is merely a possible implementation shown for ease of understanding, and it does not indicate that the terminal device definitely generates the weighting coefficient matrix $W_c$ and the matrix W in the process of determining the weighting coefficients. As described above, the matrix W may be represented as an array set including a plurality of elements, and the weighting coefficient matrix $W_c$ may also be represented as an array set including a plurality of elements. For example, the elements in the array set may be formed by sequentially connecting elements in the rows (or the columns) in the weighting coefficient matrix, or arranging the elements in a predetermined sequence.

If the oversampling rate is considered, there may be the following three possible cases for the vectors included in the beam vector set and the frequency domain vector set.

Case 1: The beam vector set is extended to $O_s \times N_s$ beam vectors by using an oversampling factor $O_s$, and the frequency domain vector set is extended to $O_f \times N_f$ frequency domain vectors by using an oversampling factor $O_f$.

Case 2: The beam vector set is extended to $O_s \times N_s$ beam vectors by using an oversampling factor $O_s$, and the frequency domain vector set includes the $N_f$ frequency domain vectors.

Case 3: The beam vector set includes the $N_s$ beam vectors, and the frequency domain vector set is extended to $O_f \times N_f$ frequency domain vectors by using an oversampling factor $O_f$.

In the foregoing three possible cases, processing manners of the terminal device may be the same. The following uses case 1 as an example to describe in detail the specific process in which the terminal device determines the L beam vectors, the K frequency domain vectors, and the L×K weighting coefficients corresponding to the L×K space-frequency units.

If the beam vector set is extended to the $O_s \times N_s$ beam vectors by using the oversampling factor $O_s$, and the frequency domain vector set is extended to the $O_f \times N_f$ frequency domain vectors by using the oversampling factor $O_f$, the beam vector set may include the $O_s$ subsets described above, and a matrix constructed based on a subset $o_s$ is $B_s^{o_s}$ and the frequency domain vector set may include the $O_f$ subsets described above, and a matrix constructed based on a subset $o_f$ is $B_f^{o_f}$. The terminal device may determine a matrix $W_{o_s, o_f}$ based on $W_{o_s, o_f} = (B_s^{o_s})^* H B_f^{o_f}$. The matrix $W_{o_s, o_f}$ corresponds to the subset $o_s$ and the subset $o_f$. The matrix $W_{o_s, o_f}$ may be $N_s \times N_f$ dimensional. $N_s$ rows in the matrix $W_{o_s, o_f}$ may correspond to $N_s$ beam vectors in the subset $o_s$ in the beam vector set (or the matrix $B_s^{o_s}$ constructed based on the subset $o_s$); and $N_f$ columns in the matrix $W_{o_s, o_f}$ may correspond to $N_f$ frequency domain vectors in the subset $o_f$ in the frequency domain vector set (or the matrix $B_s^{o_s}$ constructed based on the subset $o_f$). Each element in the matrix $W_{o_s, o_f}$ may correspond to one of the $N_s$ beam vectors in the subset $o_s$ and one of the $N_f$ frequency domain vectors in the subset $o_f$. In other words, each element in the matrix may correspond to a space-frequency unit determined by using one beam vector and one frequency domain vector.

The terminal device may determine, in a matrix in $O_s \times O_f$ matrices, the L stronger beam vectors, the K stronger frequency domain vectors, and the corresponding weighting coefficients. In other words, the terminal device may determine, based on one of the $O_s$ subsets and one of the $O_f$ subsets, the L, stronger beam vectors, the K stronger frequency domain vectors, and the corresponding weighting coefficients. Specific subsets that are selected to determine the L stronger beam vectors, the K stronger frequency domain vectors, and the corresponding weighting coefficients may be predefined. This is not limited in this application.

Alternatively, the terminal device may determine, based on the $O_s \times O_f$ matrices, the L stronger beam vectors, the K stronger frequency domain vectors, and the corresponding weighting coefficients. For example, the L beam vectors, the K frequency domain vectors, and the corresponding weighting coefficients may be determined by selecting, based on sums of modulus lengths, a matrix with a largest sum of modulus lengths from the $O_s \times O_f$ matrices. Specifically, a sum of modulus lengths of L stronger rows in each of the $O_s \times O_f$ matrices may be calculated, and the L beam vectors, the K frequency domain vectors, and the corresponding weighting coefficients are determined based on a matrix with a largest sum of modulus lengths. Alternatively, a sum of modulus lengths of K stronger columns in each of the $O_s \times O_f$ matrices may be calculated, and the L beam vectors, the K frequency domain vectors, and the corresponding weighting coefficients are determined based on a matrix with a largest sum of modulus lengths.

A specific method for determining the weighting coefficients by the terminal device based on the selected matrix may be the same as the specific method used when the oversampling rate is not considered. For brevity, details are not described herein again.

It should be understood that the foregoing method for determining the L beam vectors and the K frequency domain vectors through the matrix operation is merely a possible implementation shown for ease of understanding, and it does not indicate that the terminal device definitely generates the matrix $W_{o_s, o_f}$ in the process of determining the L beam vectors and the K frequency domain vectors. For example, the matrix $W_{o_s, o_f}$ may alternatively be an ordered array obtained by sequentially connecting elements in the rows (or the columns), or may be an ordered array obtained by arranging elements in the matrix $W_{o_s, o_f}$ in a predefined sequence.

It should be further understood that the specific method for determining the L stronger beam vectors in the beam vector set and the K stronger frequency domain vectors in the frequency domain vector set when the oversampling rate is considered is not limited to the foregoing example. For a specific implementation, refer to the current technology, for example, a type II codebook feedback manner defined in the NR protocol TS38.214 R15. For brevity, examples are not listed one by one herein.

Based on the foregoing descriptions, the terminal device may determine the L beam vectors, the K frequency domain vectors, and the L×K weighting coefficients. In this implementation, the indication information of the precoding vector may include the L beam vectors, the K frequency domain vectors, and the L×K weighting coefficients corresponding to the L×K space-frequency units.

It should be understood that the method for determining the L beam vectors and the K frequency domain vectors is merely an example, and shall not constitute any limitation on this application.

For example, in a possible design, the terminal device may first select L beam vectors, then select K frequency domain vectors for each beam vector, and may further determine a weighting coefficient corresponding to each beam vector and each frequency domain vector corresponding to the beam vector that is, the L×K weighting coefficients in total.

In this case, the first indication information is specifically used to indicate each of the L beam vectors and the frequency domain vector corresponding to the beam vector. The possible design may be used in a scenario in which at least two of the L selected beam vectors correspond to different frequency domain vectors, and in particular, may be used in a scenario in which at least two of the L selected beam vectors correspond to different frequency domain vectors and a relatively small quantity of beam vectors are selected, that is, a value of L is relatively small (in other words, space domain sparseness is relatively good). Optionally, the first indication information is further used to indicate a quantity of frequency domain vectors corresponding to each beam vector.

In another possible design, the terminal device may alternatively first select K frequency domain vectors, then select L beam vectors for each frequency domain vector, and may further determine a weighting coefficient corresponding to each frequency domain vector and each beam vector corresponding to the frequency domain vector, that is, the L×K weighting coefficients in total.

In this case, the first indication information is specifically used to indicate each of the K frequency domain vectors and the beam vector corresponding to the frequency domain vector. The possible design may be used in a scenario in which at least two of the K selected frequency domain vectors correspond to different beam vectors, and in particular, may be used in a scenario in which at least two of the K selected frequency domain vectors correspond to different beam vectors and a relatively small quantity of frequency domain vectors are selected, that is a value of K is relatively small (in other words, frequency domain sparseness is relatively good). Optionally, the first indication information is further used to indicate a quantity of beam vectors corresponding to each frequency domain vector.

It should be further understood that the L beam vectors and the K frequency domain vectors may be used to determine L×K (that is, M) space-frequency component matrices or space-frequency component vectors, and therefore, may alternatively be indicated by using the M space-frequency component matrices or the M space-frequency component vectors. In implementation 1, locations of the M space-frequency component matrices (or space-frequency component vectors) in a space-frequency component matrix set (or a space-frequency component vector set) may correspond to locations of the L beam vectors in the beam vector set that are used to determine the M space-frequency component matrices (or space-frequency component vectors) and locations of the K frequency domain vectors in the frequency domain vector set that are used to determine the M space-frequency component matrices (or space-frequency component vectors). In other words, in implementation 1, the information used to indicate the L beam vectors and the K frequency domain vectors and information used to indicate the M space-frequency component matrices or the M space-frequency component vectors may be considered equivalent. Correspondingly, the L×K weighting coefficients corresponding to the L beam vectors and the K frequency domain vectors are weighting coefficients corresponding to the M space-frequency component matrices or the M space-frequency component vectors.

Specifically, the space-frequency component matrix is used as an example. The M space-frequency component matrices may be selected from a predefined space-frequency component matrix set. Each space-frequency component matrix in the space-frequency component matrix set may correspond to one one-dimensional index. Correspondingly, the L beam vectors in the beam vector set and the K frequency domain vectors that correspond to the M space-frequency component matrices may be considered as two-dimensional indexes of the M space-frequency component matrices.

If the oversampling rate is not considered for the space-frequency component matrix, the space-frequency component matrix set may include $N_s \times N_f$ space-frequency component matrices. The $N_s \times N_f$ space-frequency component matrices may be determined by using the $N_s$ beam vectors in the beam vector set and the $N_f$ frequency domain vectors in the frequency domain vector set.

It is assumed that m is an index of the space-frequency component matrix in the space-frequency component matrix set, $0 \leq m \leq N_s \times N_f - 1$, and n is an integer; $n_s$ is an index of the beam vector in the beam vector set, $0 \leq n_s \leq N_s - 1$, and $n_s$ is an integer; and $n_f$ is an index of the frequency domain vector in the frequency domain vector set, $0 \leq n_f \leq N_f - 1$, and $n_f$ is an integer. In this case, a correspondence among in, $n_s$, and $n_f$ may be related to an arrangement sequence of the space-frequency component matrices in the space-frequency component matrix set.

For example, $N_f$ space-frequency component matrices determined by using a frequency domain vector 0 to a frequency domain vector $N_f - 1$ in the $N_f$ frequency domain vectors and a beam vector 0 in the $N_s$ beam vectors may correspond to one-dimensional indexes 0 to $N_f - 1$; $N_f$ space-frequency component matrices determined by using the frequency domain vector 0 to the frequency domain vector $N_f - 1$ in the $N_f$ frequency domain vectors and a beam vector 1 in the $N_s$ beam vectors may correspond to one-dimensional indexes $N_f$ to $2N_f - 1$; and by analogy, $N_f$ space-frequency component matrices determined by using the frequency domain vector 0 to the frequency domain vector $N_f - 1$ in the $N_f$ frequency domain vectors and a beam vector $n_s$ in the $N_s$ beam vectors may correspond to one-dimensional indexes $n_s \times N_f$ to $(n_s + 1) \times N_f - 1$. For ease of differentiation and description, this numbering rule may be denoted as a rule.

Therefore, in the $N_s \times N_f$ space-frequency component matrices in the space-frequency component matrix set, it is assumed that a space-frequency component matrix m may be indicated by using a beam vector $n_s$ in the beam vector set and a frequency domain vector f in the frequency domain vector set. $n_f = \lfloor m/N_f \rfloor$, and $n_s = \text{mod}(m, N_f)$. $\lfloor \ \rfloor$ represents rounding down, and mod( ) represents a modulo operation.

In the $N_s$ beam vectors in the beam vector set and the $N_f$ frequency domain vectors in the frequency domain vector set, a space-frequency component matrix constructed based on the beam vector $n_s$ in the beam vector set and the frequency domain vector $n_f$ in the frequency domain vector set may be indicated by using the space-frequency component matrix m. $m = n_f + n_s \times N_f$.

For another example, $N_s$ space-frequency component matrices determined based on Kronecker products of the frequency domain vector 0 in the $N_f$ frequency domain vectors and the beam vector 0 to the beam vector $N_s - 1$ in the $N_s$ beam vectors may correspond to one-dimensional indexes 0 to $N_s - 1$; $N_s$ space-frequency component matrices determined based on Kronecker products of a frequency domain vector 1 in the $N_f$ frequency domain vectors and the beam vector 0 to the beam vector $N_s - 1$ in the $N_s$ beam vectors may correspond to one-dimensional indexes $N_s$ to $2N_s - 1$; and by analogy, $N_s$ space-frequency component matrices determined based on Kronecker products of a frequency domain vector $n_f$ in the $N_f$ frequency domain vectors and the beam vector 0 to the beam vector $N_s - 1$ in the $N_s$ beam vectors may correspond to one-dimensional indexes $n_f \times N_s$ to $(n_f + 1) \times N_s - 1$. For ease of differentiation and description, this numbering rule may be denoted as a rule 2.

Therefore, in the $N_s \times N_f$ space-frequency component matrices in the space-frequency component matrix set, a space-frequency component matrix m ($0 \leq m \leq N_s \times N_f - 1$) may be indicated by using the beam vector $n_s$ in the beam vector set and the frequency domain vector $n_f$ in the frequency domain vector set. $n_s = \lfloor m/N_s \rfloor$, and $n_f = \text{mod}(m, N_s)$.

In the $N_s$ beam vectors in the beam vector set and the $N_f$ frequency domain vectors in the frequency domain vector set, a space-frequency component matrix constructed based on the beam vector $n_s$ in the beam vector set and the frequency domain vector $n_f$ in the frequency domain vector set may be indicated by using the space-frequency component matrix m. $m = n_s + n_f \times N_s$.

It should be understood that the foregoing two numbering manners of the space-frequency component matrices in the space-frequency component matrix set are merely examples, and shall not constitute any limitation on this application. The terminal device and the network device may number the space-frequency component matrices in the space-frequency component matrix set according to a rule that is pre-agreed on. The network device and the terminal device define a sane correspondence between each space-frequency component matrix and an index.

Implementation 2

The terminal device may determine M stronger space-frequency component matrices and corresponding weighting coefficients based on the space-frequency component matrix set and the predetermined to-be-fed-back space-frequency matrix. Alternatively the terminal device may determine M stronger space-frequency component vectors and corresponding weighting coefficients based on the space-frequency component vector set and the predetermined to-be-fed-back space-frequency vector.

A value of M may be configured by the network device, may be predefined, for example, defined in a protocol, or may be determined by the terminal device and then reported to the network device.

If the value of M is configured by the network device, optionally, the method further includes: The terminal device receives fourth indication information, where the fourth indication information is used to indicate the value of M. Correspondingly, the network device sends the fourth indication information.

Optionally, the fourth indication information may be carried in higher layer signaling, for example, an RRC message.

If the value of M is determined by the terminal device, optionally, the method further includes: The terminal device sends fourth indication information, where the fourth indication information is used to indicate the value of M. Correspondingly, the network device receives the fourth indication information.

Optionally, the fourth indication information is carried in UCI, for example, CSI.

It should be understood that the foregoing listed signaling used to carry the fourth indication information is merely an example, and shall not constitute any limitation on this application. Specific signaling that carries the fourth indication information is not limited in this application.

In implementation 2, the terminal device may determine, based on precoding vectors of $N_f$ frequency domain units, a space-frequency vector h, where $h=[w_0^T w_1^T \ldots w_{N_f-1}^T]^T$, or a space-frequency matrix H, where $H=[w_0 \; w_1 \ldots w_{N_f-1}]$.

As described above, a space-frequency component vector in the space-frequency component vector set may be a vector whose length is $N_s \times N_f$ (case a), and a space-frequency component matrix in the space-frequency component matrix set may be a matrix that is $N_s \times N_f$ dimensional (case b). With reference to the two different cases, the following describes in detail a specific process in which the terminal device determines the M space-frequency component vectors and the weighting coefficients of the M space-frequency component vectors, or the M space-frequency component matrices and the weighting coefficients of the M space-frequency component matrices.

Case a:

The terminal device may determine the M space-frequency component vectors and the corresponding weighting coefficients based on the predetermined to-be-fed-back space-frequency vector and the space-frequency component vector set.

If the oversampling rate is not considered for the space-frequency component vector set, the space-frequency component vector set may include the $N_s \times N_f$ space-frequency component vectors described above. An arrangement sequence of the $N_s \times N_f$ space-frequency component vectors in the space-frequency component vector set may be predefined. For example, the $N_s \times N_f$ space-frequency component vectors may be obtained by first traversing the beam vectors 0 to $N_s-1$, and then traversing the frequency domain vectors 0 to $N_f-1$, or may be obtained by first traversing the frequency domain vectors 0 to $N_f-1$, and then traversing the beam vectors 0 to $N_s-1$. Detailed descriptions have been provided above with reference to the two possible arrangement manners. For brevity, details are not described herein again.

The terminal device may project the to-be-fed-back space-frequency vector to each space-frequency component vector in the space-frequency component vector set, to obtain $N_s \times N_f$ projection values. The terminal device may determine M larger projection values based on modulus lengths of the $N_s \times N_f$ projection values. A modulus length of any one of the M larger projection values is greater than or equal to a modulus length of any one of the remaining $N_s \times N_f - M$ projection values. Space-frequency component vectors used to generate the M larger projection values may be determined as M stronger space-frequency component vectors. Therefore, the terminal device may determine locations of the M selected space-frequency component vectors in the space-frequency component vector set. In addition, the M larger projection values may be used as weighting coefficients of the M selected space-frequency component vectors. Each space-frequency component vector may correspond to one weighting coefficient. The weighting coefficient corresponding to each space-frequency component vector may be a projection value obtained by projecting the space-frequency vector to the space-frequency component vector.

If the oversampling rate is considered, the space-frequency component vector set may be extended to $O_c \times N_s \times N_f$ space-frequency component vectors by using an oversampling factor $O_c$. The space-frequency component vector set may include $O_c$ subsets. The terminal device may project the to-be-fed-back space-frequency vector to each subset in the space-frequency component vector set, to obtain $O_c$ groups of projection values. The terminal device may separately determine, in each group of projection values, M projection values with larger modulus lengths, and may determine, in the $O_c$ groups of projection values based on a sum of the modulus lengths of the M projection values in each group, one group of projection values with a largest sum of modulus lengths. M space-frequency component vectors used to generate the group of projection values with the largest sum of modulus lengths may be determined as M stronger space-frequency component vectors. It may be understood that the M space-frequency component vectors belong to a same subset. Therefore, the terminal device may determine locations of the M selected space-frequency component vectors in the space-frequency component vector set. In addition, the M projection values in the group of projection values with the largest sum of the modulus lengths may be used as weighting coefficients of the M space-frequency component vectors. Each space-frequency component vector may correspond to one weighting coefficient. The weighting coefficient corresponding to each space-frequency component vector may be a projection value obtained by projecting the space-frequency vector to the space-frequency component vector.

Based on the foregoing descriptions, the terminal device may determine the M space-frequency component vectors and the M weighting coefficients.

It should be noted that the terminal device may first determine the M weighting coefficients corresponding to the M space-frequency component vectors. As described above, some weighting coefficients may have an amplitude of zero after being quantized. In this case, the zero-amplitude weighting coefficient may not be reported, or a phase of the zero-amplitude weighting coefficient may not be reported. Therefore, the terminal device may indicate, in the first indication information, the weighting coefficient of the part or all of the M space-frequency component vectors. For brevity, descriptions of a same or similar case are omitted below.

It should be understood that the foregoing method for determining the M space-frequency component vectors through projection is merely a possible implementation shown for ease of understanding, and shall not constitute any limitation on this application. For example, the terminal device may alternatively determine the M space-frequency component vectors through a matrix operation.

Case b:

The terminal device may determine the M space-frequency component matrices and the corresponding weighting coefficients based on the predetermined to-be-fed-back space-frequency matrix and the space-frequency component matrix set.

If the oversampling rate is not considered, the space-frequency component matrix set may include $N_s \times N_f$ space-frequency component matrices. An arrangement sequence of the $N_s \times N_f$ space-frequency component matrices in the space-frequency component matrix set may be predefined. For example, the $N_s \times N_4$ space-frequency component matrices may be obtained by first traversing the beam vectors 0 to $N_s-1$, and then traversing the frequency domain vectors 0 to $N_f-1$, or may be obtained by first traversing the frequency domain vectors 0 to $N_f-1$, and then traversing the beam vectors 0 to $N_s-1$. Detailed descriptions have been provided above with reference to the two possible arrangement manners. For brevity, details are not described herein again.

The terminal device may sum up products of conjugates of elements in each space-frequency component matrix and corresponding elements in the predetermined to-be-fed-back space-frequency matrix, to obtain $N_s \times N_f$ values corresponding to the $N_s \times N_f$ space-frequency component matrices. Specifically, an element in one space-frequency component matrix in the space-frequency component matrix set may be denoted as, for example, $a_{n_s,n_f}$ (where $n_s=0, 1, \ldots,$ or $N_s-1$, and $n_f=0, 1, \ldots,$ or $N_f-1$), and an element in the space-frequency matrix may be denoted as, for example, $b_{n_s,n_f}$. In this case, summation of the products of the conjugates of the elements in each space-frequency component matrix and the corresponding elements in the space-frequency matrix may be represented as $$\sum_{n_f=0}^{N_f-1} \sum_{n_s=0}^{N_s-1} \overline{a}_{n_s,n_f} b_{n_s,n_f} \cdot \overline{a}_{n_s,n_f}$$

represents a conjugate of the element $a_{n_s,n_f}$. This operation is repeatedly performed on the $N_s \times N_f$ space-frequency component matrices in the space-frequency component matrix set, to obtain the $N_s \times N_f$ values. The $N_s \times N_f$ values may be considered as $N_s \times N_f$ weighting coefficients.

The foregoing operation may be implemented through a matrix operation. For example, the $N_s \times N_f$ values may be obtained by calculating a trace of a product of a conjugate transpose of each space-frequency component matrix and the space-frequency matrix.

Then, the terminal device may determine, in the $N_s \times N_f$ values, M values with larger modulus lengths. A modulus length of any one of the M values is greater than or equal to a modulus length of any one of the remaining $N_s \times N_f - M$ values. M space-frequency component matrices used to generate the M values with larger modulus lengths may be determined as the M stronger space-frequency component matrices. Therefore, the terminal device may determine locations of the M selected space-frequency component matrices in the space-frequency component matrix set. In addition, the M values with larger modulus lengths may be used as weighting coefficients of the M selected space-frequency component matrices. Each space-frequency component matrix may correspond to one weighting coefficient. The weighting coefficient corresponding to each space-frequency component matrix may be a value obtained through the foregoing operation of the to-be-fed-back space-frequency matrix and the space-frequency component matrix.

If the oversampling rate is considered, the space-frequency component matrix set may be extended to $O_c \times N_s \times N_f$ space-frequency component matrices by using an oversampling factor $O_c$. The space-frequency component vector set may include $O_c$ subsets.

The terminal device may determine, according to the method described above, $O_c$ groups of values corresponding to the $O_c$ subsets, where each group of values includes $N_s \times N_f$ values. The terminal device may separately select M values with larger modulus lengths from each group of values based on modulus lengths of the values in each group. The terminal device may further determine, in the $O_c$ groups of values based on a sum of the larger modulus lengths of the M values in each group of values, one group of values with a largest sum of modulus lengths. The M space-frequency component matrices used to generate the group of values with the largest sum of modulus lengths may be determined as M stronger space-frequency component matrices. It may be understood that the M space-frequency component matrices belong to a same subset. Therefore, the terminal device may determine locations of the M selected space-frequency component matrices in the space-frequency component matrix set. In addition, the group of values with the largest sum of modulus lengths may be used as weighting coefficients of the M selected space-frequency component matrices. Each space-frequency component matrix may correspond to one weighting coefficient. The weighting coefficient corresponding to each space-frequency component matrix may be a value obtained through the foregoing operation on the to-be-fed-back space-frequency matrix and the space-frequency component matrix.

It should be understood that the foregoing listed method for determining the M space-frequency component matrices based on the space-frequency matrix is merely an example for ease of understanding, and shall not constitute any limitation on this application.

Based on the foregoing descriptions, the terminal device may determine the M space-frequency component matrices and the M weighting coefficients.

It should be understood that the M space-frequency component matrices or space-frequency component vectors may also be indicated by using several beam vectors and several frequency domain vectors. Because the space-frequency component matrix and the space-frequency component vector may be mutually converted, or equivalent, the space-frequency component matrix is used as an example for description herein. As described above, each space-frequency component matrix may be determined by using one beam vector in the beam vector set and one frequency domain vector in the frequency domain vector set. For example, each space-frequency component matrix may be a product of one beam vector and a conjugate transpose of one frequency domain vector, or may be a Kronecker product of one frequency domain vector and one beam vector. For brevity, examples are not listed one by one herein. Therefore, the M space-frequency component matrices may be determined by using several beam vectors and several frequency domain vectors. Locations of the M space-frequency component matrices in the space-frequency component matrix set may correspond to locations of the several beam vectors in the beam vector set and locations of the several frequency domain vectors in the frequency domain vector set. Therefore, information used to indicate the M space-frequency component matrices and information used to indicate the several beam vectors and the several frequency domain vectors may be considered equivalent.

It should be noted that, in implementation 2, the M space-frequency component matrices are M stronger space-frequency component matrices selected from the space-frequency component matrix set, but are not necessarily obtained by traversing the several beam vectors and the several frequency domain vectors and combining the several beam vectors and the several frequency domain vectors in pairs. That is, in implementation 2, a relationship among M, a quantity of the beam vectors, and a quantity of the frequency domain vectors is not limited.

Implementation 3

The terminal device may determine, based on the predetermined to-be-fed-back space-frequency matrix or space-frequency vector, L stronger beam vectors in the beam vector set and K stronger frequency domain vectors in the frequency domain vector set, and the L beam vectors and the K frequency domain vectors may be combined in pairs to obtain L×K space-frequency vector pairs (manner a). Alternatively, the terminal device may determine L×K stronger space-frequency component matrices in the space-frequency component matrix set, or determine L×K stronger space-frequency component vectors in the space-frequency component vector set (manner b). The L×k space-frequency vector pairs, the L×K space-frequency component matrices, and the L×k space-frequency component vectors are all specific forms of the L×K space-frequency units.

Values of L, K. and M may all be configured by the network device, may be predefined, or may be determined by the terminal device and then reported to the network device. This is not limited in this application. If the values of L, K, and M are separately indicated through signaling, the values of L and K may be respectively indicated, for example, through the second indication information and the third indication information described in implementation 1, and the value of M may be indicated, for example, through the fourth indication information described in implementation 2. Indication manners of the values of L, K, and M have been described above. For brevity, details are not described herein again.

It should be understood that in implementation 3, the second indication information, the third indication information, and the fourth indication information that are respectively used to indicate the values of L, K, and M may be carried in same signaling, or may be carried in different signaling. This is not limited in this application.

It should be noted that, different from implementation 1, in implementation 3, L×K≥M.

The L beam vectors may be some beam vectors in the beam vector set, or may be all beam vectors in the beam vector set. The K frequency domain vectors may be some frequency domain vectors in the frequency domain vector set, or may be all frequency domain vectors in the frequency domain vector set. However, the L beam vectors and the K frequency domain vectors do not respectively use a universal set of the beam vector set and a universal set of the frequency domain vector set at the same time. In other words, the L beam vectors are some beam vectors in the beam vector set, and/or the K frequency domain vectors are some frequency domain vectors in the frequency domain vector set.

When the L beam vectors use the universal set of the beam vector set, the L beam vectors may not be indicated. When the K frequency domain vectors use the universal set of frequency domain vector sets, the K frequency domain vectors may not be indicated. In other words, when the first indication information is used to indicate the L beam vectors and the K frequency domain vectors, only the L beam vectors may be indicated, only the K frequency domain vectors may be indicated, or the L beam vectors and the K frequency domain vectors may be indicated.

With reference to manner a and manner b, the following describes in detail the specific process in which the terminal device determines the L beam vectors, the K frequency domain vectors, the M space-frequency units in the L×K space-frequency units, and the weighting coefficients corresponding to the M space-frequency units.

In manner a, first, the terminal device may determine a space-frequency matrix H based on precoding vectors of $N_f$ frequency domain units, where $H=[w_0\ w_1\ \ldots\ w_{N_f-1}]$. The terminal device may determine L stronger beam vectors in the beam vector set and K stronger frequency domain vectors in the frequency domain vector set based on the space-frequency matrix H.

If the oversampling rate is not considered for both the beam vector set and the frequency domain vector set, the beam vector set may include the $N_s$ beam vectors described above, and a constructed matrix is $B_s$; and the frequency domain vector set may include the $N_f$ frequency domain vectors described above, and a constructed matrix is $B_f$. The terminal device may determine a matrix W based on $W=B_s{}^*HB_f$. The matrix W may be $N_s \times N_f$ dimensional, $N_s$ rows in the matrix W may correspond to the $N_s$ beam vectors in the beam vector set (or the matrix $B_s$ constructed based on the beam vector set); and the $N_f$ columns in the matrix W may correspond to the $N_f$ frequency domain vectors in the frequency domain vector set (or the matrix $B_f$ constructed based on the frequency domain vector set). Each element in the matrix W may correspond to one of the $N_s$ beam vectors and one of the $N_f$ frequency domain vectors. In other words, each element in the matrix W may correspond to one space-frequency unit determined by using one of the $N_s$ beam vectors and one of the $N_f$ frequency domain vectors.

The terminal device may select L rows with larger moduli based on a modulus length of each row in the matrix W, and may select K columns with larger moduli based on a modulus length of each column in the matrix W. L stronger beam vectors are determined in the beam vector set based on locations of the L rows, and K stronger frequency domain vectors are determined in the frequency domain vector set based on locations of the K columns. In addition, the L rows with larger moduli and the K columns with larger moduli in the matrix W may be used to construct a matrix $W_c$ that is L×K dimensional. The matrix $W_c$ includes L×K elements, which respectively correspond to the L×K space-frequency units determined by using the L beam vectors and the K frequency domain vectors.

If the oversampling rate is considered for at least one of the beam vector set and the frequency domain vector set, the terminal device may still determine, according to the method described in implementation 1, the L stronger beam vectors, the K stronger frequency domain vectors, and the weighting coefficients corresponding to the L×K space-frequency units determined by using the L beam vectors and the K frequency domain vectors.

A specific method for determining, by the terminal device, the L stronger beam vectors and the K stronger frequency domain vectors based on the space-frequency matrix, the beam vector set, and the frequency domain vector set may be the same as the method described in the foregoing implementation 1. For brevity, details are not described herein again.

Then, the terminal device may determine M stronger space-frequency units in the L×K space-frequency units corresponding to the L beam vectors and the K frequency domain vectors.

The terminal device may separately traverse the L beam vectors and the K frequency domain vectors in a predefined sequence, to obtain the L×K space-frequency units.

For ease of description, it is assumed herein that the L beam vectors selected from the beam vector set are denoted as $v_s^0, v_s^1, \ldots,$ and $v_s^{L-1}$, and the K frequency domain vectors selected from the frequency domain vector set are denoted as $v_f^0, v_f^1, \ldots,$ and $v_f^{K-1}$.

For example, the terminal device may first traverse the L beam vectors and then traverse the K frequency domain vectors to obtain the L×K space-frequency units. To be specific, for each frequency domain vector, the L beam vectors are traversed in a sequence from a beam vector 0 to a beam vector L−1, and the K frequency domain vectors are traversed in a sequence from a frequency domain vector 0 to a frequency domain vector K−1, to obtain the L×K space-frequency units.

The space-frequency component matrix is used as an example. If the L beam vectors and the K frequency domain vectors are traversed in the manner described above, the following L×K space-frequency component matrices may be obtained: $v_s^0(v_f^0)^*, v_s^1(v_f^0)^*, \ldots, v_s^{L-1}(v_f^0)^*, v_s^0(v_f^1)^*, v_s^1(v_f^1)^*, \ldots, v_s^{L-1}(v_f^1)^*, \ldots, v_s^0(v_f^{K-1})^*, v_s^1(v_f^{K-1})^*, \ldots,$ and $v_s^{L-1}(v_f^{K-1})^*$.

For another example, the terminal device may first traverse the K frequency domain vectors and then traverse the L beam vectors, to obtain the L×K space-frequency units. To be specific, for each beam vector, the K frequency domain vectors are traversed in a sequence from a frequency domain vector 0 to a frequency domain vector K−1, and the L beam vectors are traversed in a sequence from a beam vector 0 to a beam vector L−1, to obtain the L×K space-frequency units.

The space-frequency component matrix is still used as an example. If the K frequency domain vectors and the L beam vectors are traversed in the manner described above, the following L×K space-frequency component matrices may be obtained: $v_s^0(v_f^0)^*, v_s^0(v_f^1)^*, \ldots, v_s^0(v_f^{K-1})^*, v_s^1(v_f^0)^*, v_s^1(v_f^1)^*, \ldots, v_s^1(v_f^{K-1})^*, \ldots, v_s^{L-1}(v_f^0)^*, v_s^{L-1}(v_f^1)^*, \ldots,$ and $v_s^{L-1}(v_f^{K-1})$.

It should be understood that the foregoing listed space-frequency component matrices are merely examples, and shall not constitute any limitation on this application. Based on the foregoing manner of traversing the L beam vectors and the K frequency domain vectors, L×K space-frequency component vectors may also be obtained based on a Kronecker product of the frequency domain vector and the beam vector, or L×K space-frequency vector pairs may also be obtained by using any vector operation such as a combination operation.

The terminal device may determine M stronger space-frequency units in the L×K space-frequency units. The M stronger space-frequency units may be space-frequency units corresponding to elements that have larger moduli and that are in weighting coefficients (namely, the L×K elements included in the foregoing $W_c$) of the L×K space-frequency units. M elements with larger modulus lengths in the matrix $W_c$ may be weighting coefficients of the M space-frequency units. To be specific, a modulus length of a weighting coefficient of any one of the M selected space-frequency units is greater than or equal to a modulus length of a weighting coefficient of any one of the remaining L×K−M space-frequency units.

Based on the foregoing descriptions, the terminal device may determine the L beam vectors, the K frequency domain vectors, the M space-frequency units in the L×K space-frequency units determined by using the L beam vectors and the K frequency domain vectors, and the weighting coefficients corresponding to the M space-frequency units.

It should be understood that, as described in implementation 1, the L beam vectors and the K frequency domain vectors may be used to determine the L×K space-frequency component matrices or space-frequency component vectors, and therefore, may alternatively be indicated by using the L×K space-frequency component matrices or L×K space-frequency component vectors.

As described above, locations of the L beam vectors in the beam vector set and locations of the K frequency domain vectors in the frequency domain vector set may be converted into locations of the L×K space-frequency component matrices in the space-frequency component matrix set, or locations of the L×K space-frequency component vectors in the space-frequency component vector set. A specific conversion manner has been described in detail in the foregoing implementation 1. For brevity, details are not described herein again.

In manner b, first, the terminal device may determine, based on the precoding vectors of the $N_f$ frequency domain units, a space-frequency matrix H, where $H=[w_0\ w_1\ \ldots\ w_{N_f-1}]$, or a space-frequency vector h, where $h=[w_0^T\ w_1^T\ \ldots\ w_{N_f-1}^T]^T$.

If the terminal device predetermines the space-frequency vector h, the terminal device may determine L×K stronger space-frequency component vectors in the space-frequency component vector set based on the space-frequency vector h, and may further determine M stronger space-frequency component vectors in the L×K space-frequency component vectors.

If the oversampling rate is not considered, the terminal device may project the space-frequency vector h to $N_s \times N_f$ space-frequency component vectors in the space-frequency component vector set, to obtain $N_s \times N_f$ projection values. An arrangement sequence of the $N_s \times N_f$ projection values corresponds to an arrangement sequence of the $N_s \times N_f$ space-frequency component vectors in the space-frequency component vector set.

The terminal device may arrange, based on the arrangement sequence of the $N_s \times N_f$ space-frequency component vectors in the space-frequency component vector set, the $N_s \times N_f$ projection values in a pre-specified sequence to form a matrix that is $N_s \times N_f$ dimensional.

For example, the terminal device may arrange, from the first projection value in the $N_s \times N_f$ projection values, every $N_f$ consecutive projection values into one row, to obtain $N_s$ rows, where each row includes $N_f$ projection values. The $N_s$ rows are arranged from top to bottom, so that a matrix W that is $N_s \times N_f$ dimensional can be obtained. For another example, the terminal device may arrange, from the first projection value in the $N_s \times N_f$ projection values, every $N_s$ consecutive projection values into one column, to obtain $N_f$ columns, where each column includes $N_s$ projection values. The $N_f$ columns are arranged from left to right, so that a matrix W that is $N_s \times N_f$ dimensional can be obtained. $N_s \times N_f$ elements in the matrix W that is $N_s \times N_f$ dimensional correspond to the $N_s \times N_f$ space-frequency component vectors in the space-frequency component vector set.

The terminal device may perform a modulo operation on each of the $N_s$ rows in the matrix W, and determine L rows with larger moduli based on a modulus length of each row. The L rows with larger moduli are L stronger rows. The terminal device may further perform a modulo operation on each of the $N_f$ columns in the matrix W, and determine K columns with larger moduli based on a modulus length of each column. The K columns with larger moduli are K stronger columns. The terminal device may determine L×K stronger space-frequency component vectors in the space-frequency component vector set based on locations of the L stronger rows and the K stronger columns in the matrix W and the foregoing manner of converting the beam vector set and the frequency domain vector set into the space-frequency component vector set.

If the oversampling rate is considered, the terminal device may also determine the L×K stronger space-frequency component vectors in the space-frequency component vector set according to a method similar to that described above.

The specific process of determining the L stronger beam vectors and the K stronger frequency domain vectors has been described in detail above with reference to the two cases in which the oversampling rate is considered and the oversampling rate is not considered. In manner b, a specific process in which the terminal device determines the L×K stronger space-frequency component vectors in the space-frequency component vector set is similar to the specific process described above. For brevity, details are not described herein again.

Actually, each space-frequency component vector in the space-frequency component vector set may be determined by using each beam vector in the beam vector set and each frequency domain vector in the frequency domain vector set. The L×K space-frequency component vectors may be determined by using L stronger beam vectors in the beam vector set and K stronger frequency domain vectors in the frequency domain vector set. Row sequence numbers of the L determined stronger rows in the matrix W may be sequence numbers of the L stronger beam vectors in the beam vector set, and column sequence numbers of the K determined stronger columns in the matrix W may be sequence numbers of the K stronger frequency domain vectors in the frequency domain vector set.

It should be understood that the specific method for determining, by the terminal device, the L×K stronger space-frequency component vectors by determining the L stronger rows and the K stronger columns based on the matrix W is merely an example for ease of understanding, and shall not constitute any limitation on this application. This application does not exclude a possibility that the terminal device determines the L×K stronger space-frequency component vectors in other manners. All the other manners should fall within the protection scope of this application, provided that the L×K stronger space-frequency component vectors determined by the terminal device can be constructed by using the L beam vectors and the K frequency domain vectors.

Then, the terminal device may determine, according to the method in manner a, the M stronger space-frequency component vectors in the L×K space-frequency component vectors and the corresponding weighting coefficients.

If the terminal device predetermines a space-frequency matrix H, the terminal device may determine L×K stronger space-frequency component matrices based on the space-frequency matrix H and the space-frequency component matrix set, and may further determine the M stronger space-frequency component matrices in the L×K space-frequency component matrices.

If the oversampling rate is not considered, the terminal device may sum up products of conjugates of elements in each of the $N_s \times N_f$ space-frequency component matrices in the space-frequency component matrix set and corresponding elements in the space-frequency matrix H, to obtain $N_s \times N_f$ values corresponding to the $N_s \times N_f$ space-frequency component matrices. For example, an element in one space-frequency component matrix in the space-frequency component matrix set is denoted as $a_{p,q}$ (where p=0, 1, . . . , or $N_s$−1, and q=0, 1, . . . , or $N_f$−1), and an element in the space-frequency matrix is denoted as $b_{p,q}$. In this case, summation of the products of the conjugates of the elements in each space-frequency component matrix and the corresponding elements in the space-frequency matrix may be represented as $$\sum_{q=0}^{N_f-1}\sum_{p=0}^{N_s-1} \overline{a}_{p,q} b_{p,q} \cdot \overline{a}_{p,q}$$

represents a conjugate of the element $a_{p,q}$. This operation is repeatedly performed on the $N_s \times N_f$ space-frequency component matrices in the space-frequency component matrix, to obtain the $N_s \times N_f$ values. The $N_s \times N_f$ values correspond to the $N_s \times N_f$ space-frequency component matrices.

If the oversampling rate is considered, the terminal device may also determine the L×K stronger space-frequency component matrices in the space-frequency component matrix set according to a method similar to that described above.

The specific process of determining the L stronger beam vectors and the K stronger frequency domain vectors has been described in detail above with reference to the two cases in which the oversampling rate is considered and the oversampling rate is not considered. In manner b, a specific process in which the terminal device determines L×K stronger space-frequency component matrices in the space-frequency component matrix set is similar to the specific process described above. For brevity, details are not described herein again.

Then, the terminal device may arrange, based on an arrangement sequence of the $N_s \times N_f$ space-frequency component matrices in the space-frequency component matrix set, the $N_s \times N_f$ values in a pre-specified sequence to form a matrix W that is $N_s \times N_f$ dimensional. The terminal device arranges the $N_s \times N_f$ values in the pre-specified sequence to form the matrix W that is $N_s \times N_f$ dimensional, and may determine the L×K stronger space-frequency component matrices based on the matrix W. The terminal device may further determine, in the L×K space-frequency component matrices, M stronger space-frequency component matrices and weighting coefficients corresponding to the M stronger space-frequency component matrices.

The specific process in which the terminal device determines the L×K stronger space-frequency component matrices, and determines the M stronger space-frequency component matrices in the L×K space-frequency component matrices and the weighting coefficients of the M space-frequency component matrices is similar to the foregoing specific process in which the terminal device determines the L×K space-frequency component vectors, and determines the M stronger space-frequency component vectors in the L×K space-frequency component vectors and the weighting coefficients of the M stronger space-frequency component vectors. The process in which the terminal device determines the L×K space-frequency component vectors, and determines the M stronger space-frequency component vectors in the L×K space-frequency component vectors and the weighting coefficients of the M stronger space-frequency component vectors has been described in detail above. For brevity, details are not described herein again.

Actually, a quantity of the space-frequency units selected from the L×K space-frequency units may be M, or may be less than M. This is not limited in this application. To be specific, a quantity of zero-amplitude weighting coefficients in the L×K weighting coefficients may be L×K−M, or may be greater than L×K−M. When the quantity of zero-amplitude weighting coefficients is greater than L×K−M, the quantity of the selected space-frequency units may be less than M. In this case, when indicating the M space-frequency units, the terminal device may indicate only several non-zero-amplitude space-frequency units, or the terminal device may indicate the M space-frequency units, but the terminal device may further determine, based on an indication of the weighting coefficients, that weighting coefficients of some of the M space-frequency units are zero. For ease of description below, it is assumed that the quantity of the space-frequency units selected from the L×K space-frequency units is M. However, it should be understood that this shall not constitute any limitation on this application.

Based on the foregoing descriptions, the terminal device may determine the L beam vectors, the K frequency domain vectors, the M space-frequency units in the L×K space-frequency units determined by using the L beam vectors and the K frequency domain vectors, and the weighting coefficients corresponding to the M space-frequency units.

The specific manner in which the terminal device indicates the precoding vector is described in detail above with reference to implementation 1 to implementation 3. The terminal device may generate the CSI report based on the determined information used to indicate the precoding vector.

As described above, the terminal device may report one or more CSI reports in one time unit (for example, a slot (slot)). Each CSI report may be generated based on one CSI reporting setting.

In this embodiment, the CSI report may include the first indication information. Specifically, based on designs of the first part and the second part of the CSI report, the terminal device may include a part of the first indication information in the first part of the CSI report and include the other part of the first indication information in the second part of the CSI report.

Specifically, information that is in the first indication information and that is used to indicate a vector (for example, including a space-frequency component vector, a beam vector, or a frequency domain vector) and a matrix (for example, including a space-frequency component matrix) may be carried in the second part of the CSI report. For example, the second part may carry information used to indicate the L beam vectors and the K frequency domain vectors that are determined in implementation 1, or equivalent information used to indicate the L×K space-frequency component matrices or space-frequency component vectors. For another example, the second part may carry information used to indicate the M space-frequency component matrices or space-frequency component vectors that are determined in implementation 2, or equivalent information used to indicate the several beam vectors and the several frequency domain vectors. For another example, the second part may carry information used to indicate the L beam vectors, the K frequency domain vectors, and the M space-frequency units in the L×K space-frequency units that are determined in implementation 3, or equivalent information used to indicate the L×K space-frequency units and the M space-frequency units. For ease of description, the foregoing listed information used to indicate the vector (for example, including the space-frequency component vector, the beam vector, or the frequency domain vector) and the matrix (for example, including the space-frequency component matrix) is collectively referred to as component information below. Correspondingly, information used to indicate a weighting coefficient corresponding to the foregoing vector or matrix is referred to as coefficient information.

Specifically, the component information may include one of the following:
information (a): several beam vectors and several frequency domain vectors (including the L beam vectors and the K beam vectors);
information (b): the M space-frequency component matrices or the M space-frequency component vectors;
information (c): the L beam vectors, the K frequency domain vectors, and the M space-frequency units in the L×K space-frequency units corresponding to the L beam vectors and the K frequency domain vectors; or
information (d): the L×K space-frequency units and the M space-frequency units in the L×K space-frequency units.

It should be understood that an indication manner of the precoding vector may be defined in a protocol. When the specific indication manner of the precoding vector is determined, used bit overheads may be determined.

Specifically, when the component information is the information (a), it is assumed that there are L beam vectors and K frequency domain vectors. In this case, the component information may be information used to indicate the L beam vectors in the beam vector set and the K frequency domain vectors in the frequency domain vector set.

If oversampling is not considered for both the beam vector set and the frequency domain vector set, the beam vector set may include $N_s$ beam vectors, and the frequency domain vector set may include $N_f$ frequency domain vectors. In this case, when the first indication information is used to indicate the L beam vectors, the first indication information may be used to indicate an index of a combination of the L beam vectors in the beam vector set, and overheads of the first indication information may be $\lceil \log_2 C_{N_s}^L \rceil$ bits; or the first indication information may be used to indicate indexes of the L beam vectors in the beam vector set, and overheads of the first indication information may be $L \times \lceil \log_2 N_s \rceil$ bits. When the first indication information is used to indicate the K frequency domain vectors, the first indication information may be used to indicate an index of a combination of the K frequency domain vectors in the frequency domain vector set, and overheads of the first indication information may be $\lceil \log_2 C_{N_f}^K \rceil$ bits; or the first indication information may be used to indicate indexes of the K frequency domain vectors in the frequency domain vector set, and overheads of the first indication information may be $K \times \lceil \log_2 N_f \rceil$ bits.

If oversampling is considered for both the beam vector set and the frequency domain vector set, the beam vector set may include $O_s$ subsets, and each subset may include $N_s$ beam vectors; and the frequency domain vector set may include $O_f$ subsets, and each subset may include $N_f$ subsets. When the first indication information is used to indicate the L beam vectors, the first indication information may be used to indicate a subset to which the L beam vectors belong and locations of the L beam vectors in the subset, and overheads of the first indication information may be $\lceil \log_2 O_s \rceil + \lceil \log_2 C_{N_s}^L \rceil$, bits or $\lceil \log_2 O_s \rceil + L \times \lceil \log_2 N_s \rceil$ bits. When the first indication information is used to indicate the K frequency domain vectors, the first indication information may be used to indicate a subset to which the K frequency domain vectors belong and locations of the K frequency domain vectors in the subset, and overheads of the first indication information may be $\lceil \log_2 O_f \rceil + \lceil \log_2 C_{N_f}^K \rceil$ bits or $\lceil \log_2 O_f \rceil + K \times \lceil \log_2 N_f \rceil$ bits.

If oversampling is considered for one of the beam vector set and the frequency domain vector set, the L beam vectors and the K frequency domain vectors may be separately indicated in the manners listed above, and overheads may also be determined based on the calculation formulas listed above. For brevity, examples are not listed one by one herein.

When the component information is the information (b), the component information may be information used to indicate the M space-frequency component matrices in the space-frequency component matrix set, or information used to indicate the M space-frequency component vectors in the space-frequency component vector set.

If oversampling is not considered, the space-frequency component matrix set may include $N_s \times N_f$ space-frequency component matrices. When the first indication information is used to indicate the M space-frequency component matrices, the first indication information may be used to indicate an index of a combination of the M space-frequency component matrices in the space-frequency component matrix set, and overheads of the first indication information may be $\lceil \log_2 C_{N_s \times N_f}^M \rceil$ bits; or the first indication information may be used to indicate indexes of the M space-frequency component matrices in the space-frequency component matrix set, and overheads of the first indication information may be $M \times \lceil \log_2(N_s \times N_f) \rceil$ bits.

If the oversampling rate is considered, the space-frequency component matrix set may include $O_c$ subsets, and each subset may include $N_s \times N_f$ space-frequency component matrices. When the first indication information is used to indicate the M space-frequency component matrices, the first indication information may be used to indicate a subset to which the M space-frequency component matrices belong and locations of the M space-frequency component matrices in the subset, and overheads of the first indication information may be $\lceil \log_2 O_c \rceil + \lceil \log_2 C_{N_s \times N_f}^M \rceil$ bits or $\lceil \log_2 O_c \rceil + M \times \lceil \log_2(N_s \times N_f) \rceil$ bits.

The specific manner and overheads for indicating the M space-frequency component matrices are described above by using an example of the locations of the M space-frequency component matrices in the space-frequency component matrix set. A manner and overheads for indicating locations of the M space-frequency component vectors in the space-frequency component vector set are similar to the foregoing manner and overheads. For brevity, details are not described herein again.

When the component information is (c), the component information may be information used to indicate the L beam vectors, the K frequency domain vectors, and relative locations of the M space-frequency units in the L×K space-frequency units.

The method and overheads for indicating the L beam vectors and the K frequency domain vectors have been described above in the description of the information (a). For brevity, details are not described herein again.

The relative locations of the M space-frequency units in the L×K space-frequency units may be indicated in any one of the following manners.

Manner 1: The M space-frequency units in the L×K space-frequency units are indicated by using a bitmap.

Manner 2: An index of a combination of the M space-frequency units in the L×K space-frequency units is indicated.

Manner 3: Indexes of the M space-frequency units in the L×K space-frequency units are respectively indicated.

Manner 4: A location that is of a beam vector corresponding to each of the M space-frequency units and that is in the L beam vectors and a location that is of a frequency domain vector corresponding to each of the M space-frequency units and that is in the K frequency domain vectors are indicated.

In manner 1, the M space-frequency units may be indicated by using a bitmap whose length is L×K bits. Each bit in the bitmap may correspond to one of the L×K space-frequency units. Each bit may be used to indicate whether a corresponding space-frequency unit belongs to the M space-frequency units, in other words, whether the corresponding space-frequency unit is chosen to be fed back. For example, when a bit is set to "0", it indicates that a corresponding space-frequency unit does not belong to the M space-frequency units. When a bit is set to "1" it indicates that a corresponding space-frequency unit belongs to the M space-frequency units.

A correspondence between the L×K bits in the bitmap and the L×K space-frequency units corresponds to a combination manner of the beam vectors and the frequency domain vectors in the L×K space-frequency units. For example, the L×K space-frequency units corresponding to the L×K bits may be arranged in a sequence of traversing the K frequency domain vectors first and then traversing the L beam vectors, for example, $v_s^0(v_f^0)^*, v_s^0(v_f^1)^*, \ldots, v_s^0(v_f^{K-1})^*, v_s^1(v_f^0)^*, v_s^1(v_f^1)^*, \ldots, v_s^1(v_f^{K-1})^*, \ldots, v_s^{L-1}(v_f^0)^*, v_s^{L-1}(v_f^1)^*, \ldots,$ and $v_s^{L-1}(v_f^{K-1})^*$. The L×K bits in the bitmap are in a one-to-one correspondence with the L×K space-frequency units.

For another example, the L×K space-frequency units corresponding to the L×K bits may be arranged in a sequence of traversing the L beam vectors first and then traversing the K frequency domain vectors, for example, $v_s^0(v_f^0)^*, v_s^1(v_f^0)^*, \ldots, v_s^{L-1}(v_f^0)^*, v_s^0(v_f^1)^*, v_s^1(v_f^1)^*, \ldots, v_s^{L-1}(v_f^1)^*, \ldots, v_s^0(v_f^{K-1})^*, v_s^1(v_f^{K-1})^*, \ldots,$ and $v_s^{L-1}(v_f^{K-1})^*$. The L×K bits in the bitmap are in a one-to-one correspondence with the L×K space-frequency units.

It should be understood that the correspondence between the L×K bits in the bitmap and the L×K space-frequency units is described above by using the space-frequency component matrix as an example, but this shall not constitute any limitation on this application. A correspondence between the L×K bits in the bitmap and the L×K space-frequency component vectors or space-frequency vector pairs is similar to the correspondence between the L×K bits in the bitmap and the L×K space-frequency units. For brevity, examples are not listed one by one herein.

It should be further understood that the foregoing listed one-to-one correspondence between the L×K bits and the L×K space-frequency units is merely an example, and shall not constitute any limitation on this application. The correspondence between the L×K bits and the L×K space-frequency units is not limited in this application. In addition, an arrangement manner of the L×K space-frequency units is not limited in this application. Two possible arrangement manners of the L×K space-frequency units that are in a one-to-one correspondence with the L×K bits are shown above merely for ease of describing the one-to-one correspondence between the L×k bits and the L×K space-frequency units.

In manner 2, the terminal device may indicate the M space-frequency units by using the index of the combination of the M space-frequency units in the L×K space-frequency units. In other words, the terminal device may predetermine a plurality of combinations of a plurality of space-frequency units based on the L×K space-frequency units obtained by combining the L beam vectors and the K frequency domain vectors, and each combination may correspond to one index. The M space-frequency units may be one of the plurality of combinations, or may be close to one of the plurality of combinations. When the first indication information is used to indicate the M space-frequency units, the M space-frequency units may be indicated by indicating the index of the combination of the M space-frequency units. Therefore, the terminal device may indicate the M space-frequency units in the L×K space-frequency units by using $\log_2\lceil C_{L-K}^M \rceil$ bits.

In manner 3, the terminal device may indicate the M space-frequency units respectively by using the indexes of the M space-frequency units in the L×K space-frequency units. For example, the terminal device may renumber the L×K space-frequency units, and indicate an index of each of the M space-frequency units in the L×K space-frequency units. Therefore, the terminal device may indicate the M space-frequency units in the L×K space-frequency units by using $M \times \lceil \log_2(L \times K) \rceil$ bits.

In manner 4, the terminal device may indicate the locations that are of the M beam vectors and the M frequency domain vectors combined to obtain the M space-frequency units and that are in the L beam vectors and the K frequency domain vectors. In this manner, the M space-frequency units are M space-frequency vector pairs, and the M beam vectors and the M frequency domain vectors may be combined into the M space-frequency vector pairs. For each space-frequency vector pair, the terminal device may indicate, by using $\lceil \log_2 L \rceil + \lceil \log_2 K \rceil$ bits, locations that are of a beam vector and a frequency domain vector included in the space-frequency vector pair and that are in the L beam vectors and the K frequency domain vectors. In this case, the terminal device may indicate the M space-frequency units in the L×K space-frequency units by using $M \times (\lceil \log_2 L \rceil + \lceil \log_2 K \rceil)$ bits.

It can be learned that in the foregoing listed methods for indicating the M space-frequency units, the terminal device indicates the M space-frequency units by using the relative locations (for example, relative indexes or relative numbers) of the M space-frequency units in the L×K space-frequency units; or indicates the M space-frequency vector pairs by using the relative locations (for example, relative indexes or relative numbers) of the M space-frequency units in the L beam vectors and the K frequency domain vectors. In other words, when indicating the M space-frequency units, the terminal device may indicate local locations of the M space-frequency units in the L×K space-frequency units. Because a selection range is narrowed down, overheads for indicating the M space-frequency units are also reduced.

It should be understood that the foregoing listed methods for indicating the M space-frequency units are merely examples, and shall not constitute any limitation on this application. A specific method for indicating the locations of the M space-frequency units in the L×K space-frequency units is not limited in this application.

When the component information is the information (d), the component information may be information used to indicate the L-K space-frequency units (for example, the L×K space-frequency component matrices in the space-frequency component matrix set, or the L×K space-frequency component vectors in the space-frequency component vector set) and relative locations of the M space-frequency units in the L×K space-frequency units.

The method and overheads for indicating the M space-frequency component matrices or the M space-frequency component vectors by the terminal device have been described in the description of the information (b). A method and a calculation manner of overheads for indicating the L×K space-frequency component matrices or the L×K space-frequency component vectors by the terminal device are also similar to the foregoing method and overheads. For brevity, details are not described herein again.

The locations of the M space-frequency units in the L×K space-frequency units may be indicated in at least any one of the foregoing listed manners. For brevity, details are not described herein again.

Based on the foregoing descriptions, it can be learned that, regardless of which one of the foregoing listed information (a) to information (d) is the component information, the overheads of the component information may be determined.

The following describes the coefficient information in detail. In this embodiment, the coefficient information may be all carried in the second part of the CST report, or a part of the coefficient information may be carried in the first part of the CSI report, and the other part is carried in the second part of the CSI report. A plurality of implementations of indicating the precoding vector are provided in this embodiment, and different information is indicated in different implementations. The following describes in detail the method for indicating the coefficient information with reference to the foregoing three listed implementations.

Based on implementation 1 and implementation 2, the terminal device may determine, according to the foregoing method, the M weighting coefficients corresponding to the M space-frequency units. The M weighting coefficients may be indicated by using any design in Table 1.

TABLE 1

| No. | The first part includes: | The second part includes: |
|---|---|---|
| 1 | | An indication of a normalized space-frequency unit, and quantization information of each weighting coefficient that is in the M weighting coefficients and that is different from a normalized coefficient |
| 2 | | Quantization information of each of the M weighting coefficients |
| 3 | An indication of a quantity of non-zero-amplitude weighting coefficients that are in the M weighting coefficients and that are different from a normalized coefficient, or an indication of a quantity of zero-amplitude weighting coefficients that are in the M weighting coefficients and that are different from a normalized coefficient | An indication of a normalized space-frequency unit, quantization information of an amplitude of each weighting coefficient that is in the M weighting coefficients and that is different from the normalized coefficient, and quantization information of a phase of each non-zero-amplitude weighting coefficient that is in the M weighting coefficients and that is different from the normalized coefficient |
| 4 | An indication of a quantity of non-zero-amplitude weighting coefficients in the | Quantization information of an amplitude of each of the M weighting coefficients, |

TABLE 1-continued

| No. | The first part includes: | The second part includes: |
|---|---|---|
|  | M. weighting coefficients, or an indication of a quantity of zero-amplitude weighting coefficients in the M weighting coefficients | and quantization information of a phase of each non-zero-amplitude weighting coefficient in the M weighting coefficients |
| 5 | Quantization information of an amplitude of each weighting coefficient that is in the M weighting coefficients and that is different from a normalized coefficient | An indication of a normalized space-frequency unit, and quantization information of a phase of each non-zero-amplitude weighting coefficient that is in the M weighting coefficients and that is different from the normalized coefficient |
| 6 | Quantization information of an amplitude of each of the M weighting coefficients | Quantization information of a phase of each non-zero-amplitude weighting coefficient in the M weighting coefficients |
| 7 | A bitmap, used to indicate a quantity and locations of non-zero-amplitude weighting coefficients that are in the M weighting coefficients and that are different from a normalized coefficient | An indication of a normalized space-frequency unit, and quantization information of each non-zero-amplitude weighting coefficient that is in the M weighting coefficients and that is different from the normalized coefficient |
| 8 | A bitmap, used to indicate a quantity and locations of non-zero-amplitude weighting coefficients in the M weighting coefficients | Quantization information of each non-zero-amplitude weighting coefficient in the M weighting coefficients |
| 9 | A bitmap, used to indicate a quantity and locations of non-zero-amplitude weighting coefficients that are in the M weighting coefficients and that are different from a normalized coefficient, and a quantity of quantization bits of each non-zero-amplitude weighting coefficient | An indication of a normalized space-frequency unit, and quantization information of each non-zero-amplitude weighting coefficient that is in the M weighting coefficients and that is different from the normalized coefficient |
| 10 | A bitmap, used to indicate a quantity and locations of non-zero-amplitude weighting coefficients in the M weighting coefficients, and a quantity of quantization bits of each non-zero-amplitude weighting coefficient | Quantization information of each non-zero-amplitude weighting coefficient in the M weighting coefficients |

It should be noted that, in design 1 and design 2, information indicated in the first part is not listed, and this does not indicate that the first part does not carry any information. Actually, in each of design 1 to design 10 listed in Table 1, the first part may carry other information than the PMI. For example, the first part may carry one or more of an RI, a CQI, and an LI.

In addition, in design 1 to design 10 listed in Table 1, the second part may further include one of the foregoing listed component information (a) or (b). For brevity, examples are not listed one by one in Table 1.

It should be further noted that there may be one or more normalized coefficients in the table. This is not limited in this application. Normalization and normalization processing have been described in detail above. For brevity, details are not described herein again. For ease of description below, it is assumed that a quantity of the normalized coefficients is T, and T is a positive integer. The quantity of the normalized coefficients may be related to a unit of normalization processing. Because the unit of normalization processing may be predefined, the terminal device and the network device may predetermine the quantity of the normalized coefficients. Locations of the normalized coefficients may be locations of the T normalized coefficients in the M weighting coefficients.

In addition, for ease of description below, it is assumed that a quantity of quantization bits used for amplitude quantization is x, a quantity of quantization bits used for phase quantization is y, a quantity of non-zero-amplitude weighting coefficients is S, and a quantity of non-zero-amplitude weighting coefficients different from the normalized coefficient is S–T.

The following describes in detail the foregoing several listed possible designs.

Design 1: The second part includes the component information, and may further include the indication of the normalized space-frequency unit, and the quantization information of each weighting coefficient that is in the M weighting coefficients and that is different from the normalized coefficient.

The normalized space-frequency unit may be a space-frequency unit corresponding to the normalized coefficient in the M weighting coefficients. For example, each normalized space-frequency unit may be indicated with reference to the method that is used to indicate a normalized vector and that is defined in the type II codebook in the NR protocol TS38.214 R15. For example, a location of the normalized space-frequency unit in the M space-frequency units may be indicated. For example, each normalized space-frequency unit may be indicated by using $\lceil \log_2 M \rceil$ bits. An indication manner of the normalized space-frequency unit is not limited in this application.

When a normalized space-frequency vector is determined, the terminal device may indicate an amplitude and a phase of each weighting coefficient that is in the M weighting coefficients and that is different from the normalized coefficient. The quantization information of each weighting coefficient may include quantization information of the amplitude and quantization information of the phase. The quantization information of the amplitude of each weighting coefficient may be an index of a quantization value of the amplitude of the weighting coefficient. The quantization information of the phase of each weighting coefficient may also be an index of a quantization value of the phase of the weighting coefficient.

The quantity of quantization bits used to quantize the amplitude and the quantity of quantization bits used to quantize the phase of the weighting coefficient may be predefined in a protocol. Therefore, a quantity of quantization bits of amplitudes and a quantity of quantization bits of phases of the M−T weighting coefficients that are in the M weighting coefficients and that are different from the normalized coefficient may be determined. The quantity of quantization bits of the amplitudes of the M−T weighting coefficients that are in the M weighting coefficients and that are different from the normalized coefficient may be (M−T)×x bits, and the quantity of quantization bits of the phases of the M−T weighting coefficients that are in the M weighting coefficients and that are different from the normalized coefficient may be (M−T)×y bits.

Design 2 The second part includes the component information, and may further include quantization information of an amplitude of each of the M weighting coefficients and quantization information of a phase of each of the M weighting coefficients.

To be specific, in design 2, the normalized coefficient is not excluded, and the quantization information of the amplitude and the phase of each weighting coefficient is indicated. Therefore, a quantity of quantization bits of amplitudes of the M weighting coefficients and a quantity of quantization bits of phases of the M weighting coefficients may be determined. The quantity of quantization bits of the amplitudes of the M weighting coefficients may be M×x bits, and the quantity of quantization bits of the phases of the M weighting coefficients may be M×y bits.

Design 3: The first part of the CST report may include the indication of the quantity of non-zero-amplitude weighting coefficients that are in the M weighting coefficients and that are different from the normalized coefficient, or the indication of the quantity of zero-amplitude weighting coefficients that are in the M weighting coefficients and that are different from the normalized coefficient; and the second part includes the component information, and may further include the indication of the normalized space-frequency unit, the quantization information of the amplitude of each weighting coefficient that is in the M weighting coefficients and that is different from the normalized coefficient, and the quantization information of the phase of each non-zero-amplitude weighting coefficient that is in the M weighting coefficients and that is different from the normalized coefficient.

Because a total quantity M of the weighting coefficients is fixed, a sum M of the quantity of non-zero-amplitude weighting coefficients in the weighting coefficients and the quantity of zero-amplitude weighting coefficients in the weighting coefficients remains unchanged. The quantity of non-zero-amplitude weighting coefficients that are in the M weighting coefficients and that are different from the normalized coefficient and the quantity of zero-amplitude weighting coefficients that are in the M weighting coefficients and that are different from the normalized coefficient may be mutually converted. Actually, the first part may be used to indicate the quantity of non-zero-amplitude weighting coefficients that are in the M weighting coefficients and that are different from the normalized coefficient. The information may be the foregoing listed indication of the quantity of non-zero-amplitude weighting coefficients that are in the M weighting coefficients and that are different from the normalized coefficient, or the foregoing listed indication of the quantity of zero-amplitude weighting coefficients that are in the M weighting coefficients and that are different from the normalized coefficient, or may be other information. This is not limited in this application.

Whether the first part is specifically used to indicate the quantity of non-zero-amplitude weighting coefficients that are in the M weighting coefficients and that are different from the normalized coefficient, or used to indicate the quantity of zero-amplitude weighting coefficients that are in the M weighting coefficients and that are different from the normalized coefficient may be predefined in a protocol. However, regardless of whether the protocol defines that the first part is specifically used to indicate the former quantity or the latter quantity, the quantity of non-zero-amplitude weighting coefficients that are in the M weighting coefficients and that are different from the normalized coefficient may be determined. In addition, a quantity of bits of the information may be further defined in the protocol.

After the quantity of non-zero-amplitude weighting coefficients that are in the M weighting coefficients and that are different from the normalized coefficient is determined, the second part may be further used to indicate the normalized space-frequency unit and the amplitude of each weighting coefficient.

The indication of the normalized space-frequency unit has been described in detail in design 1. For brevity, details are not described again.

The second part may include the quantization information of the amplitude of each weighting coefficient that is in the M weighting coefficients and that is different from the normalized coefficient. As described above, the arrangement sequence of the weighting coefficients may be predefined. The network device may indicate and the terminal device may parse a quantization value of each weighting coefficient based on the same arrangement sequence. Therefore, locations of the non-zero-amplitude weighting coefficients may be implicitly indicated by indicating the amplitude of each weighting coefficient. Quantization information of a phase of each weighting coefficient that is in the M weighting coefficients and that is different from the normalized coefficient may be indicated in the second part, so that the network device determines the phase of each non-zero-amplitude weighting coefficient based on the quantization information of each weighting coefficient.

It is unnecessary to report a phase of the zero-amplitude weighting coefficient. Therefore, the terminal device may indicate, through the second part, only the phase of the non-zero-amplitude weighting coefficient. In addition, in the second part, the locations of the non-zero-amplitude weighting coefficients are implicitly indicated by indicating the amplitude of each weighting coefficient. Therefore, the network device may determine, based on the amplitude of each weighting coefficient, a weighting coefficient corresponding to each phase indicated in the second part.

Because the first part indicates the quantity of non-zero-amplitude weighting coefficients that are in the M weighting coefficients and that are different from the normalized coefficient, a quantity of quantization bits of amplitudes of M−T weighting coefficients different from the normalized coefficient and a quantity of quantization bits of phases of S−T non-zero-amplitude weighting coefficients different from the normalized coefficient may also be separately determined in the second part. The quantity of quantization bits of the amplitudes of the M−T weighting coefficients that are in the M weighting coefficients and that are different from the normalized coefficient may be (M−T)×x bits, and the quantity of quantization bits of the phases of the S−T non-zeroamplitude weighting coefficients that are in the M weighting coefficients and that are different from the normalized coefficient may be (S−T)×y bits.

Design 4: The first part of the CST report may include the indication of the quantity of non-zero-amplitude weighting coefficients in the M weighting coefficients, or the indication of the quantity of zero-amplitude weighting coefficients in the M weighting coefficients; and the second part includes the component information, and may further include the quantization information of the amplitude of each of the M weighting coefficients, and the quantization information of the phase of each non-zero-amplitude weighting coefficient in the M weighting coefficients.

Because a total quantity M of the weighting coefficients is fixed, a sum M of the quantity of non-zero-amplitude weighting coefficients in the weighting coefficients and the quantity of zero-amplitude weighting coefficients in the weighting coefficients remains unchanged. The quantity of non-zero-amplitude weighting coefficients in the M weighting coefficients and the quantity of zero-amplitude weighting coefficients in the M weighting coefficients may be mutually converted. Actually, the first part may be used to indicate the quantity of non-zero-amplitude weighting coefficients in the M weighting coefficients. The information may be the foregoing listed quantity of non-zero-amplitude weighting coefficients in the M weighting coefficients, or the foregoing listed quantity of zero-amplitude weighting coefficients in the M weighting coefficients, or may be other information. This is not limited in this application.

Whether the first part is specifically used to indicate the quantity of non-zero-amplitude weighting coefficients in the M weighting coefficients, or used to indicate the quantity of zero-amplitude weighting coefficients in the M weighting coefficients may be predefined in a protocol. However, regardless of whether the protocol defines that the first part is specifically used to indicate the former quantity or the latter quantity, the quantity of non-zero-amplitude weighting coefficients in the M weighting coefficients may be determined. In addition, a quantity of bits of the information may be further defined in the protocol.

After the quantity of non-zero-amplitude weighting coefficients in the M weighting coefficients is determined, the second part may be further used to indicate the amplitude of each weighting coefficient. As described above, amplitudes of the M weighting coefficients may be used to implicitly indicate locations of the non-zero-amplitude weighting coefficients. Therefore, the second part may be further used to indicate the phase of each non-zero-amplitude weighting coefficient.

Because the first part indicates the quantity of non-zero-amplitude weighting coefficients in the M weighting coefficients, a quantity of quantization bits of the amplitudes of the M weighting coefficients and a quantity of quantization bits of phases of S non-zero-amplitude weighting coefficients may also be separately determined in the second part. The quantity of quantization bits of the amplitudes of the M weighting coefficients may be M×x bits, and the quantity of quantization bits of the phases of the S non-zero-amplitude weighting coefficients may be S×y bits.

It should be understood that the information indicated in the second part of design 3 and information indicated in the second part of design 4 may be interchanged.

Design 5: The first part of the CSI report may include the quantization information of the amplitude of each weighting coefficient that is in the M weighting coefficients and that is different from the normalized coefficient; and the second part includes the component information, and may further include the indication of the normalized space-frequency unit, and the quantization information of the phase of each non-zero-amplitude weighting coefficient that is in the M weighting coefficients and that is different from the normalized coefficient.

The amplitude of each weighting coefficient that is in the M weighting coefficients and that is different from the normalized coefficient is indicated in the first part, so that a quantity and locations of non-zero-amplitude weighting coefficients that are in the M weighting coefficients and that are different from the normalized coefficient may be implicitly indicated; in other words, whether an amplitude of each of M−T weighting coefficients different from the normalized coefficient is zero may be determined. Because the quantity of quantization bits of the amplitude may be predefined in the protocol, a quantity of quantization bits of the amplitudes of the M−T weighting coefficients that are in the M weighting coefficients and that are different from the normalized coefficient may be determined. The quantity of quantization bits of the amplitudes of the M−T weighting coefficients that are in the M weighting coefficients and that are different from the normalized coefficient may be (M−T)×x bits.

The quantity and the locations of non-zero-amplitude weighting coefficients that are in the M weighting coefficients and that are different from the normalized coefficient are implicitly indicated in the first part, and the normalized space-frequency unit is indicated in the second part. Therefore, only the phase of each non-zero-amplitude weighting coefficient different from the normalized coefficient may be indicated in the second part, and a weighting coefficient corresponding to each phase indicated in the second part may be determined.

Because the quantity of quantization bits of the phase may be predefined in the protocol, a quantity of quantization bits of phases of S−T non-zero-amplitude weighting coefficients that are in the M weighting coefficients and that are different from the normalized coefficient may also be determined. The quantity of quantization bits of the phases of the S−T non-zero-amplitude weighting coefficients that are in the M weighting coefficients and that are different from the normalized coefficient may be (S−T)×y bits.

Design 6: The first part of the CSI report may include the quantization information of the amplitude of each of the M weighting coefficients; and the second part includes the component information, and may further include the quantization information of the phase of each non-zero-amplitude weighting coefficient in the M weighting coefficients.

The amplitude of each of the M weighting coefficients is indicated in the first part, so that a quantity and locations of non-zero-amplitude weighting coefficients in the M weighting coefficients may be implicitly indicated; in other words, whether the amplitude of each of the M weighting coefficients is zero may be determined. Because the quantity of quantization bits of the amplitude may be predefined in the protocol, a quantity of quantization bits of the amplitudes of the M weighting coefficients may be determined. The quantity of quantization bits of the amplitudes of the M weighting coefficients may be M×x bits.

The quantity and the locations of non-zero-amplitude weighting coefficients in the M weighting coefficients are indicated in the first part. Therefore, only the phase of each non-zero-amplitude weighting coefficient may be indicated in the second part, and a weighting coefficient corresponding to the phase of each non-zero-amplitude weighting coefficient indicated in the second part may be determined.

Because the quantity of quantization bits of the phase may be predefined in the protocol, a quantity of quantization bits of phases of S non-zero-amplitude weighting coefficients in the M weighting coefficients may also be determined. The quantity of quantization bits of the phases of the S non-zero-amplitude weighting coefficients in the M weighting coefficients may be S×y bits.

Design 7: The first part of the CSI report may be the bitmap used to indicate the quantity and the locations of non-zero-amplitude weighting coefficients that are in the M weighting coefficients and that are different from the normalized coefficient; and the second part includes the component information, and may further include the indication of the normalized space-frequency unit, and the quantization information of each non-zero-amplitude weighting coefficient that is in the M weighting coefficients and that is different from the normalized coefficient.

Specifically, a length of the bitmap may be M−T bits. The M−T bits may be in a one-to-one correspondence with M−T non-zero-amplitude weighting coefficients different from the normalized coefficient, and each bit may be used to indicate whether an amplitude of a corresponding weighting coefficient is zero. For example, when a bit is set to "1" it may indicate that an amplitude of a corresponding weighting coefficient is not zero. When a bit is set to "0", it may indicate that an amplitude of a corresponding weighting coefficient is zero. Therefore, the quantity and the locations of non-zero-amplitude weighting coefficients in the M−T weighting coefficients different from the normalized coefficient may be indicated; in other words, a quantity and locations of zero-amplitude weighting coefficients may be indicated. In other words, the bitmap is used to indicate the quantity and the locations of non-zero-amplitude weighting coefficients that are in the M weighting coefficients and that are different from the normalized coefficient, or each bit in the bitmap is used to indicate whether the amplitude of the corresponding weighting coefficient is zero. The two indications may be equivalent or interchangeable.

It should be understood that a correspondence between the bit in the bitmap and the indicated information is shown above merely for ease of understanding. However, this shall not constitute any limitation on this application. The correspondence between the bit in the bitmap and the indicated information is not limited in this application.

The quantity and the locations of non-zero-amplitude weighting coefficients that are in the M weighting coefficients and that are different from the normalized coefficient are indicated in the first part, and the normalized space-frequency unit is indicated in the second part. Therefore, only the amplitude and the phase of each non-zero-amplitude weighting coefficient different from the normalized coefficient may be indicated in the second part, and a weighting coefficient corresponding to each amplitude and phase indicated in the second part may be determined.

The quantization information of each weighting coefficient may include quantization information of an amplitude and quantization information of a phase. Because the quantity of quantization bits of the amplitude and the quantity of quantization bits of the phase may be predefined in the protocol, a quantity of quantization bits of amplitudes and a quantity of quantization bits of phases of S−T non-zero-amplitude weighting coefficients that are in the M weighting coefficients and that are different from the normalized coefficient may both be determined. The quantity of quantization bits of the amplitudes of the S−T non-zero-amplitude weighting coefficients that are in the M weighting coefficients and that are different from the normalized coefficient may be (S−T)×x bits, and the quantity of quantization bits of the phases of the S-IT non-zero-amplitude weighting coefficients may be (S−T)×y bits.

Design 8: The first part of the CSI report may be the bitmap used to indicate the quantity and the locations of non-zero-amplitude weighting coefficients in the M weighting coefficients; and the second part includes the component information, and may further include the quantization information of each non-zero-amplitude weighting coefficient in the M weighting coefficients.

Specifically, a length of the bitmap may be M bits. The M bits may be in a one-to-one correspondence with the M weighting coefficients, and each bit may be used to indicate whether an amplitude of a corresponding weighting coefficient is zero. Therefore, the quantity and the locations of non-zero-amplitude weighting coefficients in the M weighting coefficients may be indicated; in other words, a quantity and locations of zero-amplitude weighting coefficients may be indicated. In other words, the bitmap is used to indicate the quantity and the locations of non-zero-amplitude weighting coefficients in the M weighting coefficients, or each bit in the bitmap is used to indicate whether the amplitude of the corresponding weighting coefficient is zero. The two indications may be equivalent or interchangeable.

The quantity and the locations of non-zero-amplitude weighting coefficients in the M weighting coefficients are indicated in the first part. Therefore, only an amplitude and a phase of each non-zero-amplitude weighting coefficient may be indicated in the second part, and a weighting coefficient corresponding to each amplitude and phase indicated in the second part may be determined.

The quantization information of each weighting coefficient may include quantization information of an amplitude and quantization information of a phase. Because the quantity of quantization bits of the amplitude and the quantity of quantization bits of the phase may be predefined in the protocol, a quantity of quantization bits of amplitudes and a quantity of quantization bits of phases of S non-zero-amplitude weighting coefficients in the M weighting coefficients may both be determined. The quantity of quantization bits of the amplitudes of the S non-zero-amplitude weighting coefficients that are in the M weighting coefficients and that are different from the normalized coefficient may be S×x bits, and the quantity of quantization bits of the phases of the S non-zero-amplitude weighting coefficients may be S×y bits.

Design 9: The first part of the CSI report may be the bitmap used to indicate the quantity and the locations of non-zero-amplitude weighting coefficients that are in the M weighting coefficients and that are different from the normalized coefficient, and a quantization level to which each non-zero-amplitude weighting coefficient belongs; and the second part includes the component information, and may further include the indication of the normalized space-frequency unit, and the quantization information of each non-zero-amplitude weighting coefficient that is in the M weighting coefficients and that is different from the normalized coefficient.

Specifically, a length of the bitmap may be (M−T)×k bits. The (M−T)×k bits may correspond to M−T weighting coefficients different from the normalized coefficient, and every k bits may be used to indicate whether an amplitude of a corresponding weighting coefficient is zero. In other words, the bitmap is used to indicate the quantity and the locations of non-zero-amplitude weighting coefficients that are in the M weighting coefficients and that are different from the normalized coefficient, or every k bits in the bitmap are used to indicate whether the amplitude of the corresponding weighting coefficient is zero. The two indications may be equivalent or interchangeable.

A value of k may be greater than 1, for example, may be 2. In this case, every k bits may be further used to indicate a quantity of quantization bits of the corresponding weighting coefficient.

The quantity of quantization bits of each weighting coefficient may correspond to a quantization level. Every k bits in the bitmap may be used to indicate the quantization level to which the corresponding weighting coefficient belongs, so that the quantity of quantization bits of the weighting coefficient may be indirectly indicated.

In this embodiment, quantities of quantization bits of the weighting coefficients may be classified into a plurality of quantization levels. For example, classification may be performed based on the amplitude or other information. This is not limited in this application. Every k bits ma be used to indicate $2^k$ quantization levels. Each quantization level may correspond to one configuration of the quantity of quantization bits. In each configuration of the quantity of quantization bits, the quantity of quantization bits of the amplitude and the quantity of quantization bits of the phase may be separately configured. At least two quantization levels correspond to different configurations of the quantity of quantization bits.

Specifically, the plurality of quantization levels may include at least a first level, a second level, and a third level. For example, when the bits are set to "00", it may indicate that the corresponding weighting coefficient belongs to the first level; when the bits are set to "11", it may indicate that the corresponding weighting coefficient belongs to the third level; and when the bits are set to "10" or "01", it may indicate that the corresponding weighting coefficient belongs to the second level. The first level may correspond to a weighting coefficient whose amplitude is zero, the third level may correspond to a weighting coefficient whose amplitude is 1, and the second level may correspond to a weighting coefficient whose amplitude is neither zero nor 1. It should be understood that the second level is defined only for ease of distinguishing from the first level and the third level, and shall not constitute any limitation on this application. The weighting coefficients are classified into three levels above merely for ease of understanding, and shall not constitute any limitation on this application. When the value of k is 2, k may alternatively be used to indicate four quantization levels. For example, weighting coefficients whose amplitudes are neither zero nor 1 may be classified into more quantization levels based on the amplitudes. This is not limited in this application. It should be further understood that a correspondence between the bit in the bitmap and the quantization level is shown above merely for ease of understanding. However, this shall not constitute any limitation on this application. The correspondence between the bit in the bitmap and the quantization level is not limited in this application.

Table 2 shows an example of different quantization levels.

Because the first level corresponds to the zero-amplitude weighting coefficient, the weighting coefficient (including the amplitude and the phase) corresponding to the first level may not be indicated, that is, $y_1$ may be 0.

For example, the quantities of quantization bits in the table may satisfy $x_3 > x_2 > x_1$ and $y_3 > y_2 > y_1$; or $x_3 + y_3 > x_2 + y_2 > x_1 + y_1$; or $x_3 = x_2$, $x_2 > x_1$, $y_3 = y_2$, and $y_2 > y_1$; or $x_3 + y_3 = x_2 + y_2$, and $x_2 + y_2 > x_1 + y_1$. A value relationship between the quantities of quantization bits corresponding to different levels is not limited in this application. Any value relationship shall fall within the protection scope of this application, provided that quantities of quantization bits of amplitudes corresponding to at least two quantization levels are different, and/or quantities of quantization bits of phases corresponding to at least two quantization levels are different.

In addition, the second part may further include an indication of a location of the normalized coefficient. The quantity and the locations of non-zero-amplitude weighting coefficients different from the normalized coefficient are indicated in the first part, so that the locations of the S−T non-zero-amplitude weighting coefficients different from the normalized coefficient may be determined based on the normalized space-frequency unit indicated in the second part.

The quantization level may be predefined in the protocol, and the quantity of quantization bits corresponding to each quantization level may also be defined. The quantity of quantization bits may specifically include the quantity of quantization bits of the amplitude and the quantity of quantization bits of the phase. Therefore, a quantity of quantization bits of amplitudes and a quantity of quantization bits of phases of the S−T non-zero-amplitude weighting coefficients that are indicated in the second part and that are different from the normalized coefficient may both be determined.

Design 10: The first part of the CSI report may be the bitmap used to indicate the quantity and the locations of non-zero-amplitude weighting coefficients in the M weighting coefficients, and the quantity of quantization bits of the non-zero-amplitude weighting coefficient; and the second part includes the component information, and may further include the quantization information of each non-zero-amplitude weighting coefficient that is in the M weighting coefficients and that is different from the normalized coefficient.

Specifically, a length of the bitmap may be M×k bits. The M×k bits may correspond to the M weighting coefficients, and every k bits may be used to indicate whether an amplitude of a corresponding weighting coefficient is zero. In other words, the bitmap is used to indicate the quantity and the locations of non-zero-amplitude weighting coefficients in the M weighting coefficients, or every k bits in the bitmap are used to indicate whether the amplitude of the corresponding weighting coefficient is zero. The two indications may be equivalent or interchangeable.

A value of k may be greater than 1, for example, may be 2. In this case, every k bits may be further used to indicate

TABLE 2

| Quantization level | Bits in the bitmap | Quantity of quantization bits of the amplitude | Quantity of quantization bits of the phase |
|---|---|---|---|
| First level | 00 | $x_1$ | $y_1$ |
| Second level | 01 or 10 | $x_2$ | $y_2$ |
| Third level | 11 | $x_3$ | $y_3$ | a quantity of quantization bits of the corresponding weighting coefficient. The quantity of quantization bits of each weighting coefficient may correspond to a quantization level. Every k bits in the bitmap may be used to indicate the quantization level to which the corresponding weighting coefficient belongs, so that the quantity of quantization bits of the weighting coefficient may be indirectly indicated.

The quantization level and the correspondence between the quantization level and the quantity of quantization bits have been described above. For brevity, details are not described herein again.

Because the normalized space-frequency unit is not excluded from the bitmap in the first part, amplitudes and phases of S non-zero-amplitude weighting coefficients may be indicated in the second part. A quantity of quantization bits of the amplitudes and a quantity of quantization bits of the phases of the S non-zero-amplitude weighting coefficients indicated in the second part may be determined based on the predefined correspondence between the quantization level and the quantity of quantization bits.

Based on implementation 3, the terminal device may determine, according to the foregoing method, the M weighting coefficients corresponding to the M space-frequency units. The M weighting coefficients may be indicated by using any design in Table 3.

TABLE 3

| No. | The first part includes: | The second part includes: |
|---|---|---|
| 1 |  | An indication of a normalized space-frequency unit, and quantization information of an amplitude of each weighting coefficient that is in the M weighting coefficients and that is different from a normalized coefficient |
| 2 |  | Quantization information of an amplitude of each of the M weighting coefficients |
| 3 | An indication of a quantity of non-zero-amplitude weighting coefficients that are in the M weighting coefficients and that are different from a normalized coefficient, or an indication of a quantity of zero-amplitude weighting coefficients that are in the M weighting coefficients and that are different from a normalized coefficient | An indication of a normalized space-frequency unit, quantization information of an amplitude of each weighting coefficient that is in the M weighting coefficients and that is different from the normalized coefficient, and quantization information of a phase of each non-zero-amplitude weighting coefficient that is in the M weighting coefficients and that is different from the normalized coefficient |
| 4 | An indication of a quantity of non-zero-amplitude weighting coefficients in the M weighting coefficients, or an indication of a quantity of zero-amplitude weighting coefficients in the M weighting coefficients | Quantization information of an amplitude of each of the M weighting coefficients, and quantization information of a phase of each non-zero-amplitude weighting coefficient in the M weighting coefficients |
| 5 | Quantization information of an amplitude of each weighting coefficient that is in the M weighting coefficients and that is different from a normalized coefficient | An indication of a normalized space-frequency unit, and quantization information of a phase of each non-zero-amplitude weighting coefficient that is in the M weighting coefficients and that is different from the normalized coefficient |
| 6 | Quantization information of an amplitude of each of the M weighting coefficients | Quantization information of a phase of each non-zero-amplitude weighting coefficient in the M weighting coefficients |
| 7 | A bitmap, used to indicate a quantity and locations of non-zero-amplitude weighting coefficients that are in the M weighting coefficients and that are different from a normalized coefficient | An indication of a normalized space-frequency unit, and quantization information of each non-zero-amplitude weighting coefficient that is in the M weighting coefficients and that is different from the normalized coefficient |
| 8 | A bitmap, used to indicate a quantity and locations of non-zero-amplitude weighting coefficients in the M weighting coefficients | Quantization information of each non-zero-amplitude weighting coefficient in the M weighting coefficients |
| 9 | A bitmap, used to indicate a quantity and locations of non-zero-amplitude weighting coefficients that are in the M weighting coefficients and that are different from a normalized coefficient, and a quantization level to which an amplitude of each non-zero-amplitude weighting coefficient belongs | An indication of a normalized space-frequency unit, and quantization information of an amplitude of each non-zero-amplitude weighting coefficient that is in the M weighting coefficients and that is different from the normalized coefficient |
| 10 | A bitmap, used to indicate a quantity and locations of non-zero-amplitude weighting coefficients in the M weighting coefficients, and a quantization level to which an amplitude of each non-zero-amplitude weighting coefficient belongs | Quantization information of each non-zero-amplitude weighting coefficient in the M weighting coefficients |
| 11 | A bitmap, used to indicate a quantity and locations of non-zero-amplitude weighting coefficients that are in the L × K | An indication of a normalized space-frequency unit, and quantization information of each non-zero-amplitude |

TABLE 3-continued

| No. | The first part includes: | The second part includes: |
|-----|--------------------------|---------------------------|
|     | weighting coefficients and that are different from a normalized coefficient | weighting coefficient different from the normalized coefficient |
| 12  | A bitmap, used to indicate a quantity and locations of non-zero-amplitude weighting coefficients in the L × K weighting coefficients | Quantization information of each non-zero-amplitude weighting coefficient |
| 13  | A bitmap, used to indicate a quantity and locations of non-zero-amplitude weighting coefficients that are in the L × K weighting coefficients and that are different from a normalized coefficient, and a quantization level to which each non-zero-amplitude weighting coefficient belongs | An indication of a normalized space-frequency unit, and quantization information of an amplitude of each non-zero-amplitude weighting coefficient different from the normalized coefficient |
| 14  | A bitmap, used to indicate a quantity and locations of non-zero-amplitude weighting coefficients in the L × K weighting coefficients, and a quantization level to which each non-zero-amplitude weighting coefficient belongs | Quantization information of an amplitude of each non-zero-amplitude weighting coefficient |

It should be noted that, in design 1 and design 2, information indicated in the first part is not listed, and this does not indicate that the first part does not carry any information. Actually in each of design 1 to design 10 listed in Table 2, the first part may carry other information than the PMI. For example, the first part may carry one or more of an RI, a CQI, and an LI.

In addition, in design 1 to design 10 listed in Table 2, the second part may further include one of the foregoing listed component information (c) or (d). In design 11 to design 14, the second part may further include one of the foregoing listed component information (a) or (b). For brevity, examples are not listed one by one in Table 2.

Design 1 to design 10 have been described in detail above with reference to Table 1. For brevity, details are not described herein again. Design 11 to design 14 are described in detail below.

Design 11: The first part of the CSI report may be the bitmap used to indicate the quantity and the locations of non-zero-amplitude weighting coefficients that are in the K×L weighting coefficients and that are different from the normalized coefficient; and the second part includes the component information, and may further include the indication of the normalized space-frequency unit, and the quantization information of each non-zero-amplitude weighting coefficient different from the normalized coefficient.

Specifically, a length of the bitmap may be L×K−T bits. The L×K−T bits may correspond to L×K−T weighting coefficients different from the normalized coefficient, and each bit may be used to indicate whether an amplitude of a corresponding weighting coefficient is zero. In other words, the bitmap is used to indicate the quantity and the locations of non-zero-amplitude weighting coefficients that are in the M weighting coefficients and that are different from the normalized coefficient, or each bit in the bitmap is used to indicate whether the amplitude of the corresponding weighting coefficient is zero. The two indications may be equivalent or interchangeable.

The L×K weighting coefficients are weighting coefficients corresponding to the L×K space-frequency units described in implementation 3. Because the terminal device may further select M space-frequency units from the L×K space-frequency units, amplitudes of weighting coefficients of L×K−M space-frequency units that are in the L×K space-frequency units and that are different from the M selected space-frequency units may all be set to zero. Therefore, whether the amplitude of each weighting coefficient is zero may be indicated, and locations of the M selected space-frequency units in the L×K space-frequency units may be further indicated. In the following listed design 12 to design 14, the locations of the M selected space-frequency units in the L×K space-frequency units may also be indicated based on the same manne.

Actually, a quantity of the space-frequency units selected from the L×K space-frequency units ray be M, or may be less than M. This is not limited in this application. To be specific, a quantity of zero-amplitude weighting coefficients in the L×K weighting coefficients may be L×K−M, or may be greater than L×K−M. When the quantity of zero-amplitude weighting coefficients is greater than L×K−M, the quantity of the selected space-frequency units may be less than M. In this case, a zero-amplitude space-frequency unit in the M space-frequency units indicated by the terminal device may not be needed, that is, a weighting coefficient of the zero-amplitude space-frequency unit is zero. Therefore, the terminal device may indicate, through the bitmap in the first part, several space-frequency units used for weighted summation to determine the precoding vector. For brevity, descriptions of a same or similar case are omitted below.

Because locations of the several selected space-frequency units in the L×K space-frequency units are implicitly indicated in the first part, the locations of the several selected space-frequency units in the L×K space-frequency units may not need to be indicated in the second part of the CSI report. In addition, the terminal device may indicate a location of the normalized coefficient in the second part, so that the network device determines the locations of non-zero-amplitude weighting coefficients different from the normalized coefficient. The terminal device may further indicate, in the second part, an amplitude and a phase of each non-zero-amplitude weighting coefficient different from the normalized coefficient.

Quantization information of each weighting coefficient may include quantization information of an amplitude and quantization information of a phase. Because quantization levels are not distinguished in design 11, a quantity of quantization bits of the amplitudes of the S−T non-zero-amplitude weighting coefficients different from the normalized coefficient may be (S−T)×x bits, and a quantity of quantization bits of the phases of the S−T non-zero-amplitude weighting coefficients different from the normalized coefficient may be (S−T)×y bits.

Design 12: The first part of the CSI report may be the bitmap used to indicate the quantity and the locations of non-zero-amplitude weighting coefficients in the L×K weighting coefficients; and the second part includes the component information, and may further include the quantization information of each non-zero-amplitude weighting coefficient.

Specifically, a length of the bitmap may be L×K bits. The L×K bits may correspond to the L×K weighting coefficients, and each bit may be used to indicate whether an amplitude of a corresponding weighting coefficient is zero. In other words, the bitmap is used to indicate the quantity and the locations of non-zero-amplitude weighting coefficients in the M weighting coefficients, or each bit in the bitmap is used to indicate whether the amplitude of the corresponding weighting coefficient is zero. The two indications may be equivalent or interchangeable.

Because locations of several selected space-frequency units in the L×K space-frequency units are implicitly indicated in the first part through the L×K bits corresponding to the L×K weighting coefficients, the locations of the several selected space-frequency units in the L×K space-frequency units may not need to be indicated in the second part of the CSI report.

Only an amplitude and a phase of each non-zero-amplitude weighting coefficient may be indicated in the second part. Because quantization levels are not distinguished in design 12, a quantity of quantization bits of the amplitudes of the S non-zero-amplitude weighting coefficients may be S×x bits, and a quantity of quantization bits of the phases of the S non-zero-amplitude weighting coefficients may be S×y bits.

Design 13: The first part of the CSI report may be the bitmap used to indicate the quantity and the locations of non-zero-amplitude weighting coefficients that are in the K×L weighting coefficients and that are different from the normalized coefficient, and the quantization level to which each non-zero-amplitude weighting coefficient belongs; and the second part includes the component information, and may further include the indication of the normalized space-frequency unit, and the quantization information of each non-zero-amplitude weighting coefficient different from the normalized coefficient.

Specifically, a length of the bitmap may be (L×K−T)×k bits. The (L×K−T)×k bits may correspond to L×K−T weighting coefficients different from the normalized coefficient, and every k bits may be used to indicate whether an amplitude of a corresponding weighting coefficient is zero. In other words, the bitmap is used to indicate the quantity and the locations of non-zero-amplitude weighting coefficients that are in the K×L weighting coefficients and that are different from the normalized coefficient, or every k bits in the bitmap are used to indicate whether the amplitude of the corresponding weighting coefficient is zero. The two indications may be equivalent or interchangeable.

Every k bits are further used to indicate a quantity of quantization bits of the corresponding weighting coefficient. The quantity of quantization bits of each weighting coefficient may correspond to a quantization level. Every k bits in the bitmap may be used to indicate the quantization level to which the corresponding weighting coefficient belongs, so that the quantity of quantization bits of the weighting coefficient may be indirectly indicated.

The quantization level and the correspondence between the quantization level and the quantity of quantization bits have been described above. For brevity, details are not described herein again.

Because the locations of the M space-frequency units in the L×K−T space-frequency units are implicitly indicated in the first part through the (L×K−T)×k bits corresponding to the L×K−T weighting coefficients, the locations of the M space-frequency units in the L×K space-frequency units may not need to be indicated in the second part of the CSI report.

In addition, the terminal device may indicate the normalized space-frequency unit in the second part, so that the network device determines the locations of non-zero-amplitude weighting coefficients different from the normalized coefficient. The terminal device may further indicate, in the second part, an amplitude and a phase of each non-zero-amplitude weighting coefficient different from the normalized coefficient.

Quantization information of each weighting coefficient may include quantization information of an amplitude and quantization information of a phase, and may specifically include a quantity of quantization bits of the amplitude and a quantity of quantization bits of the phase. Because in design 13, the quantization level may be indicated through k bits, a quantity of quantization bits of the amplitudes and a quantity of quantization bits of the phases of the S−T non-zero-amplitude weighting coefficients different from the normalized coefficient may be determined based on the predefined correspondence between the quantization level and the quantity of quantization bits.

Design 14: The first part of the CSI report may be the bitmap used to indicate the quantity and the locations of non-zero-amplitude weighting coefficients in the L×K weighting coefficients, and the quantization level to which each non-zero-amplitude weighting coefficient belongs; and the second part includes the component information, and may further include the quantization information of each non-zero-amplitude weighting coefficient.

Specifically, a length of the bitmap may be L×K×k bits. The L×K×k bits may correspond to the L×K weighting coefficients, and every k bits may be used to indicate whether an amplitude of a corresponding weighting coefficient is zero. In other words, the bitmap is used to indicate the quantity and the locations of non-zero-amplitude weighting coefficients in the K×L weighting coefficients, or every k bits in the bitmap are used to indicate whether the amplitude of the corresponding weighting coefficient is zero. The two indications may be equivalent or interchangeable.

Every k bits in the bitmap are further used to indicate a quantity of quantization bits of the corresponding weighting coefficient, which may specifically include a quantity of quantization bits of an amplitude and a quantity of quantization bits of a phase. The quantity of quantization bits of each weighting coefficient may correspond to a quantization level. Every k bits in the bitmap may be used to indicate the quantization level to which the corresponding weighting coefficient belongs, so that the quantity of quantization bits of the weighting coefficient may be indirectly indicated.

The quantization level and the correspondence between the quantization level and the quantity of quantization bits have been described above. For brevity, details are not described herein again.

Because the normalized space-frequency unit is not excluded from the bitmap in the first part, amplitudes and phases of S non-zero-amplitude weighting coefficients may be indicated in the second part. Because in design 14, the quantization level may be indicated through k bits, a quantity of quantization bits of the amplitudes and a quantity of quantization bits of the phases of the S non-zero-amplitude weighting coefficients indicated in the second part may be determined based on the predefined correspondence between the quantization level and the quantity of quantization bits.

Several possible designs of the CSI report are listed above for ease of understanding. However, this shall not constitute any limitation on this application. The design of the CSI report is not limited to the foregoing examples. For example, the second part in design 4 may use the information in the second part in design 3, the second part in design 6 may use the information in the second part in design 5, the second part in design 8 may use the information in the second part in design 7, the second part in design 10 may also use the information in the second part in design 9, the second part in design 12 may also use the information in the second part in design 11, and the second part in design 14 may also use the information in the second part in design 13. For brevity, examples are not listed one by one herein. The design of the CSI report may be defined in a protocol. The terminal device may generate the CSI report based on the design, and the network device may also parse the CSI report based on the design.

It should be understood that the CST report is not limited to the information listed above, and other information included in the CSI report is not limited in this application.

In operation 220, the terminal device sends the CSI report. Correspondingly, in operation 220, the network device receives the CSI report.

For example, the terminal device may send the first indication information to the network device through a physical uplink resource such as a physical uplink shared channel (PUSCH) or a physical uplink control channel (PUCCH), so that the network device restores the precoding vector based on the first indication information.

A specific method for sending, by the terminal device, the first indication information to the network device through the physical uplink resource may be the same as that in the current technology. For brevity, detailed descriptions of a specific process are omitted herein.

Specifically, the terminal device may send the one or more CSI reports to the network device on a time-frequency resource preconfigured by the network device. For a specific process in which the terminal device sends the CSI report to the network device, refer to the current technology. For brevity, detailed descriptions of the specific process are omitted in this application.

In operation 230, the network device determines the precoding vector of the one or more frequency domain units based on the PMI report.

The network device may determine a space-frequency matrix (or a space-frequency vector) based on the first indication information. The space-frequency matrix (or the space-frequency vector) is the same as or similar to the space-frequency matrix (or the space-frequency vector) determined by the terminal device in operation 210 in the foregoing.

Alternatively, the network device may determine the precoding vector of each frequency domain unit based on the first indication information and a predefined formula.

A specific process of determining the precoding vector by the network device is described below with reference to the information fed back in the foregoing three listed implementations.

Based on implementation 1, the network device may calculate, based on the L beam vectors, the K frequency domain vectors, and the corresponding weighting coefficients, a weighted sum of the L×K space-frequency units corresponding to the L beam vectors and the K frequency domain vectors, to determine a space-frequency matrix. Each column vector in the space-frequency matrix may be used to determine a precoding vector of a corresponding frequency domain unit. For example, normalization processing is performed on each column vector in the space-frequency matrix, to obtain a precoding vector corresponding to each frequency domain unit.

The normalization processing may be performed by separately multiplying $N_s$ elements in each column by a normalized coefficient, to enable a sum of powers of the elements in the column to be equal to 1. The normalized coefficient may be, for example, a reciprocal of a square root of a sum of modulus lengths of the $N_s$ elements in this column. A specific method of the normalization processing is not limited in this application.

It should be understood that the normalized coefficient described herein may be different from the normalized coefficient described above.

Alternatively, the network device may not determine the space-frequency matrix, but directly determine, based on the following formula, a precoding vector $p_{n_f}$ corresponding to a frequency domain unit $n_f$:

$$p_{n_1} = \beta_1 \sum_{l=0}^{L-1} v_s^l \left( \sum_{k=1}^{K-1} c_{l,k} \overline{v}_f^{k,n_f} \right).$$

$\beta_1$ is the normalized coefficient, and $\beta_1 > 0$; $v_s^i$ represents a beam vector l in the L beam vectors; $v_f^{k,n_f}$ represents an element $n_f$ in a frequency domain vector k, that is, $v_f^k$ in the K frequency domain vectors, and $\overline{v}_f^{k,n_f}$ is a conjugate of $v_f^{k,n_f}$; and $c_{l,k}$ represents a weighting coefficient corresponding to the beam vector l and the frequency domain vector k. Based on implementation 2, the network device may calculate, based on the M space-frequency component matrices or space-frequency component vectors and the corresponding weighting coefficients, a weighted sum of the M space-frequency component matrices, to determine a space-frequency matrix. Each column vector in the space-frequency matrix may be used to determine a precoding vector of a corresponding frequency domain unit.

Alternatively, the network device may calculate, based on the M space-frequency component vectors and the corresponding weighting coefficient, a weighted sum of each space-frequency component vector, to determine a space-frequency vector. A column vector constructed by sequentially connecting elements that are in the space-frequency vector and that correspond to a same frequency domain unit may be used as a precoding vector of the frequency domain unit.

For example, when the space-frequency component vector is determined based on a Kronecker product of a frequency domain vector and a beam vector, elements $n_f \times n_s$ to $(n_f+1) \times n_s-1$ in the space-frequency vector may correspond to a precoding vector of a frequency domain unit $n_f$.

Alternatively, the network device may not determine the space-frequency matrix or the space-frequency vector, but directly determine, based on the following formula, the precoding vector $p_{n_j}$ corresponding to the frequency domain unit $n_f$:

$$p_{n_f} = \beta_2 \left[ \sum_{m=0}^{M-1} c_m v_{m,n_f} \right].$$

$\beta_2$ the normalized coefficient, and $\beta_2 > 0$; $v_{m,n_f}$ represents a vector that is in a space-frequency component matrix m in the M space-frequency component matrices and that corresponds to the frequency domain unit $n_f$, or a vector obtained by sequentially connecting elements that are in a space-frequency component vector m in the M space-frequency component vectors and that correspond to the frequency domain unit $n_f$; and $c_m$ represents a weighting coefficient corresponding to the space-frequency component matrix m or the space-frequency component vector m. Based on implementation 3, the network device may calculate a weighted sum of the M space-frequency units based on the L beam vectors, the K frequency domain vectors, the M space-frequency units in the L×K space-frequency units, and the weighting coefficients corresponding to the M space-frequency units, to determine the space-frequency matrix or the space-frequency vector. Each column vector in the space-frequency matrix may be used to determine a precoding vector of a corresponding frequency domain unit. Alternatively a column vector constructed by sequentially connecting elements that are in the space-frequency vector and that correspond to a same frequency domain unit may be used as a precoding vector of the frequency domain unit.

Alternatively, the network device may not determine the space-frequency matrix or the space-frequency vector, but directly determine, based on the following formula, a precoding vector $p_{n_f}$ corresponding to the frequency domain unit $n_f$:

$$p_{n_f} = \beta_3 \left[ \sum_{m=0}^{M-1} v_s^m c_m \overline{v}_f^{m,n_f} \right].$$

$\beta_3$ represents a normalized coefficient, and $\beta_3 > 0$; $v_s^m$ represents a beam vector corresponding to a space-frequency unit m in the M space-frequency units; $\overline{v}_f^{m,n_f}$ is a conjugate of $v_f^{m,n_f}$, and $v_f^{m,n_f}$ represents an element $n_f$ in a frequency domain vector $v_f^m$ corresponding to the space-frequency unit m in the M space-frequency units; and $c_m$ represents a weighting coefficient corresponding to the space-frequency unit n in the M space-frequency units.

According to the foregoing listed methods, the network device may determine the precoding vector of the one or more frequency domain units at the transport layer.

It should be noted that, as described above, the length $N_f$ of the frequency domain vector may be a quantity of frequency domain units included in a frequency-domain occupied bandwidth of a CSI measurement resource configured for the terminal device, a signaling length of a reporting band, or a quantity of to-be-reported frequency domain units. When a length of the frequency domain vector is the quantity of frequency domain units included in the frequency-domain occupied bandwidth of the CSI measurement resource configured for the terminal device or the signaling length of the reporting band, the quantity of to-be-reported frequency domain units may be less than or equal to $N_f$. Therefore, the network device may determine the precoding vector of each frequency domain unit based on locations that are of the to-be-reported frequency domain units and that are indicated by the reporting band or other signaling.

When the length of the frequency domain vector is determined based on the quantity of frequency domain units included in the frequency-domain occupied bandwidth of the CSI measurement resource or the signaling length of the reporting band, a change rule of a channel in a plurality of consecutive frequency domain units may be reflected by using the frequency domain vector. Compared with the method for determining the length of the frequency domain vector based on the quantity of to-be-reported frequency domain units, the frequency domain vector determined based on the quantity of frequency domain units in the frequency-domain occupied bandwidth of the CSI measurement resource or the signaling length of the reporting band can more accurately reflect the change rule of the channel in frequency domain, and a precoding vector restored based on a feedback can better adapt to the channel.

It should be understood that the specific method for determining, by the network device based on the first indication information, the precoding vector corresponding to the frequency domain unit $n_f$ is merely an example, and shall not constitute any limitation on this application. This application does not exclude a possibility that the network device determines, in another manner based on the first indication information, a precoding vector corresponding to a sub-band $n_f$. It should be further understood that the specific process in which the terminal device indicates the precoding vector in one polarization direction at one transport layer and the network device determines the precoding vector is described in detail above with reference to FIG. 2. However, it should be understood that the method is not only applicable to a case in which there is one transport layer or one polarization direction, but also applicable to a case in which there are a plurality of transport layers or a plurality of polarization directions.

As described above, for the same transport layer, the terminal device may indicate precoding vectors of frequency domain units in a plurality of polarization directions respectively by using a plurality of pieces of first indication information. For ease of differentiation and description, one or more pieces of first indication information (which respectively correspond to one or more polarization directions) used to indicate one or more precoding vectors of the frequency domain units at one transport layer are referred to as indication information corresponding to the transport layer below.

In the plurality of pieces of first indication information corresponding to the plurality of polarization directions, component information corresponding to the plurality of polarization directions may be the same, or may be different, and coefficient information corresponding to the plurality of polarization directions may be different.

If the component information corresponding to the plurality of polarization directions is the same, the same component information may be shared in the plurality of polarization directions, and the plurality of pieces of first indication information may indicate the component information only once. In this case, the component information may be considered as common information. For ease of differentiation and description, the common information is referred to as inter-polarization-direction common information. The inter-polarization-direction common information may be considered as a common part of the plurality of pieces of first indication information.

If the component information corresponding to the plurality of polarization directions is different, the plurality of pieces of first indication information may be used to indicate the component information corresponding to the plurality of polarization directions respectively. In this case, the component information may be considered as specific information.

If the coefficient information corresponding to the plurality of polarization directions is different, the plurality of pieces of first indication information may be used to indicate the coefficient information corresponding to the plurality of polarization directions respectively. In this case, the coefficient information may be considered as specific information.

Detailed descriptions are provided below with reference to the foregoing listed component information (a) to (d).

In terms of the component information (a), several beam vectors and several frequency domain vectors may be shared in the plurality of polarization directions. In this case, information used to indicate the several beam vectors and information used to indicate the several frequency domain vectors may both be inter-polarization-direction common information. Alternatively, only several beam vectors or only several frequency domain vectors may be shared in the plurality of polarization directions. In this case, information used to indicate the several beam vectors or information used to indicate the several frequency domain vectors may be inter-polarization-direction common information, and information used to indicate several frequency domain vectors or several beam vectors that are not shared may be specific information.

In terms of the component information (b), the M space-frequency component matrices or space-frequency component vectors may be shared in the plurality of polarization directions, and information used to indicate the M space-frequency component matrices or space-frequency component vectors may be inter-polarization-direction common information.

In terms of the component information (c), the L beam vectors, the K frequency domain vectors, and the M space-frequency units may be shared in the plurality of polarization directions. In this case, information used to indicate the L beam vectors, information used to the K frequency domain vectors, and information used to the M space-frequency units may all be inter-polarization-direction common information.

Alternatively, only the L beam vectors and the K frequency domain vectors may be shared in the plurality of polarization directions. In this case, information used to indicate the L beam vectors and information used to indicate the K frequency domain vectors may be inter-polarization-direction common information, and information used to indicate the M space-frequency units may be specific information.

Alternatively, only the L beam vectors may be shared in the plurality of polarization directions. In this case, information used to indicate the L beam vectors may be inter-polarization-direction common information, and information used to indicate the K frequency domain vectors and information used to indicate the M space-frequency units may be specific information.

Alternatively, only the K frequency domain vectors may be shared in the plurality of polarization directions. In this case, information used to indicate the K frequency domain vectors may be inter-polarization-direction common information, and information used to indicate the L beam vectors and information used to indicate the M space-frequency units may be specific information.

In terms of the component information (d), the L×K space-frequency units and the M space-frequency units may be shared in the plurality of polarization directions. In this case, information used to indicate the L×K space-frequency units and information used to indicate the M space-frequency units may both be inter-polarization-direction common information.

Alternatively, only the L×K space-frequency units may be shared in the plurality of polarization directions. In this case, information used to indicate the L×K space-frequency units may be inter-polarization-direction common information, and information used to indicate the M space-frequency units may be specific information.

For ease of description below, component information used as the common information is referred to as common component information, and component information used as the specific information is referred to as specific component information.

It may be understood that in the component information, information used as the common information and information used as the specific information may be predefined, for example, defined in a protocol. The terminal device may generate and the network device may parse the information in the CSI report based on a same rule.

When there is one transport layer and the plurality of pieces of first indication information include the inter-polarization-direction common information, the inter-polarization-direction common information may be located at the forefront of a corresponding location in the CSI report. For example, the inter-polarization-direction common information may be the foregoing listed common component information. In this case, the common component information may be located in the forefront of the second part of the CSI report, or may be located at the forefront of a location that is in the second part and that is used to carry the PMI. Specific information corresponding to each polarization direction may be sequentially placed after the inter-polarization-direction common information. In other words, a priority of the inter-polarization-direction common information may be higher than a priority of the specific information.

Generally, the component information may be shared in the plurality of polarization directions, but weighting coefficients corresponding to the polarization directions are different from each other.

Two polarization directions are used as an example, and the design of the coefficient information in the CSI report may be as shown in Table 4 and Table 5 below.

Based on implementation 1 and implementation 2, the terminal device may determine, according to the foregoing method, 2M weighting coefficients corresponding to the two polarization directions. The 2M weighting coefficients may be indicated by using any design in Table 4.

TABLE 4

| No. | The first part includes: | The second part includes: |
| --- | --- | --- |
| 1 | | An indication of a normalized space-frequency unit, and quantization information of each weighting coefficient that is in the 2M weighting coefficients and |

TABLE 4-continued

| No. | The first part includes: | The second part includes: |
|---|---|---|
| 2 | | that is different from a normalized coefficient Quantization information of each of the 2M weighting coefficients |
| 3 | An indication of a quantity of non-zero-amplitude weighting coefficients that are in the 2M weighting coefficients and that are different from a normalized coefficient, or an indication of a quantity of zero-amplitude weighting coefficients that are in the 2M weighting coefficients and that are different from a normalized coefficient | An indication of a normalized space-frequency unit, quantization information of an amplitude of each weighting coefficient that is in the 2M weighting coefficients and that is different from the normalized coefficient, and quantization information of a phase of each non-zero-amplitude weighting coefficient that is in the 2M weighting coefficients and that is different from the normalized coefficient |
| 4 | An indication of a quantity of non-zero-amplitude weighting coefficients in the 2M weighting coefficients, or an indication of a quantity of zero-amplitude weighting coefficients in the 2M weighting coefficients | Quantization information of an amplitude of each of the 2M weighting coefficients, and quantization information of a phase of each non-zero-amplitude weighting coefficient in the 2M weighting coefficients |
| 5 | Quantization information of an amplitude of each weighting coefficient that is in the 2M weighting coefficients and that is different from a normalized coefficient | An indication of a normalized space-frequency unit, and quantization information of a phase of each non-zero-amplitude weighting coefficient that is in the 2M weighting coefficients and that is different from the normalized coefficient |
| 6 | Quantization information of an amplitude of each of the 2M weighting coefficients | Quantization information of a phase of each non-zero-amplitude weighting coefficient in the 2M weighting coefficients |
| 7 | A bitmap, used to indicate a quantity and locations of non-zero-amplitude weighting coefficients that are in the 2M weighting coefficients and that are different from a normalized coefficient | An indication of a normalized space-frequency unit, and quantization information of each non-zero-amplitude weighting coefficient that is in the 2M weighting coefficients and that is different from the normalized coefficient |
| 8 | A bitmap, used to indicate a quantity and locations of non-zero-amplitude weighting coefficients in the 2M weighting coefficients | Quantization information of each non-zero-amplitude weighting coefficient in the 2M weighting coefficients |
| 9 | A bitmap, used to indicate a quantity and locations of non-zero-amplitude weighting coefficients that are in the 2M weighting coefficients and that are different from a normalized coefficient, and a quantity of quantization bits of each non-zero-amplitude weighting coefficient | An indication of a normalized space-frequency unit, and quantization information of each non-zero-amplitude weighting coefficient that is in the 2M weighting coefficients and that is different from the normalized coefficient |
| 10 | A bitmap, used to indicate a quantity and locations of non-zero-amplitude weighting coefficients in the 2M weighting coefficients, and a quantity of quantization bits of each non-zero-amplitude weighting coefficient | Quantization information of each non-zero-amplitude weighting coefficient in the 2M weighting coefficients |

It should be noted that, in design 1 and design 2, information indicated in the first part is not listed, and this does not indicate that the first part does not carry any information. Actually, in each of design 1 to design 10 listed in Table 4, the first part may carry other information than the PMI. For example, the first part may carry one or more of an RI, a CQI, and an LI.

In addition, in design 1 to design 10 listed in Table 4, the second part may further include one of the foregoing listed component information (a) or (b). For brevity, examples are not listed one by one in Table 4.

It should be further noted that the normalized coefficient in the table may be determined based on each polarization direction, or may be determined based on two polarization directions. This is not limited in this application.

Based on implementation 3, the terminal device may determine, according to the foregoing method, 2M weighting coefficients corresponding to the two polarization directions. The 2M weighting coefficients may be indicated by using any design in Table 5.

TABLE 5

| No. | The first part includes: | The second part includes: |
|---|---|---|
| 1 | | An indication of a normalized space-frequency unit, and quantization information of each weighting coefficient that is in the 2M |

TABLE 5-continued

| No. | The first part includes: | The second part includes: |
| --- | --- | --- |
| 2 |  | weighting coefficients and that is different from a normalized coefficient Quantization information of each of the 2M weighting coefficients |
| 3 | An indication of a quantity of non-zero-amplitude weighting coefficients that are in the 2M weighting coefficients and that are different from a normalized coefficient, or an indication of a quantity of zero-amplitude weighting coefficients that are in the 2M weighting coefficients and that are different from a normalized coefficient | An indication of a normalized space-frequency unit, quantization information of an amplitude of each weighting coefficient that is in the 2M weighting coefficients and that is different from the normalized coefficient, and quantization information of a phase of each non-zero-amplitude weighting coefficient that is in the 2M weighting coefficients and that is different from the normalized coefficient |
| 4 | An indication of a quantity of non-zero-amplitude weighting coefficients in the 2M weighting coefficients, or an indication of a quantity of zero-amplitude weighting coefficients in the 2M weighting coefficients | Quantization information of an amplitude of each of the 2M weighting coefficients, and quantization information of a phase of each non-zero-amplitude weighting coefficient in the 2M weighting coefficients |
| 5 | Quantization information of an amplitude of each weighting coefficient that is in the 2M weighting coefficients and that is different from a normalized coefficient | An indication of a normalized space-frequency unit, and quantization information of a phase of each non-zero-amplitude weighting coefficient that is in the 2M weighting coefficients and that is different from the normalized coefficient |
| 6 | Quantization information of an amplitude of each of the 2M weighting coefficients | Quantization information of a phase of each non-zero-amplitude weighting coefficient in the 2M weighting coefficients |
| 7 | A bitmap, used to indicate a quantity and locations of non-zero-amplitude weighting coefficients that are in the 2M weighting coefficients and that are different from a normalized coefficient | An indication of a normalized space-frequency unit, and quantization information of each non-zero-amplitude weighting coefficient that is in the 2M weighting coefficients and that is different from the normalized coefficient |
| 8 | A bitmap, used to indicate a quantity and locations of non-zero-amplitude weighting coefficients in the 2M weighting coefficients | Quantization information of each non-zero-amplitude weighting coefficient in the 2M weighting coefficients |
| 9 | A bitmap, used to indicate a quantity and locations of non-zero-amplitude weighting coefficients that are in the 2M weighting coefficients and that are different from a normalized coefficient, and a quantity of quantization bits of each non-zero-amplitude weighting coefficient | An indication of a normalized space-frequency unit, and quantization information of each non-zero-amplitude weighting coefficient that is in the 2M weighting coefficients and that is different from the normalized coefficient |
| 10 | A bitmap, used to indicate a quantity and locations of non-zero-amplitude weighting coefficients in the 2M weighting coefficients, and a quantity of quantization bits of each non-zero-amplitude weighting coefficient | Quantization information of each non-zero-amplitude weighting coefficient in the 2M weighting coefficients |
| 11 | A bitmap, used to indicate a quantity and locations of non-zero-amplitude weighting coefficients that are in $2L \times K$ weighting coefficients and that are different from a normalized coefficient | An indication of a normalized space-frequency unit, and quantization information of each non-zero-amplitude weighting coefficient that is in the 2M weighting coefficients and that is different from the normalized coefficient |
| 12 | A bitmap, used to indicate a quantity and locations of non-zero-amplitude weighting coefficients in $2L \times K$ weighting coefficients | Quantization information of each non-zero-amplitude weighting coefficient in the 2M weighting coefficients |
| 13 | A bitmap, used to indicate a quantity and locations of non-zero-amplitude weighting coefficients that are in $2L \times K$ weighting coefficients and that are different from a normalized coefficient, and a quantity of quantization bits of each non-zero-amplitude weighting coefficient | An indication of a normalized space-frequency unit, and quantization information of each non-zero-amplitude weighting coefficient that is in the 2M weighting coefficients and that is different from the normalized coefficient |
| 14 | A bitmap, used to indicate a quantity and locations of non-zero-amplitude weighting coefficients in the $2L \times K$ weighting coefficients, and a quantity of quantization bits of each non-zero-amplitude weighting coefficient | Quantization information of each non-zero-amplitude weighting coefficient in the 2M weighting coefficients |

It should be noted that, in design 1 and design 2, information indicated in the first part is not listed, and this does not indicate that the first part does not carry any information. Actually, in each of design 1 to design 10 listed in Table 5, the first part may carry other information than the PMI. For example, the first part may carry one or more of an RI, a CQI, and an LI.

In addition, in design 1 to design 10 listed in Table 5, the second part may further include one of the foregoing listed component information (c) or (d). In design 11 to design 14, the second part may further include one of the foregoing listed component information (a) or (b). For brevity, examples are not listed one by one in Table 5.

It should be understood that, bit overheads of each part listed in Table 4 and Table 5 may be calculated according to the calculation methods provided in the case of the single polarization direction in Table 1 and Table 2. A difference lies in that a total quantity of weighting coefficients in the two polarization directions may be twice a total quantity of weighting coefficients in the single polarization direction. For example, the total quantity of weighting coefficients in the two polarization directions is 2M or 2L×K. A quantity of normalized coefficients may be doubled or may remain unchanged, and this depends on the unit of normalization processing.

It should be further understood that the all the information included in the first part and the second part of the CSI report listed in Table 4 and Table 5 may be considered as specific information.

The foregoing designs in the case of one polarization direction have been separately described in detail above. Specific designs and overheads in the case of two polarization directions are similar to those described above. For brevity, details are not described herein again.

For a plurality of transport layers, the terminal device may generate one piece of indication information corresponding to each transport layer. For example, when corresponding to a first transport layer, the indication information may be referred to as indication information corresponding to the first transport layer: when corresponding to a second transport layer, the indication information may be referred to as indication information corresponding to the second transport layer; and the rest may be deduced by analogy. Examples are not listed one by one herein.

In indication information corresponding to the plurality of transport layers, component information corresponding to the plurality of transport layers may be the same or may be different, and coefficient information corresponding to the plurality of transport layers may be different.

If the component information corresponding to the plurality of transport layers is the same, the plurality of transport layers may share the same component information, and the component information may be indicated only once in a plurality of pieces of indication information corresponding to the plurality of transport layers. In this case, the component information may be considered as common information. The common information is referred to as inter-transport-layer common information below to be distinguished from the inter-polarization-direction common information. The inter-transport-layer common information may be considered as a common part of the plurality of pieces of indication information corresponding to the plurality of transport layers.

If the component information corresponding to the plurality of transport layers is different, the indication information corresponding to the plurality of transport layers may be used to indicate the component information based on the plurality of transport layers respectively. In this case, the component information may be considered as specific information.

If the coefficient information corresponding to the plurality of transport layers is different, the first indication information may be used to respectively indicate the coefficient information based on the plurality of transport layers. In this case, the coefficient information may be considered as specific information.

Related descriptions of information that is in the component information and that may be used as common information are described in detail in the foregoing part related to the plurality of polarization directions. When there are a plurality of transport layers, the terminal device may alternatively use a part or all of the component information as common information based on the foregoing description. For brevity, details are not described herein again.

Optionally, in one CSI report, when the plurality of pieces of indication information corresponding to the plurality of transport layers do not share the inter-transport-layer common information, the specific information in the plurality of pieces of indication information corresponding to the plurality of transport layers is sequentially arranged in a sequence of the transport layers.

Optionally, a priority of the inter-transport-layer common information may be higher than a priority of the specific information.

To be specific, in one CSI report, when the plurality of pieces of indication information corresponding to the plurality of transport layers share the inter-transport-layer common information, the inter-transport-layer common information may be located at the forefront of a corresponding part in the CSI report. In other words, in one CSI report, the inter-transport-layer common information may be located before the specific information.

Generally, the plurality of transport layers may share a part or all of the component information, but weighting coefficients of the transport layers are different from each other. In this embodiment, the first pail of each CSI report may include a part of the specific information corresponding to each of the plurality of transport layers, and the second part of each CSI report may include the inter-transport-layer common information and the other part of the specific information corresponding to each of the plurality of transport layers.

The specific information that may be used as the first part of the CSI report and the specific information that may be used as the second part of the CSI report may be, for example, determined based on one of the plurality of designs in Table 4 or Table 5. The common information that may be used as the second part of the CSI report may be, for example, the foregoing common component information that corresponds to the first part and that is in the component information (a), (b), (c), or (d). In addition, the second part of the CSI report may further include specific component information.

Figure 3:
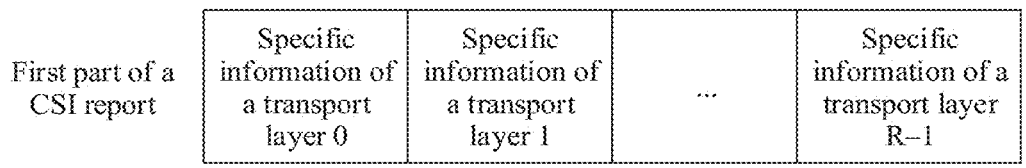
FIG. 3 is a schematic diagram of a first part of a CSI report according to an embodiment of this application.

FIG. 3 is a schematic diagram of the first part of the CSI report according to an embodiment of this application. As shown in FIG. 3, the terminal device may sequentially arrange, in the sequence of the transport layers, specific information that corresponds to each transport layer and that may be used as the first part of the CSI report.

FIG. 4 to FIG. 7 each are a schematic diagram of the second part of the CSI report according to an embodiment of this application.

As shown in the figure, the common information may be located at the forefront of the second part of the CSI report, or at the forefront of a location used to carry the PMI in the second part. The specific information corresponding to each transport layer may be sequentially placed after the common information. For example, the specific information may include the specific component information and the coefficient information. The terminal device may sequentially arrange, in the sequence of the transport layers, the specific information that corresponds to each transport layer and that may be used as the second part of the CSI report.

Further optionally, the priority of the specific component information is higher than a priority of the coefficient information.

To be specific, in one CST report, in the specific information in the plurality of pieces of indication information corresponding to the plurality of transport layers, the component information may be located before the coefficient information.

For example, in the indication information corresponding to each transport layer, the specific component information may be located before the coefficient information, as shown in FIG. 4. For another example, in the indication information that is included in the same CSI report and that corresponds to the plurality of transport layers, specific component information corresponding to the plurality of transport layers may be located before coefficient information corresponding to the plurality of transport layers, as shown in FIG. 5.

Further, a priority of coefficient information with a larger quantity of quantization bits is higher than a priority of coefficient information with a smaller quantity of quantization bits.

In this embodiment, coefficient information of the first level may be located before coefficient information of the second level, and the coefficient information of the second level may be located before coefficient information of the third level.

For example, the second part of the CSI report shown in FIG. 4 or FIG. 5 is further extended. In the indication information corresponding to each transport layer, the specific component information may be located before the coefficient information, the coefficient information of the first level is located before the coefficient information of the second level, and the coefficient information of the second level is located before the coefficient information of the third level. In this way, the second part of the CSI report shown in FIG. 6 or FIG. 7 may be obtained.

In the second part of the CSI report shown in FIG. 6, specific information of a transport layer 0, a transport layer 1, and a transport layer R−1 is sequentially arranged in the sequence of the transport layers. The specific information of each transport layer is arranged in a sequence of the specific component information, the coefficient information of the first level, the coefficient information of the second level, and the coefficient information of the third level.

In the second part of the CST report shown in FIG. 7, the specific information of the transport layer 0 is first arranged in the sequence of the specific component information, the coefficient information of the first level, the coefficient information of the second level, and the coefficient information of the third level. Then, the specific information of the transport layer 1 is arranged in the sequence of the specific component information, the coefficient information of the first level, the coefficient information of the second level, and the coefficient information of the third level. By analogy, finally, the specific information of the transport layer R−1 is arranged in the sequence of the specific component information, the coefficient information of the first level, the coefficient information of the second level, and the coefficient information of the third level.

It should be understood that the figure shows only a part of PMI-related information in the first part and the second part of the CSI report for ease of understanding, but does not show all of the PMI-related information. Therefore, the information shown in the figure shall not constitute any limitation on this application. The first part of the CSI report may further include one or more of the RI, the CQI, and the LI, which, for example, may be located before or after the PMI. This is not limited in this application. Alternatively, the second part of the CST report may not include the specific component information of each transport layer. In this case, the coefficient information of each transport layer may be located after the inter-transport-layer common information. Alternatively, the second part of the CSI report may not include the inter-transport-layer common information. In this case, the specific component information and the coefficient information of the transport layers may be arranged in the priority sequence shown in FIG. 4 to FIG. 7. The second part of the CSI report may further include other information, which, for example, may be located before or after the PMI. This is not limited in this application.

It should be further understood that specific designs of the first part and the second part of the CSI report in a case of a plurality of transport layers are described in detail above with reference to the accompanying drawings. The arrangement sequence of the information shown in the figure may be understood as ranks of bit sequences corresponding to the information in a bit sequence generated based on the CSI report. The terminal device may encode the corresponding bit sequences based on the foregoing listed arrangement sequence of the information. Correspondingly, the network device may also decode the corresponding bit sequences based on the foregoing listed arrangement sequence of the information.

It should be further understood that the foregoing listed designs of the arrangement sequence of the information corresponding to the plurality of polarization directions and the plurality of transport layers are merely several possible examples provided in the embodiments of this application, and shall not constitute any limitation on this application. For example, when a plurality of pieces of first indication information corresponding to one transport layer share the inter-polarization-direction common information, the inter-polarization-direction common information may be located at the forefront of a corresponding part in the CSI report. For example, indication information corresponding to each transport layer may be sequentially placed into the specific information of each transport layer after the inter-transport-layer common information. In indication information corresponding to one transport layer, the inter-polarization-direction common information is placed at the forefront, and then the specific information corresponding to each polarization direction is placed. In other words, the priority of the inter-transport-layer common information is higher than the priority of the inter-polarization-direction common information, and the priority of the inter-polarization-direction common information may be higher than the priority of the specific information.

As described above, the terminal device may send one or more CSI reports in one time of CSI reporting. When reporting a plurality of CSI reports, the terminal device may separately generate a bit sequence of the first part of each CSI report and a bit sequence of the second part of each CSI report based on a predefined priority sequence of the CSI reports. A bit sequence generated based on first parts of the plurality of CSI reports may be denoted as a first sequence, and an arrangement sequence of the first parts of the plurality of CSI reports in the first sequence may be the priority sequence of the CST reports described above. A bit sequence generated based on second parts of the plurality of CSI reports may be denoted as a second sequence, and an arrangement sequence of the second parts of the plurality of CSI reports in the second sequence may be the priority sequence of the CSI reports. The terminal device may perform encoding based on the arrangement sequence of bit sequences in the first sequence and the arrangement sequence of bit sequences in the second sequence. Correspondingly, the network device may also perform decoding based on the arrangement sequence of the bit sequences in the first sequence and the arrangement sequence of the bit sequences in the second sequence.

For example, the priority sequence of the CSI reports may be determined based on a CSI reporting identifier configured by the network device. To be specific, the plurality of CSI reports may be sorted based on a sequence of CSI reporting IDs of the CSI reports. The terminal device may perform encoding and the network device may perform decoding based on the same sequence.

It should be understood that determining the priority sequence of the plurality of CSI reports based on the plurality of CSI reporting identifiers is merely a possible implementation, and shall not constitute any limitation on this application.

FIG. 8 to FIG. 12 each are a schematic diagram of a plurality of CST reports according to an embodiment of this application. Specifically, FIG. 8 to FIG. 12 each show first parts and second parts of J (where J>1 and J is a positive integer) CSI reports. The J CSI reports may be a CSI report #0, a CSI report #1, . . . , and a CSI report #J−1. FIG. 8 shows the first parts of the J CSI reports. FIG. 9 to FIG. 12 each show the second parts of the J CSI reports.

It should be noted that, reported quantities of transport layers in the J CSI reports are not necessarily the same. For example, in the CSI report #0, a quantity of transport layers may be $R_0$; in the CSI report #1, a quantity of transport layers may be $R_1$; and by analogy, in the CSI report #J−1, a quantity of transport layers may be $R_J-1$. $R_0, R_1, \ldots$, and $R_J-1$ are all positive integers, and any two of $R_0, R_1, \ldots$, and $R_J-1$ may be the same or may be different. This is not limited in this application.

It should be understood that, examples of a plurality of CSI reports generated in the arrangement sequences shown in FIG. 3 to FIG. 7 are shown in the figures merely for ease of illustration. However, this shall not constitute any limitation on this application. Lengths of pieces of information that are in any two CSI reports and that have a same name may be the same, or may be different. This is not limited in this application. For example, in FIG. 9 to FIG. 12, a bit length of inter-transport-layer common information in the CSI report #0 may be the same as or different from a bit length of inter-transport-layer common information in the CSI report #1. For another example, in FIG. 8, a bit length of specific information of the transport layer 0 in the CSI report #1 may be the same as or different from a bit length of specific information of the transport layer 0 in the CSI report #J−1. For brevity, examples are not listed one by one herein.

In addition, FIG. 8 shows an example in which the first part of the CSI report includes the RI, the CQI, the LI, and the PMI. However, this shall not constitute any limitation on this application. The CSI report may include only one or more of the RI the CQI, the LI, and the PMI. This is not limited in this application. For example, the first part of the CSI report may include only one or more of the RI, the CQI, the LI, and the PMI.

It should be further understood that in each of the second parts of the CSI reports shown in FIG. 4 to FIG. 7 and FIG. 9 to FIG. 12, the plurality of pieces of information in the figures are arranged from left to right in descending order of priorities. A protocol may predefine a priority sequence of the information. For example, the priority sequence may be one of the sequences in FIG. 4 to FIG. 7 and FIG. 9 to FIG. 12. In this way, the terminal device generates, based on the priority sequence, the second part, of the CSI report, that corresponds to the priority sequence.

It should be noted that, when uplink resources such as a PUCCH and a PUSCH scheduled by the network device are insufficient, and consequently all information in the PMI cannot be transmitted, the terminal device may sequentially discard a part of or all information in the PMI in the second part of the CSI report in ascending order of the priorities.

It should be understood that, for a specific encoding and decoding process, reference may be made to the current technology. For brevity, detailed descriptions of the specific process are omitted herein.

After receiving the CSI report from the terminal device, the network device may determine, based on the PMI in the CST report, a precoding matrix corresponding to each frequency domain unit.

Specifically, an example of determining a precoding matrix corresponding to a frequency domain unit $n_f$ is used. First, the network device may determine, based on the first indication information corresponding to each polarization direction at a same transport layer, a precoding vector corresponding to the frequency domain unit $n_f$ at the transport layer. The network device may further determine, based on indication information corresponding to a plurality of transport layers, a precoding vector corresponding to the frequency domain unit $n_f$ at each transport layer, to further determine the precoding matrix corresponding to the frequency domain unit $n_f$.

In this embodiment, it is assumed that the quantity of polarization directions is 2. Same component information may be shared in the two polarization directions.

Based on implementation 1, the network device may determine the precoding vector $p_{n_f}$ of the frequency domain unit $n_f$ based on the following formula:

$$p_{n_f} = \gamma_1 \begin{bmatrix} \sum_{l=0}^{L-1} v_s^l \left( \sum_{k=1}^{K-1} c_{l,k} v_f^{k,n_f} \right) \\ \sum_{l=0}^{L-1} v_s^l \left( \sum_{k=1}^{K-1} c_{l+L,k} v_f^{k,n_f} \right) \end{bmatrix}.$$

$\gamma_1$ is a normalized coefficient, and $\gamma_1>0$; $v_s^i$ represents a beam vector l in the L beam vectors: $\overline{v}_f^{k,n_f}$ is a conjugate of $v_f^{k,n_f}$ and $v_f^{k,n_f}$ represents an element $n_f$ in a frequency domain vector k, that is, $v_f^k$ in the K frequency domain vectors; $c_{l,k}$ represents a weighting coefficient corresponding to the beam vector l and the frequency domain vector k in a first polarization direction; and $c_{l+L,k}$ represents a weighting coefficient corresponding to the beam vector l and the frequency domain vector k in a second polarization direction.

Further, the network device may determine a precoding vector $p_{r,n_f}$ of a frequency domain unit $n_f$ at a transport layer r based on the following formula:

$$p_{r,n_f} = \eta_1 \begin{bmatrix} \sum_{l=0}^{L-1} v_s^{r,l} \left( \sum_{k=1}^{K-1} c_{r,l,k} \bar{v}_f^{r,k,n_f} \right) \\ \sum_{l=0}^{L-1} v_s^{r,l} \left( \sum_{k=1}^{K-1} c_{r,l+L,k} \bar{v}_f^{r,k,n_f} \right) \end{bmatrix}.$$

$\eta_1$ is a normalized coefficient, and $\eta_1 > 0$; $v_s^{r,l}$ represents a beam vector l in the L beam vectors at the transport layer r; $\bar{v}_f^{r,k,n_f}$ is a conjugate of $v_f^{r,k}$ and $v_f^{r,k,n_f}$ represents an element $n_f$ in a frequency domain vector k, that is, $v_f^{r,k}$ in the K frequency domain vectors at the transport layer r; $c_{r,l,k}$ represents a weighting coefficient corresponding to the beam vector l and the frequency domain vector k in the first polarization direction of the transport layer r; and $c_{r,J+l,k}$ represents a weighting coefficient corresponding to the beam vector l and the frequency domain vector k in the second polarization direction of the transport layer r.

It may, be understood that when a plurality of transport layers share the same L beam vectors and K frequency domain vectors, the beam vector $v_s^{r,j}$ may be simplified as $v_s^l$, and the frequency domain vector $v_f^{r,k}$ may be simplified as $v_f^k$.

Based on implementation 2, the network device may determine the precoding vector $p_{n_f}$ of the frequency domain unit $n_f$ based on the following formula:

$$p_{n_f} = \gamma_2 \begin{bmatrix} \sum_{m=0}^{M-1} c_m v_{m,n_f} \\ \sum_{m=0}^{M-1} c_{m+M} v_{m,n_f} \end{bmatrix}.$$

$\gamma_2$ is a normalized coefficient, and $\gamma_2 > 0$; $v_{m,n_f}$ represents a vector that is in a space-frequency component matrix m in the M space-frequency component matrices and that corresponds to the frequency domain unit $n_f$, or a vector obtained by sequentially connecting elements that are in a space-frequency component vector m in the M space-frequency component vectors and that correspond to the frequency domain unit $n_f$; and $c_m$ represents a weighting coefficient corresponding to the space-frequency component matrix m or the space-frequency component vector in in a first polarization direction, and $c_{m+M}$ represents a weighting coefficient corresponding to the space-frequency component matrix m or the space-frequency component vector m in a second polarization direction.

Further, the network device may determine a precoding vector $p_{r,n_f}$ of a frequency domain unit $n_f$ at a transport layer r based on the following formula:

$$p_{r,n_f} = \eta_2 \begin{bmatrix} \sum_{m=0}^{M-1} c_{r,m} v_{r,m,n_f} \\ \sum_{m=0}^{M-1} c_{r,m+M} v_{r,m,n_f} \end{bmatrix}.$$

$\eta_2$ is a normalized coefficient, and $\eta_2 > 0$; $v_{r,m,n_f}$ represents a vector that is in a space-frequency component matrix m in the M space-frequency component matrices at the transport layer r and that corresponds to the frequency domain unit $n_f$, or a vector obtained by sequentially connecting elements that are in the M space-frequency component matrices at the transport layer r and that correspond to the frequency domain unit $n_f$; and $c_{r,m}$ represents a weighting coefficient corresponding to the space-frequency component matrix m or the space-frequency component vector m in the first polarization direction at the transport layer r, and $c_{r,m+M}$ represents a weighting coefficient corresponding to the space-frequency component matrix n or the space-frequency component vector H in the second polarization direction at the transport layer r.

Based on implementation 3, the network device may determine the precoding vector $p_{n_f}$ of the frequency domain unit $n_f$ based on the following formula:

$$p_{n_f} = \gamma_3 \begin{bmatrix} \sum_{m=0}^{M-1} v_s^m c_m \bar{v}_f^{m,n_f} \\ \sum_{m=0}^{M-1} v_s^m c_{m+M} \bar{v}_f^{m,n_f} \end{bmatrix}.$$

$\gamma_3$ is a normalized coefficient, and $\gamma_3 > 0$; $v_s^m$ represents a beam vector corresponding to a space-frequency unit m in the M space-frequency units; $\bar{v}_f^{m,n_f}$ is a conjugate of $v_f^{m,n_f}$, and $v_f^{m,n_f}$ represents an element $n_f$ in a frequency domain vector $v_f^m$ corresponding to the space-frequency unit m in the M space-frequency units; and $c_m$ represents a weighting coefficient corresponding to the space-frequency unit m in a first polarization direction, and $c_{n+M}$ represents a weighting coefficient corresponding to the space-frequency unit m in a second polarization direction.

Further, the network device may determine a precoding vector $p_{r,n_f}$ of a frequency domain unit $n_f$ at a transport layer r based on the following formula:

$$p_{r,n_f} = \eta_3 \begin{bmatrix} \sum_{m=0}^{M-1} v_s^{r,m} c_{r,m} \bar{v}_f^{r,m,n_f} \\ \sum_{m=0}^{M-1} v_s^{r,m} c_{r,m+M} \bar{v}_f^{r,m,n_f} \end{bmatrix}.$$

$\eta_3$ is a normalized coefficient, and $\eta_3 > 0$; $v_s^{r,m}$ represents a beam vector corresponding to a space-frequency unit m in the M space-frequency units at the transport layer r; $\bar{v}_f^{r,m,n_f}$ is a conjugate of $v_f^{r,m,n_f}$ and $v_f^{r,m,n_f}$ represents an element $n_f$ in a frequency domain vector $v_f^{r,m}$ corresponding to the space-frequency unit m in the M space-frequency units at the transport layer r; and $c_{r,m}$ represents a weighting coefficient corresponding to the space-frequency unit m in the first polarization direction at the transport layer r, and $c_{r,m+M}$ represents a weighting coefficient corresponding to the space-frequency unit m in the second polarization direction at the transport layer r.

It may be understood that when a plurality of transport layers share the same M space-frequency units, the beam vector $v_s^{r,m}$ may be simplified as $v_s^m$, and the frequency domain vector $v_f^{r,m}$ may be simplified as $v_f^m$.

Further, the network device may further determine, based on a precoding vector of the frequency domain unit $n_f$ at each transport layer, a precoding matrix corresponding to the frequency domain unit $n_f$.

$P_{n_f} = \mu[p_{0,n_f} L p_{R-1,n_f}]$.

$\mu$ is a normalized coefficient, and $\mu > 0$. $p_{r,n_f}$ represents the precoding vector corresponding to the frequency domain unit $n_f$ at the transport layer r, where r=0, 1, . . . , or R−1.

Therefore, in the embodiments of this application, a change rule of a channel in frequency domain is described by using a frequency domain vector, and a change of the channel in frequency domain is simulated through linear superposition of one or more frequency domain vectors. This fully explores a relationship between frequency domain units. A change rule of a plurality of frequency domain units is described based on frequency domain continuity by using a relatively small quantity of frequency domain vectors. The terminal device indicates, to the network device, one or more beam vectors, one or more frequency domain vectors, and one or more corresponding weighting coefficients, or indicates, to the network device, one or more space-frequency units and one or more corresponding weighting coefficients, so that the network device restores a precoding vector with a relatively high approximation. Different from the current technology, a weighting coefficient does not need to be independently reported based on each frequency domain unit. When a quantity of frequency domain units increases, feedback overheads do not multiply. Therefore, the feedback overheads can be greatly reduced while approximation precision is ensured.

It should be understood that sequence numbers of the processes do not mean execution sequences in the foregoing embodiment. The execution sequences of the processes should be determined based on functions and internal logic of the processes, and should not be construed as any limitation on the implementation processes of the embodiments of this application.

The precoding vector indication and determining method provided in the embodiments of this application is described in detail above with reference to FIG. 2 to FIG. 12. Communications apparatuses provided in the embodiments of this application are described in detail below with reference to FIG. 13 to FIG. 15.

Figure 13:
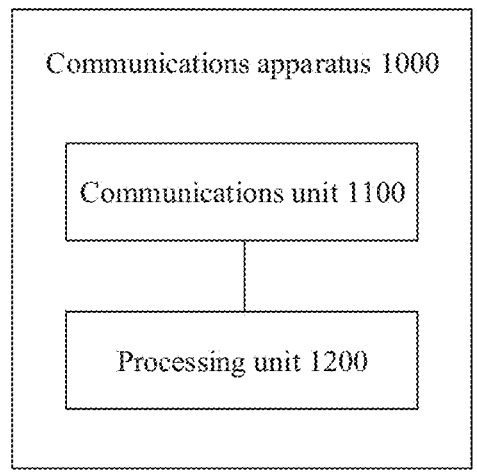
FIG. 13 is a schematic block diagram of a communications apparatus according to an embodiment of this application.

FIG. 13 is a schematic block diagram of a communications apparatus 1000 according to an embodiment of this application. As shown in the figure, the communications apparatus 1000 may include a communications unit 1100 and a processing unit 1200.

In a possible design, the communications apparatus 1000 may correspond to the terminal device in the foregoing method embodiment. For example, the communications apparatus 1000 may be the terminal device, or may be a chip disposed in the terminal device.

Specifically, the communications apparatus 1000 may correspond to the terminal device in the method 200 in the embodiments of this application, and the communications apparatus 1000 may include units configured to perform the method performed by the terminal device in the method 200 in FIG. 2. In addition, the units in the communications apparatus 1000 and the foregoing other operations and/or functions are intended to implement the corresponding procedures of the method 200 in FIG. 2.

When the communications apparatus 1000 is configured to perform the method 200 in FIG. 2, the communications unit 1100 may be configured to perform operation 220 in the method 200, and the processing unit 1200 may be configured to perform operation 210 in the method 200. It should be understood that a specific process in which the units perform the foregoing corresponding operations is described in detail in the foregoing method embodiments, and for brevity, details are not described herein.

Figure 14:
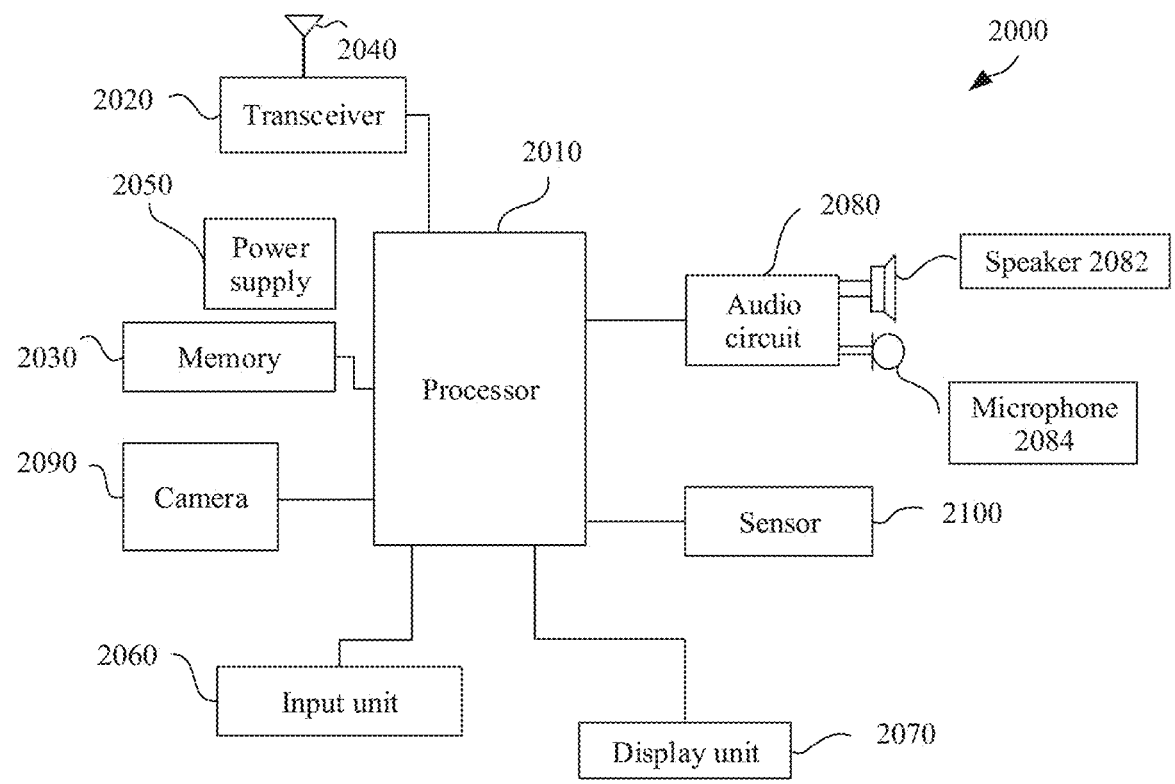
FIG. 14 is a schematic structural diagram of a terminal device according to an embodiment of this application.

It should be further understood that when the communications apparatus 1000 is the terminal device, the communications unit 1100 in the communications apparatus 1000 may correspond to a transceiver 2020 in a terminal device 2000 shown in FIG. 14, and the processing unit 1200 in the communications apparatus 1000 may correspond to a processor 2010 in the terminal device 2000 shown in FIG. 14.

It should be further understood that when the communications apparatus 1000 is the chip disposed in the terminal device, the communications unit 1100 in the communications apparatus 1000 may be an input/output interface.

In another possible design, the communications apparatus 1000 may correspond to the network device in the foregoing method embodiment. For example, the communications apparatus 1000 may be the network device, or may be a chip disposed in the network device.

Specifically, the communications apparatus 1000 may correspond to the network device in the method 200 in the embodiments of this application, and the communications apparatus 1000 may include units configured to perform the method performed by the network device in the method 200 in FIG. 2. In addition, the units in the communications apparatus 1000 and the foregoing other operations and/or functions are intended to implement the corresponding procedures of the method 200 in FIG. 2.

When the communications apparatus 1000 is configured to perform the method 200 in FIG. 13, the communications unit 1100 may be configured to perform operation 220 in the method 200, and the processing unit 1200 may be configured to perform operation 230 in the method 200.

Figure 15:
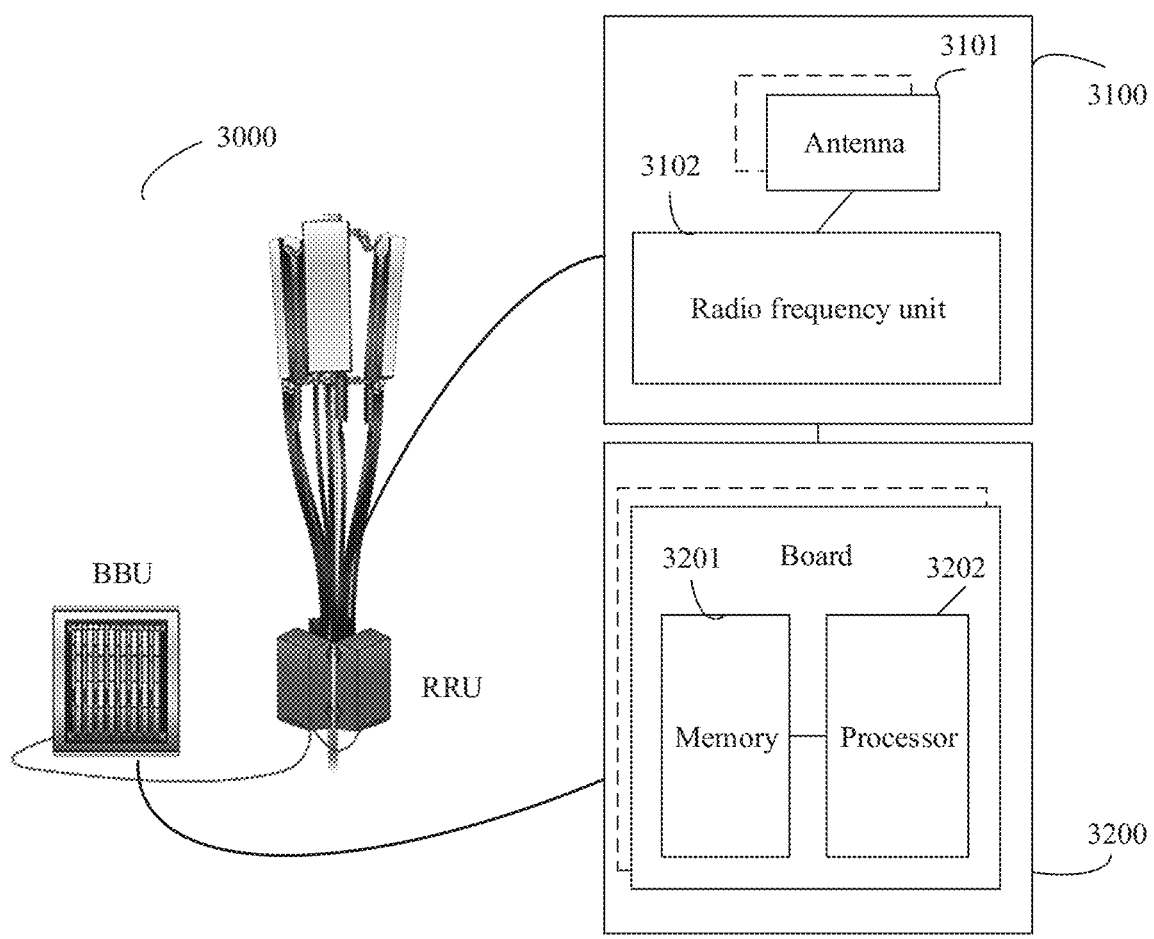
FIG. 15 is a schematic structural diagram of a network device according to an embodiment of this application.

It should be further understood that when the communications apparatus 1000 is the network device, the communications unit 1100 in the communications apparatus 1000 may correspond to a transceiver 3200 in a network device 3000 shown in FIG. 15, and the processing unit 1200 in the communications apparatus 1000 may correspond to a processor 3100 in the network device 3000 shown in FIG. 15.

It should be further understood that when the communications apparatus 1000 is the chip disposed in the network device, the communications unit 1100 in the communications apparatus 1000 may be an input/output interface.

FIG. 14 is a schematic structural diagram of a terminal device 2000 according to an embodiment of this application. The terminal device 2000 may be used in the system shown in FIG. 1, to perform a function of the terminal device in the foregoing method embodiment. As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 13.

The transceiver 2020 may correspond to the communications unit in FIG. 13, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 14 can implement each process related to the terminal device in the method embodiment shown in FIG. 2. Operations and/or functions of the modules in the terminal device 2000 are intended to implement the corresponding procedures in the foregoing method embodiment. For details, refer to the descriptions in the foregoing method embodiment. To avoid repetition, detailed descriptions are appropriately omitted herein.

The processor 2010 may be configured to perform an action that is implemented inside the terminal device and that is described in the foregoing method embodiment, and the transceiver 2020 may be configured to perform an action of sending to a network device or receiving from a network device that is performed by the terminal device and that is described in the foregoing method embodiment. For details, refer to the descriptions in the foregoing method embodiment. Details are not described herein again.

Optionally, the terminal device 2000 may further include a power supply 2050, configured to supply power to components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 15 is a schematic structural diagram of a network device according to an embodiment of this application, for example, may be a schematic structural diagram of a base station 3000. The base station 3000 may be used in the system shown in FIG. 1, to perform a function of the network device in the foregoing method embodiment. As shown in the figure, the base station 3000 may include one or more radio frequency units, for example, one or more remote radio units (RRU) 3100, and one or more baseband units (BBU) (which may also be referred to as distributed units (DU)) 3200. The RRU 3100 may be referred to as a transceiver unit, and corresponds to the communications unit 1200 in FIG. 13. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to send and receive a radio frequency signal and perform conversion between a radio frequency signal and a baseband signal, for example, configured to send indication information to a terminal device. The BBU 3200 is mainly configured to: perform baseband processing, control the base station, and so on. The RRU 3100 and the BBU 3200 may be physically disposed together, or may be physically disposed separately, to be specific, may be a distributed base station.

The BBU 3200 is a control center of the base station, or may be referred to as a processing unit. The BBU 3200 may correspond to the processing unit 1100 in FIG. 13, and is mainly configured to implement a baseband processing function, for example, channel coding, multiplexing, modulation, or spreading. For example, the BBU (the processing unit) may be configured to control the base station to perform an operation procedure related to the network device in the foregoing method embodiment, for example, generate the foregoing indication information.

In an example, the BBU 3200 may include one or more boards, and a plurality of boards may jointly support a radio access network (for example, an LTE network) of a single access standard, or may separately support radio access networks (for example, an LTE network, a 5G network, or another network) of different access standards. The BBU 3200 further includes a memory 3201 and a processor 3202. The memory 3201 is configured to store a necessary instruction and necessary data. The processor 3202 is configured to control the base station to perform a necessary action, for example, is configured to control the base station to perform an operation procedure related to the network device in the foregoing method embodiment. The memory 3201 and the processor 3202 may serve one or more boards. In other words, the memory and the processor may be independently disposed on each board. Alternatively, the plurality of boards may share a same memory and a same processor. In addition, a necessary circuit may be further disposed on each board.

It should be understood that, the base station 3000 shown in FIG. 15 can implement each process related to the network device in the method embodiment shown in FIG. 2. The operations and/or the functions of the modules in the base station 3000 are intended to implement corresponding procedures in the foregoing method embodiment. For details, refer to the descriptions in the foregoing method embodiment. To avoid repetition, detailed descriptions are appropriately omitted herein.

The BBU 3200 may be configured to perform an action that is implemented inside the network device and that is described in the foregoing method embodiment, and the RRU 3100 may be configured to perform an action of sending to the terminal device or receiving from the terminal device that is performed by the network device and that is described in the foregoing method embodiment. For details, refer to the descriptions in the foregoing method embodiment. Details are not described herein again.

An embodiment of this application further provides a processing apparatus, including a processor and an interface. The processor is configured to perform the method in any foregoing method embodiment.

It should be understood that, the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller (PLD), or another integrated chip.

In an implementation process, the operations in the foregoing method may be implemented by using a hardware integrated logic circuit in the processor or instructions in a form of software. The operations of the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing method in combination with the hardware of the processor. To avoid repetition, details are not described herein.

It should be noted that, the processor in the embodiments of this application may be an integrated circuit chip, and has a signal processing capability. In an implementation process, the operations in the foregoing method embodiment may be implemented by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and the logical block diagrams that are disclosed in the embodiments of this application. The general-purpose processor may be a microprocessor, or the processor may be any conventional processor or the like. The operations of the methods disclosed with reference to the embodiments of this application may be directly performed and completed by a hardware decoding processor, or may be performed and completed by a combination of hardware in the decoding processor and a software module. The software module may be located in a mature storage medium in the art, such as a random access memory, a flash memory a read-only memory, a programmable read-only memory, an electrically erasable programmable memory, or a register. The storage medium is located in the memory and the processor reads information in the memory and completes the operations in the foregoing method in combination with the hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that memories in the system and method described in this specification include but are not limited to these memories and any memory of another proper type.

According to the method provided in the embodiments of this application, this application further provides a computer program product. The computer program product includes computer program code. When the computer program code is run on a computer, the computer is enabled to perform the method in any one of the embodiments shown in FIG. 2.

According to the method provided in the embodiments of this application, this application further provides a computer-readable medium. The computer-readable medium stores program code. When the program code is run on a computer, the computer is enabled to perform the method in any one of the embodiments shown in FIG. 2.

According to the method provided in the embodiments of this application, this application further provides a system. The system includes the foregoing one or more terminal devices and one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the terminal device or network device in the method embodiment. A corresponding module or unit performs a corresponding operation. For example, a communications unit (a transceiver) performs a sending or receiving operation in the method embodiment, and a processing unit (a processor) performs another operation other than the sending or receiving operation. For a function of a specific unit, refer to the corresponding method embodiment. There may be one or more processors.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in the figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with another system by using the signal).

A person of ordinary skill in the art may be aware that, illustrative logical blocks (illustrative logical block) and operations (operation) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement a described function for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments In addition, function units in the embodiments of this application may be integrated into one processing unit, or each of the units may exist alone physically, or two or more units may be integrated into one unit.

In the foregoing embodiments, all or some of the functions of the functional units may be implemented by using software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the operations of the method described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A precoding vector indication method, comprising:
generating a channel state information (CSI) report, wherein the CSI report is used to indicate M space-frequency units and a weighting coefficient of a part or all of the M space-frequency units, wherein each of the M space-frequency units corresponds to one beam vector and one frequency domain vector, and wherein the CSI report comprises an indication of a quantity of non-zero-amplitude weighting coefficients in M weighting coefficients corresponding to the M space-frequency units, or an indication of a quantity of zero-amplitude weighting coefficients in the M weighting coefficients; and
sending the CSI report to a network device, wherein the weighting coefficient indicated by the CSI report is used to determine a weighted sum of the part or all of the M space-frequency units, and the weighted sum is used to determine a precoding vector of a plurality of frequency domain units.

2. The method according to claim 1, wherein the CSI report comprises a first part and a second part, wherein the second part comprises an indication of a normalized space-frequency unit, and quantization information of each weighting coefficient that is in M weighting coefficients corresponding to the M space-frequency units and that is different from a normalized coefficient, and wherein the normalized space-frequency unit corresponds to the normalized coefficient.

3. The method according to claim 1, wherein the CSI report comprises a first part and a second part, wherein:
the first part comprises the indication of the quantity of non-zero-amplitude weighting coefficients in the M weighting coefficients corresponding to the M space-frequency units, or the indication of the quantity of zero-amplitude weighting coefficients in the M weighting coefficients; and
the second part comprises quantization information of an amplitude of each of the M weighting coefficients, and quantization information of a phase of each non-zero-amplitude weighting coefficient in the M weighting coefficients.

4. The method according to claim 2, wherein the second part further comprises an indication of the M space-frequency units.

5. The method according to claim 4, wherein the indication comprises a bitmap.

6. A precoding vector determining method, comprising:
receiving a channel state information (CSI) report from a terminal device, wherein the CSI report is used to indicate M space-frequency units and a weighting coefficient of a part or all of the M space-frequency units, wherein each of the M space-frequency units corresponds to one beam vector and one frequency domain vector, wherein the CSI report comprises an indication of a quantity of non-zero-amplitude weighting coefficients in M weighting coefficients corresponding to the M space-frequency units, or an indication of a quantity of zero-amplitude weighting coefficients in the M weighting coefficients, wherein the weighting coefficient is used to determine a weighted sum of the part or all of the M space-frequency units, and wherein the weighted sum is used to determine a precoding vector of a plurality of frequency domain units; and
determining the precoding vector of the plurality of frequency domain units based on the CSI report.

7. The method according to claim 6, wherein the CSI report comprises a first part and a second part, wherein the second part comprises an indication of a normalized space-frequency unit, and quantization information of each weighting coefficient that is in M weighting coefficients corresponding to the M space-frequency units and that is different from a normalized coefficient, and wherein the normalized space-frequency unit corresponds to the normalized coefficient.

8. The method according to claim 6, wherein the CSI report comprises a first part and a second part, wherein:
the first part comprises the indication of the quantity of non-zero-amplitude weighting coefficients in the M weighting coefficients corresponding to the M space-frequency units, or the indication of the quantity of zero-amplitude weighting coefficients in the M weighting coefficients; and
the second part comprises quantization information of an amplitude of each of the M weighting coefficients, and quantization information of a phase of each non-zero-amplitude weighting coefficient in the M weighting coefficients.

9. The method according to claim 7, wherein the second part further comprises an indication of the M space-frequency units.

10. The method according to claim 9, wherein the indication comprises a bitmap.

11. A communications apparatus, comprising:
at least one processor configured with processor-executable instructions to perform operations comprising:
generating a channel state information (CSI) report, wherein the CSI report is used to indicate M space-frequency units and a weighting coefficient of a part or all of the M space-frequency units, wherein each of the M space-frequency units corresponds to one beam vector and one frequency domain vector, and wherein the CSI report comprises an indication of a quantity of non-zero-amplitude weighting coefficients in M weighting coefficients corresponding to the M space-frequency units, or an indication of a quantity of zero-amplitude weighting coefficients in the M weighting coefficients; and
sending the CSI report to a network device, wherein the weighting coefficient indicated by the CSI report is used to determine a weighted sum of the part or all of the M space-frequency units, and the weighted sum is used to determine a precoding vector of a plurality of frequency domain units.

12. The apparatus according to claim 11, wherein the CSI report comprises a first part and a second part, wherein the second part comprises an indication of a normalized space-frequency unit, and quantization information of each weighting coefficient that is in M weighting coefficients corresponding to the M space-frequency units and that is different from a normalized coefficient, and wherein the normalized space-frequency unit corresponds to the normalized coefficient.

13. The apparatus according to claim 11, wherein the CSI report comprises a first part and a second part, wherein:
the first part comprises the indication of the quantity of non-zero-amplitude weighting coefficients in the M weighting coefficients corresponding to the M space-frequency units, or the indication of the quantity of zero-amplitude weighting coefficients in the M weighting coefficients; and
the second part comprises quantization information of an amplitude of each of the M weighting coefficients, and quantization information of a phase of each non-zero-amplitude weighting coefficient in the M weighting coefficients.

14. The apparatus according to any claim 12, wherein the second part further comprises an indication of the M space-frequency units.

15. The apparatus according to claim 14, wherein the indication comprises a bitmap.

16. A communications apparatus, comprising:
at least one processor configured with processor-executable instructions to perform operations comprising:
receiving a channel state information (CSI) report wherein the CSI report is used to indicate M space-frequency units and a weighting coefficient of a part or all of the M space-frequency units, wherein each of the M space-frequency units corresponds to one beam vector and one frequency domain vector, wherein the CSI report comprises an indication of a quantity of non-zero-amplitude weighting coefficients in M weighting coefficients corresponding to the M space-frequency units, or an indication of a quantity of zero-amplitude weighting coefficients in the M weighting coefficients, wherein the weighting coefficient is used to determine a weighted sum of the part or all of the M space-frequency units, and wherein the weighted sum is used to determine a precoding vector of a plurality of frequency domain units; and
determining the precoding vector of the plurality of frequency domain units based on the CSI report.

17. The apparatus according to claim 16, wherein the CSI report comprises a first part and a second part, wherein the second part comprises an indication of a normalized space-frequency unit, and quantization information of each weighting coefficient that is in M weighting coefficients corresponding to the M space-frequency units and that is different from a normalized coefficient, and wherein the normalized space-frequency unit corresponds to the normalized coefficient.

18. The apparatus according to claim 16, wherein the CSI report comprises a first part and a second part, wherein:
- the first part comprises the indication of the quantity of non-zero-amplitude weighting coefficients in the M weighting coefficients corresponding to the M space-frequency units, or the indication of the quantity of zero-amplitude weighting coefficients in the M weighting coefficients; and
- the second part comprises quantization information of an amplitude of each of the M weighting coefficients, and quantization information of a phase of each non-zero-amplitude weighting coefficient in the M weighting coefficients.

19. The apparatus according to claim 17, wherein the second part further comprises an indication of the M space-frequency units.

20. The apparatus according to claim 19, wherein the indication comprises a bitmap.

* * * * *

UNITED STATES PATENT AND TRADEMARK OFFICE
CERTIFICATE OF CORRECTION

| | | |
|---|---|---|
| PATENT NO. | : 12,284,018 B2 | Page 1 of 1 |
| APPLICATION NO. | : 17/241165 | |
| DATED | : April 22, 2025 | |
| INVENTOR(S) | : Huangping Jin, Xiaohan Wang and Xiaoyan Bi | |

It is certified that error appears in the above-identified patent and that said Letters Patent is hereby corrected as shown below:

On the Title Page

Item (30) (Foreign Application Priority Data), In Line 1, Delete "2018112631101.1" and insert -- 201811263110.1 --.

In the Specification

In Column 1, In Line 12 (Approx.), Delete "20181-12631101," and insert -- 201811263110.1, --.

In the Claims

In Column 100, In Line 32, In Claim 14, after "to" delete "any".

Signed and Sealed this
Twenty-sixth Day of August, 2025

Coke Morgan Stewart
*Acting Director of the United States Patent and Trademark Office*